United States Patent
Quirynen et al.

(10) Patent No.: US 11,163,273 B2
(45) Date of Patent: Nov. 2, 2021

(54) ACTIVE SET BASED INTERIOR POINT OPTIMIZATION METHOD FOR PREDICTIVE CONTROL

(71) Applicant: Mitsubishi Electric Research Laboratories, Inc., Cambridge, MA (US)

(72) Inventors: Rien Quirynen, Boston, MA (US); Jonathan Frey, Freiburg (DK); Stefano Di Cairano, Somerville, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 60 days.

(21) Appl. No.: 16/806,701

(22) Filed: Mar. 2, 2020

(65) Prior Publication Data

US 2021/0271214 A1 Sep. 2, 2021

(51) Int. Cl.
*G05B 13/04* (2006.01)
*G06F 17/11* (2006.01)
*G06F 17/16* (2006.01)

(52) U.S. Cl.
CPC ......... *G05B 13/048* (2013.01); *G05B 13/041* (2013.01); *G06F 17/11* (2013.01); *G06F 17/16* (2013.01)

(58) Field of Classification Search
CPC ..... G05B 13/041; G05B 13/048; G06F 17/11; G06F 17/16
See application file for complete search history.

(56) References Cited

U.S. PATENT DOCUMENTS

| | | | | |
|---|---|---|---|---|
| 7,184,992 B1 * | 2/2007 | Polyak | ................. | G05B 13/021 700/49 |
| 7,660,649 B1 * | 2/2010 | Hope | ..................... | G06Q 10/04 700/295 |
| 8,359,286 B1 * | 1/2013 | Nering | ................... | G06Q 10/04 706/46 |
| 8,407,172 B1 * | 3/2013 | Nering | ................... | G06Q 10/04 706/45 |
| 8,463,729 B2 * | 6/2013 | Achterberg | ............ | G06N 5/003 706/47 |

(Continued)

*Primary Examiner* — Crystal J Barnes-Bullock
(74) *Attorney, Agent, or Firm* — Gene Vinokur; Hironori Tsukamoto

(57) ABSTRACT

A control system for controlling an operation of a machine subject to constraints including equality and inequality constraints on state and control variables of the system iteratively solves an optimal control structured optimization problem (OCP), such that each iteration outputs primal variables and dual variables with respect to the equality constraints and dual variables and slack variables with respect to the inequality constraints. For a current iteration, the system classifies each of the inequality constraints as an active, an inactive or an undecided constraint based on a ratio of a slack variable to a dual variable of the corresponding inequality constraint determined by a previous iteration, finds an approximate solution to the set of relaxed optimality conditions subject to the equality constraints and the active and undecided inequality constraints, and update the primal, dual, and slack variables for each of the equality and inequality constraint.

20 Claims, 36 Drawing Sheets

(56) References Cited

U.S. PATENT DOCUMENTS

| | | | | |
|---|---|---|---|---|
| 8,566,267 | B1* | 10/2013 | Ledbetter, Jr. | G06Q 10/04 |
| | | | | 706/46 |
| 10,139,809 | B2* | 11/2018 | Sayyarrodsari | G05B 13/048 |
| 10,592,816 | B1* | 3/2020 | Hsu | G06F 17/11 |
| 10,673,273 | B2* | 6/2020 | Ghaemi | G06Q 50/06 |
| 10,877,445 | B2* | 12/2020 | Quirynen | G05B 13/048 |
| 11,003,146 | B2* | 5/2021 | Westervelt | H04L 9/0643 |
| 2007/0011121 | A1* | 1/2007 | Bi | G06K 9/6269 |
| | | | | 706/20 |
| 2021/0094705 | A1* | 4/2021 | Asano | G06F 17/11 |

\* cited by examiner

Solve optimal control structured quadratic program (OCP-QP)

$$\min_{X,U} \sum_{k=0}^{N-1} \frac{1}{2} \begin{bmatrix} x_k \\ u_k \end{bmatrix}^T \begin{bmatrix} Q_k & S_k^T \\ S_k & R_k \end{bmatrix} \begin{bmatrix} x_k \\ u_k \end{bmatrix} + \begin{bmatrix} q_k \\ r_k \end{bmatrix}^T \begin{bmatrix} x_k \\ u_k \end{bmatrix} + \frac{1}{2} x_N^T Q_N x_N + q_N^T x_N$$

s.t. $x_0 = \hat{x}_0,$ $x_{k+1} = a_k + A_k x_k + B_k u_k,$ $\quad k = 0, \ldots, N-1,$ $d_k \geq D_k^x x_k + D_k^u u_k,$ $\quad k = 0, \ldots, N,$

370

Primal-dual interior point method solves the OCP-QP by iteratively solving the smoothened system of first order necessary optimality conditions using a Newton-type method for barrier parameter values $\tau \to 0$

401 $Hz + F^T \lambda + G^T \mu + h = 0,$

402 $Fz - f = 0,$

403 $Gz - g + s = 0,$

404 $M\mathbf{1} - \tau S^{-1}\mathbf{1} = 0,$

405 $\mu, s \geq 0,$ $H := \begin{bmatrix} Q_0 & S_0^T & \cdots & 0 \\ S_0 & R_0 & \cdots & \vdots \\ \vdots & \vdots & \ddots & \vdots \\ 0 & 0 & \cdots & Q_N \end{bmatrix}, \quad G := \begin{bmatrix} D_0^x & D_0^u & \cdots & 0 \\ \vdots & \vdots & \ddots & \vdots \\ 0 & 0 & \cdots & D_N^x \end{bmatrix}$ $F := \begin{bmatrix} -1 & 0 & 0 & \cdots & 0 \\ A_0 & B_0 & -1 & 0 & \cdots \\ \vdots & & \ddots & \ddots & \vdots \\ 0 & \cdots & 0 & 0 & A_{N-1} & B_{N-1} & -1 \end{bmatrix}$

Algorithm 1 Constraint reactivation procedure for IPM  ~ 1130

1: Input: Current value $n_d$, $\bar{n}_d$, $\alpha_{min}$, and $\gamma$  ~ 1131
2: if Decreasing step size $\alpha^k < \alpha^{k-1}$ then  ~ 1132
3:     $n_d \leftarrow n_d + 1$.  ~ 1133
4:     if $n_d \geq \bar{n}_d$ and $\alpha < \alpha_{min}$ then    ▷ Reactivate ~ 1135
5:         # of constraints to reactivate: $n_a = \lceil \gamma |\mathcal{I}_{in}| \rceil$.  ~ 1136
6:         $\mu_i \leftarrow \beta \mu_i, i \in \mathcal{I}_{in}$, to reactivate $n_a$ constraints.  ~ 1137
7:     end if
8: else
9:     $n_d \leftarrow 0$.    ▷ Reset counter ~ 1134
10: end if

FIG. 11B

Algorithm 2 Active-set based Inexact IPM for MPC — 1150

1: Warm starting strategy from Figure 10A or 10 B. — 1155
2: while $\max(\tau^k, \|r^k\|) > \text{tol}$ do — 1160
3:    Call reactivation procedure in Algorithm 1. — 1130, 1165
4:    $N_{up}$-block update of sparse factorization for $\mathcal{M}^k$. — 1170
5:    Form and solve reduced linearized KKT system. — 1175
6:    Compute dual search direction step in Figure 8. — 1180
7:    Step size $\alpha^k$ to ensure positivity constraints. — 1185
8:    $(z, \lambda, \mu, s)^k \leftarrow (z, \lambda, \mu, s)^{k-1} + \alpha^k \Delta(z, \lambda, \mu, s)^k$.
9: end while
10: Output: Next optimal control input values $u_0^*$. — 1190

FIG. 11C

ACTIVE SET BASED INTERIOR POINT OPTIMIZATION METHOD FOR PREDICTIVE CONTROL

TECHNICAL FIELD

The invention relates generally to predictive control, and more particularly to an active set based interior point optimization method and apparatus for predictive control of dynamical systems in the presence of inequality constraints.

BACKGROUND

Optimization based control and estimation techniques, such as model predictive control (MPC) and moving horizon estimation (MHE), have experienced an increasing amount of interest from industry. One of the main advantages of these methods is their systematic way of incorporating the dynamic model of the system, the limitations in the form of inequality constraints and the performance metrics in the form of a cost function. At each sampling instant, a model-based predictive controller or estimator solves a multi-stage dynamic optimization problem that minimizes a particular cost function subject to a discrete-time description of the system dynamics and inequality constraints. A block-sparse quadratic program (QP) structure arises in linear or linear time-varying formulations of predictive control and estimation. A similarly structured QP forms also the subproblems within a sequential quadratic programming (SQP) method for nonlinear optimal control.

More general classes of convex or even non-convex optimization problems arise in advanced formulations of optimization-based predictive control applications. For example, quadratically constrained quadratic programming (QCQP), second-order cone programming (SOCP) or semi-definite programming (SDP) problems can arise in stochastic or robust formulations of optimization-based control and estimation. Predictive control or estimation of hybrid systems can require the solution of mixed-integer programming (MIP) problems and the use of nonlinear dynamics to describe the system, or the use of nonlinear functions in the objective or constraints, results in a nonlinear programming (NLP) problem. Both classes of MIP and NLP problems are generally non-convex optimization problems and they are therefore much more difficult to solve in practice.

A real-time implementation of MPC requires the solution of the block-sparse structured dynamic optimization problem within a specified time period, typically on embedded control hardware with limited computational resources and a relatively small amount of available memory. These challenges have sparked considerable efforts in research on embedded optimization algorithms that are tailored to real-time applications of optimization-based predictive control and estimation. Generally, there is a trade-off between solvers that make use of second-order information and require only few but computationally complex iterations, including active-set strategies and interior point algorithms, versus first-order methods that are of low complexity but may require many more iterations, e.g., the alternating direction method of multipliers (ADMM) and other gradient or splitting-based optimization algorithms.

It is known that interior point (IP) methods, compared to active-set (AS) solvers, typically require a small variation in the number of iterations when solving a range of optimization problems with different dimensions and a varying number of active inequality constraints. However, each iteration of the IP optimization method is typically more computationally expensive due to low-rank factorization updates that are used to efficiently solve the linear systems in AS solvers. Warm starting can additionally be used directly to reduce the average computational cost of AS solvers in real-time applications of predictive control or estimation, which is generally more complicated for IP methods (IPMs). The result is that IPMs may outperform other optimization algorithms in the worst-case performance, despite their average computation times often being larger. In addition, IPMs can be designed to solve a large class of optimization problems, while AS solvers are typically restricted to linear or quadratic programming problems.

Consequently, there is a need for algorithmic techniques that can be applied to the implementation of IP methods in order to combine the advantages of both AS and IP optimization algorithms, i.e., to combine the generality and reliability of IP methods with the warm starting capabilities and low computational cost per iteration of AS methods for the effective real-time solution of a sequence of parametric dynamic optimization problems.

SUMMARY

It is an object of some embodiments to improve the numerical conditioning and warm starting properties of IPMs and/or to reduce their average computational cost per iteration, based on an active-set identification strategy and an inexact Newton-type optimization technique that is tailored to the implementation of IPMs. Some embodiments disclose an inexact Newton-type optimization algorithm that results in a numerically robust active-set identification strategy and it allows one to use low-rank block-sparse matrix factorization updates and tailored warm starting procedures to reduce the average computational cost per IPM iteration.

The values of Lagrange multipliers become increasingly close to zero while the slack variables remain nonzero for inequality constraints that are inactive at the optimal solution, i.e., when the left- and right-hand side of such inequality constraints are not equal to each other at the solution. On the other hand, the values of slack variables become increasingly close to zero while the Lagrange multiplier values remain nonzero for inequality constraints that are active at the optimal solution, i.e., when the left- and right-hand side of such inequality constraints are equal to each other at the solution. In terms of the ratio between the slack variables and the Lagrange multiplier values, over the subsequent iterations of the IPM, the value of this ratio is either increasing or decreasing, respectively, for each of the inequality constraints that are either inactive or active at the optimal solution.

Some embodiments are based on the realization that this convergence behavior of slack variables and Lagrange multipliers for active versus inactive inequality constraints leads to the numerical ill-conditioning for the implementation of IPMs. Some embodiments use a classification of the inequality constraints in order to implement the IPM based on an inexact Newton-type optimization algorithm that prevents the increasing gap in the ratio between the slack variables and the Lagrange multiplier values for inactive versus active inequality constraints. In each iteration of the IPM, some embodiments classify inequality constraints to be part of exactly one of three possible categories: they are expected to be either active or inactive at the optimal solution, or they are currently in the undecided range in between these two categories. Based on the classification of the inequality constraints, a particular Jacobian approximation is proposed to implement the inexact Newton method, which neglects contributions to the first row of optimality conditions from the inequality constraints that are expected to be inactive at the optimal solution, because the corresponding Lagrange multiplier values are sufficiently small.

Some embodiments are based on the realization that the resulting linearized system of optimality conditions, which is solved in each iteration of the IPM, can be decomposed into two smaller linear systems that can be solved sequentially. The first linear system corresponds to the optimality conditions of the original optimal control structured optimization problem, taking into account the objective function, the equality constraints and the inequality constraints that are currently expected to potentially be active at the optimal solution, i.e., neglecting the contributions to these optimality conditions from the inequality constraints that are currently expected to be inactive. The solution to the first linear system corresponds to the inexact Newton-type search direction for the optimization variables, the Lagrange multipliers for the equality constraints, and the slack variables and Lagrange multipliers for the potentially active inequality constraints. Based on this search direction for the optimization variables, a second linear system is solved in order to compute the search direction for the slack variables and Lagrange multipliers for the potentially inactive inequality constraints.

Some embodiments are based on the realization that the first system of linearized optimality conditions exhibits a block-based sparsity structure in the coefficient matrix, which is common in optimal control problems. Some embodiments numerically eliminate the dual variables, i.e., the Lagrange multipliers in the first linear system and solve a reduced linear system in the primal optimization variables instead. Some embodiments are based on the realization that the coefficient matrix in the reduced linear system is either positive semidefinite or positive definite and the matrix exhibits a block-tridiagonal sparsity structure. In some embodiments, a block-tridiagonal Cholesky factorization can be used to efficiently solve the first linear system in its reduced form. Based on the search direction for the primal optimization variables, the corresponding search direction can be computed efficiently for the Lagrange multipliers for the equality constraints, and the slack variables and Lagrange multipliers for the potentially active inequality constraints. In addition, some embodiments are based on the realization that the second linear system has a diagonal coefficient matrix that can be inverted efficiently by inverting the diagonal elements individually.

Some embodiments perform an augmented Lagrangian type regularization to the coefficient matrix in the first linear system, in order to prevent numerical ill-conditioning of the coefficient matrix that is due to the ratio between the slack variables and the Lagrange multiplier values being too small for equality constraints and for inequality constraints that are expected to potentially be active at the optimal solution. This augmented Lagrangian type regularization results in a lower bounding of the values for the ratio between the slack variables and the Lagrange multipliers for the inequality constraints that are currently expected to potentially be active at the optimal solution.

Some embodiments are based on the realization that, due to neglecting the contributions to the optimality conditions from the inequality constraints that are currently expected to be inactive and due to the augmented Lagrangian type regularization for equality constraints and for inequality constraints that are expected to be active, low-rank block-sparse factorization updates can be used to efficiently solve the first linearized system. In case of QP problems, embodiments are based on the realization that all changes to the coefficient matrix in the first linear system are due to changes in the ratio values for the inequality constraints that are currently in the undecided range between the active and inactive classification category of inequality constraints.

More specifically, a particular block in the coefficient matrix of the reduced linear system remains unchanged from one IPM iteration to the next, if none of the inequality constraints within the corresponding stage of the prediction horizon are currently within the undecided classification range. Some embodiments are based on the realization that active set changes are more likely to occur in stages near the beginning of the prediction horizon. Therefore, some embodiments use a reverse factorization procedure for the coefficient matrix such that the block-based updates of this matrix factorization can start from the last stage in the prediction horizon that corresponds to one or multiple inequality constraints that are currently within the undecided classification range. In addition, some embodiments can additionally use rank-1 block-structured factorization updates in order to efficiently take into account the changes that correspond to a relatively small amount of inequality constraints over a large range of control stages.

Some embodiments are based on the realization that auxiliary variables, with a corresponding penalization in the cost function, are often used to soften state-dependent inequality constraints in the optimization problem formulation for real-time predictive control or estimation. Such auxiliary variables result in a particular sparsity structure in the coefficient matrix of the reduced linear system. Some embodiments are based on the realization that a simple bound constraint on a particular optimization variable results in a contribution on the diagonal of the coefficient matrix, while the off-diagonal elements are zero for that row and column, if that particular optimization variable does not appear in any cross-terms in the cost function, nor in any other inequality constraints that are not inactive or in any of the equality constraints. The computational cost of making the corresponding update to the matrix factorization does not scale with any of the dimensions in the optimization problem, such that these updates should be performed independently of any other updates to the factorization of the coefficient matrix due to changes in the ratio values for the inequality constraints that are currently in the undecided range.

Some embodiments are based on the realization that a predictor-corrector type implementation of the IPM can provide a computational speedup if and only if the linear system solution is relatively cheap, compared to the factorization of the coefficient matrix. Therefore, some embodiments can switch between a standard implementation and a predictor-corrector type implementation of the proposed IPM in each iteration, depending on the relative computational cost of the linear system solution versus the structured factorization of the coefficient matrix.

Some embodiments are based on the realization that warm starting of the ratio values can be particularly effective for the proposed inexact Newton-type implementation of the IPM, due to a reduction of the number of iterations in the IPM and a reduction of the computational cost per iteration if we can reuse one or multiple of the blocks in the factorization of the coefficient matrix. Warm starting strategies for an IPM construct a solution guess for the values of the primal optimization variables, the Lagrange multipliers, the slack variables and the barrier parameter value from the solution to a previous optimization problem that is sufficiently similar, e.g., with or without shifting the previous solution in time. Some embodiments are based on the realization that such warm starting strategies need to avoid convergence issues of the IPM that are due to the non-smoothness of the complementarity conditions. Therefore, in some embodiments, a sufficiently large upward scaling of the slack variables is used in order to inactivate some or all of the inequality constraints. In other embodiments, warm starting of the IPM can be based on an inexact relaxed solution to the previous optimization problem, which is sufficiently smooth to avoid such convergence issues.

Some embodiments are based on the realization that a constraint reactivation procedure is needed in the proposed inexact Newton-type implementation of the IPM, in order to recover from convergence issues that can be caused by a bad initial solution guess due to warm starting of the IPM based on a solution to a problem that is not sufficiently similar to the current optimization problem. In some embodiments, the detection of such a bad initialization is based on a monitoring strategy of the step sizes at successive iterations of the IPM. In some embodiments, the constraint reactivation procedure is based on scaling the Lagrange multiplier values for one or multiple of the currently inactive inequality constraints upward with a sufficiently large value in order to bring a particular set of inactive inequality constraints into the undecided constraint classification range.

Some embodiments are based on the realization that the state variables in an optimal control problem can be eliminated numerically based on a condensing procedure that uses the discrete-time system dynamics to define the state variables at each stage in the prediction horizon as a function of the initial state values and the control variables at all the previous stages in the prediction horizon. This complete or partial condensing procedure results in a smaller but generally denser optimization problem with less or no equality constraints and the same amount of inequality constraints, which are described in terms of the remaining optimization variables in the optimal control problem. Some embodiments are based on the realization that the same constraint classification and inexact Newton-type implementation of the IPM can be used for the optimization problem that results from this complete or partial condensing procedure, even though less sparsity is present in the coefficient matrix of the linearized system of optimality conditions in each IPM iteration.

Accordingly, one embodiment discloses a control system for controlling an operation of a machine subject to constraints including equality and inequality constraints on state and control variables of the system. The system includes a processor configured to solve an optimal control structured optimization problem (OCP) to produce a control signal for each control step, wherein for each control step, the processor is configured to solve the OCP by iteratively solving a set of relaxed optimality conditions until a termination condition is met, wherein each iteration outputs primal variables and dual variables with respect to the equality constraints and dual variables and slack variables with respect to the inequality constraints, wherein for a current iteration, the processor is configured to: classify each of the inequality constraints as an active, an inactive or an undecided constraint based on a ratio of a slack variable to a dual variable of the corresponding inequality constraint determined by a previous iteration; find an approximate solution to the set of relaxed optimality conditions subject to the equality constraints and the active and undecided inequality constraints; and update the primal, dual, and slack variables for each of the equality and inequality constraint; and control the system based on the control signal.

Another embodiment discloses a control method for controlling an operation of a machine subject to constraints including equality and inequality constraints on state and control variables of the system, wherein the processor is coupled with stored instructions implementing the method, wherein the instructions, when executed by the processor carry out at least some steps of the method, including solving an optimal control structured optimization problem (OCP) to produce a control signal for each control step, wherein for each control step, the OCP is solved by iteratively solving a set of relaxed optimality conditions until a termination condition is met, wherein each iteration outputs primal variables and dual variables with respect to the equality constraints and dual variables and slack variables with respect to the inequality constraints, wherein for a current iteration, the method includes: classifying each of the inequality constraints as an active, an inactive or an undecided constraint based on a ratio of a slack variable to a dual variable of the corresponding inequality constraint determined by a previous iteration; finding an approximate solution to the set of relaxed optimality conditions subject to the equality constraints and the active and undecided inequality constraints; and updating the primal, dual, and slack variables for each of the equality and inequality constraint; and controlling the system based on the control signal.

Yet another embodiment discloses a non-transitory computer readable storage medium embodied thereon a program executable by a processor for performing a method, the method includes solving an optimal control structured optimization problem (OCP) to produce a control signal for each control step, wherein for each control step, the OCP is solved by iteratively solving a set of relaxed optimality conditions until a termination condition is met, wherein each iteration outputs primal variables and dual variables with respect to the equality constraints and dual variables and slack variables with respect to the inequality constraints, wherein for a current iteration, the method includes: classifying each of the inequality constraints as an active, an inactive or an undecided constraint based on a ratio of a slack variable to a dual variable of the corresponding inequality constraint determined by a previous iteration; finding an approximate solution to the set of relaxed optimality conditions subject to the equality constraints and the active and undecided inequality constraints; and updating the primal, dual, and slack variables for each of the equality and inequality constraint; and controlling the system based on the control signal.

BRIEF DESCRIPTION OF THE DRAWINGS

FIG. 4A illustrates a block-sparse interior point optimization algorithm to solve the constrained optimal control structured quadratic program (OCP-QP) by iteratively solving a relaxed system of necessary optimality conditions;

FIG. 11B is an algorithmic description of a detection and constraint reactivation procedure in the active-set based IPM according to some embodiments;

FIG. 11C is an algorithmic description of the overall active-set based inexact IPM optimization algorithm for predictive control according to some embodiments.

DETAILED DESCRIPTION

Some embodiments provide a system and a method for controlling an operation of a system or a system using a predictive controller. An example of the predictive controller is a model predictive control (MPC) determining control inputs based on a model of the controlled system.

Model predictive control or estimation requires solving a block-sparse structured dynamic optimization problem at each sampling instant, under strict timing requirements on embedded control hardware. Interior point methods are generally applicable to a large class of optimization problems and can be very reliable especially for convex optimization, even without a good initial guess for the optimal solution. Active-set based optimization methods, on the other hand, are often restricted to linear or quadratic programming problems but they have a low computational cost per iteration and superior warm starting properties. To that end, some embodiments disclose an approach for improving the numerical conditioning and warm starting properties of interior point methods, based on an active-set identification strategy and an inexact Newton-type optimization technique that is tailored to the implementation of interior point methods. This allows us to reduce the average computational cost of the linear algebra operations in each iteration of the interior point optimization algorithm.

Figure 1:
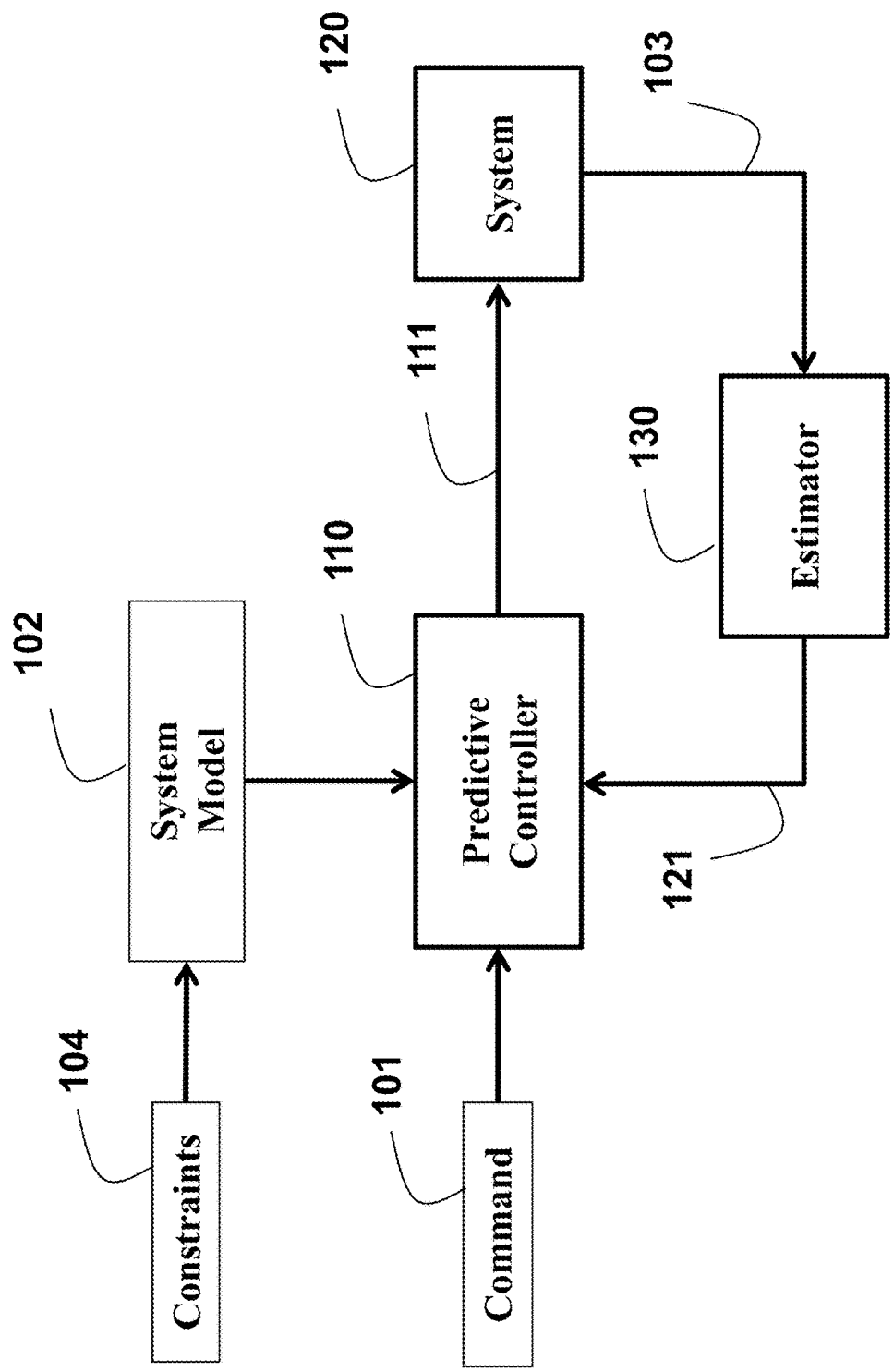
FIG. 1 is a block diagram of a predictive controller and feedback system according to some embodiments.

FIG. 1 shows an example system 120 connected to a predictive controller 110 via a state estimator 130 according to some embodiments. In some implementations, the predictive controller is an MPC controller programmed according to a dynamical model 102 of the system. The model can be a set of equations representing changes of the state and output 103 of the system 120 over time as functions of current and previous inputs 111 and previous outputs 103. The model can include constraints 104 that represent physical and operational limitations of the system. During the operation, the controller receives a command 101 indicating the desired behavior of the system. The command can be, for example, a motion command. In response to receiving the command 101, the controller generates a control signal 111 that serves as an input for the system. In response to the input, the system updates the output 103 of the system. Based on measurements of the output of the system 103, the estimator updates the estimated state of the system 121. This estimated state of the system 121 provides the state feedback to the controller 110.

The system 120, as referred herein, can be any machine or device controlled by certain manipulation input signals 111 (inputs), possibly associated to physical quantities such as voltages, pressures, forces, torques, and to return some controlled output signals 103 (outputs), possibly associated to physical quantities such as currents, flows, velocities, positions indicative of a transition of a state of the system from a previous state to the current state. The output values are related in part to previous output values of the system, and in part to previous and current input values. The dependency on previous inputs and previous outputs is encoded in the state of the system. The operation of the system, e.g., a motion of components of the system, can include a sequence of output values generated by the system following the application of certain input values.

A model of the system 102 can include a set of mathematical equations that describe how the system outputs change over time as functions of current and previous inputs, and the previous outputs. The state of the system is any set of information, in general time varying, for instance an appropriate subset of current and previous inputs and outputs, that, together with the model of the system and future inputs, can uniquely define the future motion of the system.

The system can be subject to physical limitations and specification constraints 104 limiting the range where the outputs, the inputs, and also possibly the states of the system are allowed to operate.

The controller 110 can be implemented in hardware or as a software program executed in a processor, e.g., a microprocessor, which at fixed or variable control period sampling intervals receives the estimated state of the system 121 and the desired motion command 101 and determines, using this information, the inputs, e.g., the control signal 111, for operating the system.

The estimator 130 can be implemented in hardware or as a software program executed in a processor, either the same or a different processor from the controller 110, which at fixed or variable control period sampling intervals receives the outputs of the system 103 and determines, using the new and the previous output measurements, the estimated state 121 of the system 120.

Figure 2:
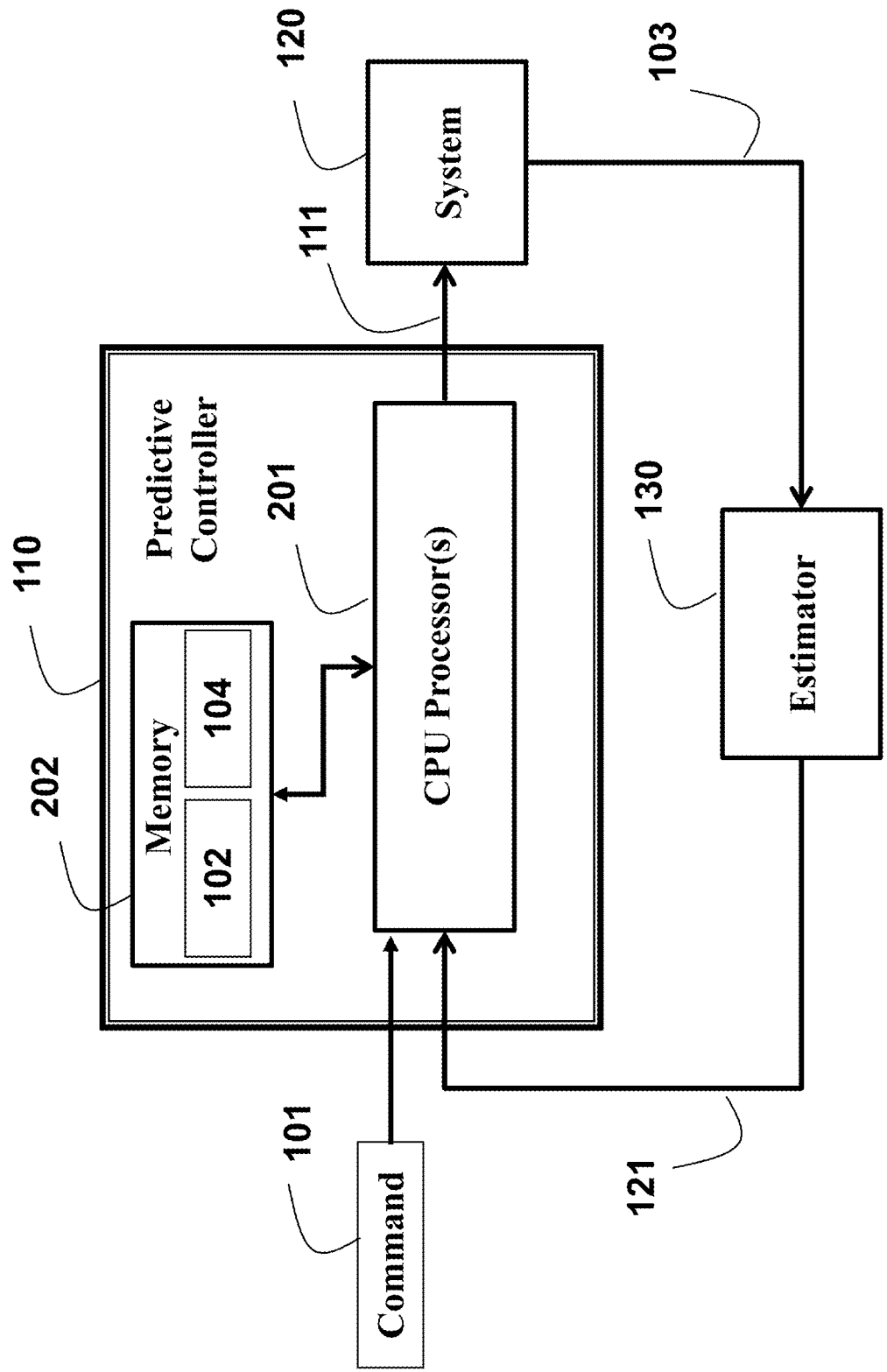
FIG. 2 is a block diagram of a controller, implemented using CPU processors and memory, and feedback system according to some embodiments.

FIG. 2 shows a block diagram of a controller 110 according to some embodiments, which actuates the system such that the estimated state 121 of the system and output 103 follow a command 101. The controller 110 includes a computer, e.g., in the form of a single central processing unit (CPU) or multiple CPU processors 201 connected to memory 202 for storing the model 102 and the constraints 104 on the operation of the system.

Figure 3A:
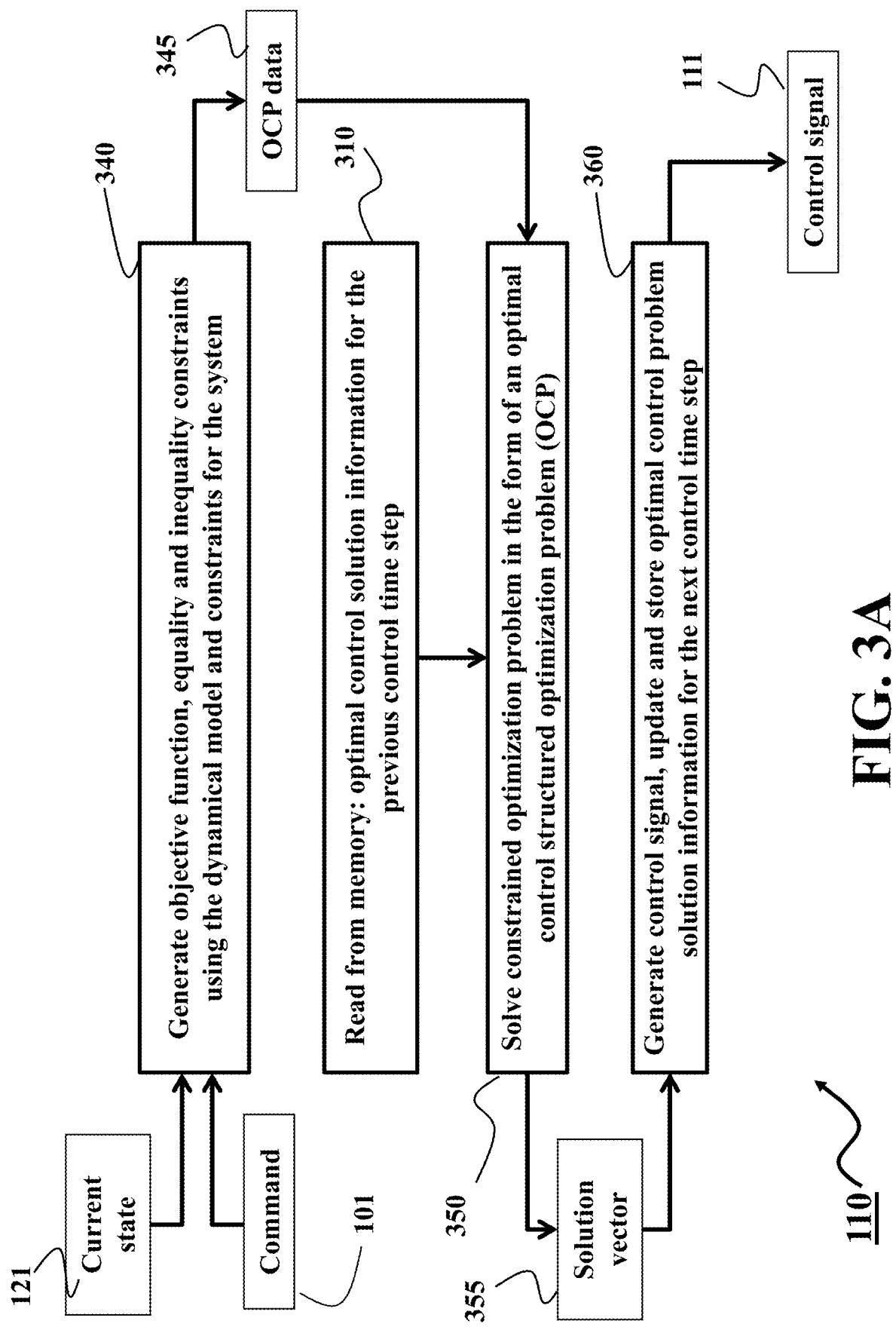
FIG. 3A is a block diagram of a model predictive control (MPC) method that solves a constrained optimal control structured optimization problem (OCP) to implement the predictive control system according to some embodiments.

FIG. 3A shows a block diagram of a system and a method for model predictive control (MPC) to implement the predictive controller 110 that computes the control signal 111, given the current state of the system 121 and the control command 101 according to some embodiments. Specifically, MPC computes a control solution, e.g., a solution vector 355 that contains a sequence of future optimal or approximately optimal control inputs over a prediction time horizon of the system 360, by solving a constrained optimization problem 350 at each control time step. The data 345 of the objective function, equality and inequality constraints in this optimization problem 350 depends on the dynamical model, the system constraints 340, the current state of the system 121, objectives of control and the control command 101.

Some embodiments use an interior point optimization method to solve the inequality constrained optimization problem 350 either exactly or approximately, using an iterative procedure that is based on a Newton-type method in combination with a barrier-type relaxation to solve the resulting set of smooth necessary conditions of optimality. Some embodiments are based on the realization that the inequality constrained optimization problem 350 has the form of an optimal control structured optimization problem (OCP), such that a structure exploiting implementation of an interior point optimization method can be used to compute the solution vector 355 at each control time step.

In some embodiments, the solution of the inequality constrained optimization problem 350 uses the exact or approximate state and/or control values over the prediction time horizon from the previous control time step 310, which can be read from the memory, as a solution guess in order to reduce the computational effort of solving the inequality constrained optimization problem 350 at the current control time step. This concept of computing a solution guess from the solution information at the previous control time step 310 is called warm-starting or hot-starting of the optimization algorithm and it can reduce the required computational effort of the MPC controller in some embodiments. In a similar fashion, the corresponding solution vector 355 can be used to update and store a sequence of exact or approximate state and/or control values for the next control time step 360.

In some embodiments, the solution of the inequality constrained optimization problem is based on a Newton-type interior point optimization algorithm and the MPC controller updates and stores additional solution information 360 in order to reduce the computational effort of the Newton-type interior point optimization algorithm from one control time step to the next. Examples of the additional solution information 360 can include exact and/or approximate Hessian and gradient information, optimal and/or relaxed values for the Lagrange multipliers, optimal and/or relaxed values for the slack variables, and the optimal and/or relaxed value for the barrier parameter.

Figure 3B:
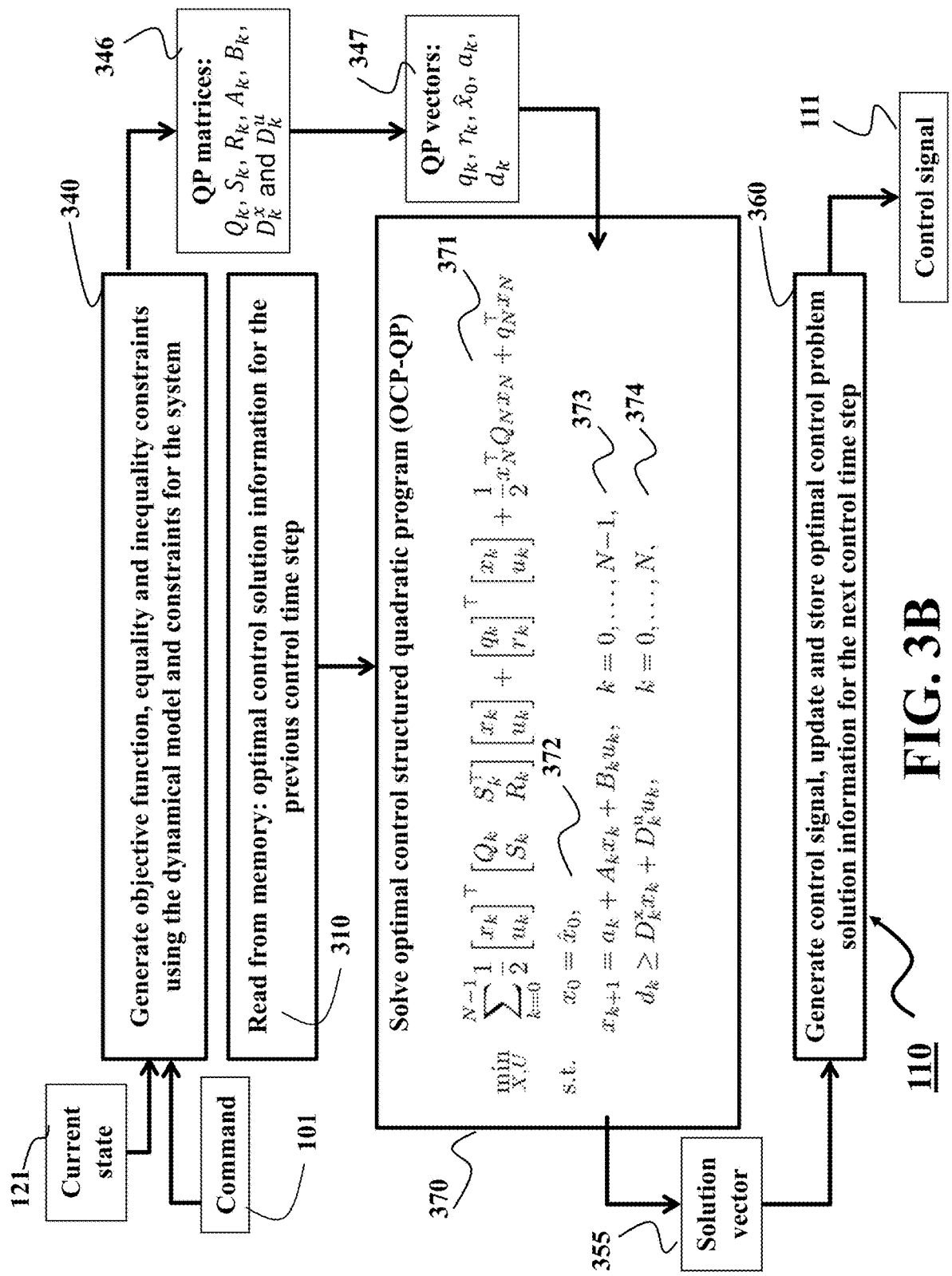
FIG. 3B is a block diagram of a model predictive control (MPC) method that solves a constrained optimal control structured quadratic program (OCP-QP) to implement the predictive control system according to some embodiments.

FIG. 3B shows a block diagram of an MPC controller that solves a constrained optimal control structured quadratic programming problem (OCP-QP) 370 in order to compute the control signal 111 at each control time step, given the current state of the system 121 and the command 101. Some embodiments are based on an initial state value condition 372, a dynamical model of the system that results in linear equality constraints 373, linear inequality constraints 374 and a linear-quadratic objective function 371, such that a constrained optimal control structured quadratic programming problem (OCP-QP) 370 needs to be solved at each control time step. The OCP-QP data 345 of the objective function, equality and inequality constraints in this optimization problem 370 depends on the dynamical model, the system constraints 340, the current state of the system 121, objectives of control and the control command 101. Examples of the OCP-QP matrices 346 include Hessian matrices, e.g., $Q_k$, $R_k$ and $S_k$ and constraint Jacobian matrices, e.g., $A_k$, $B_k$, $D_k^x$ and $D_k^u$. Examples of the OCP-QP vectors 347 include gradient vectors, e.g., $q_k$ and $r_k$ and constraint evaluation vectors, e.g., $\hat{x}_0$, $a_k$ and $d_k$.

Figure 3C:
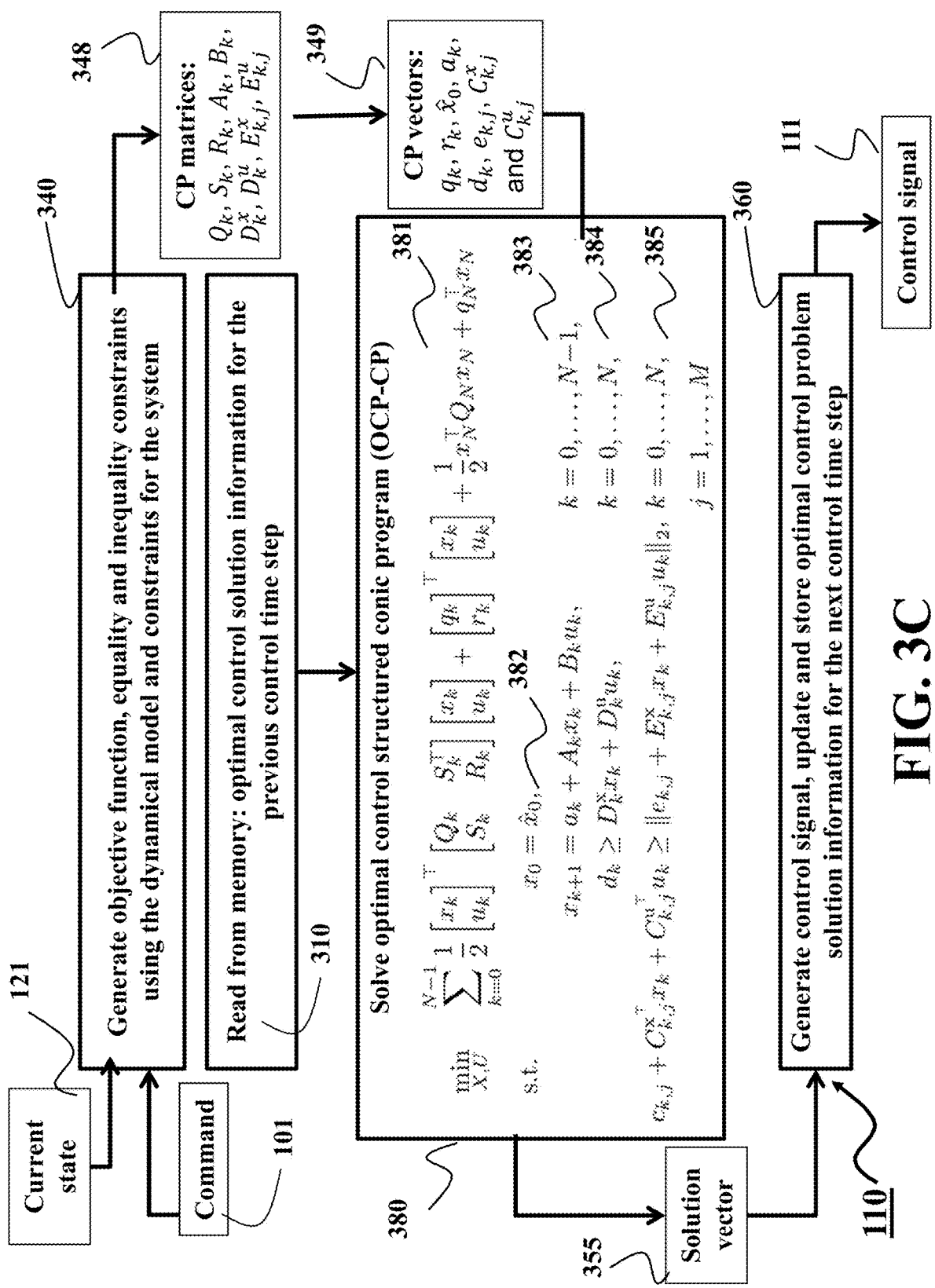
FIG. 3C is a block diagram of a model predictive control (MPC) method that solves a constrained optimal control structured conic program (OCP-CP) to implement the predictive control system according to some embodiments.

FIG. 3C shows a block diagram of an MPC controller that solves a constrained optimal control structured conic programming problem (OCP-CP) 380 in order to compute the control signal 111 at each control time step, given the current state of the system 121 and the command 101. Some embodiments are based on an initial state value condition 382, a dynamical model of the system that results in linear equality constraints 383, linear inequality constraints 384, one or multiple convex conic constraints 385 and a linear-quadratic objective function 381, such that a constrained optimal control structured conic programming problem (OCP-CP) 380 needs to be solved at each control time step. The OCP-CP data 345 of the objective function, equality and inequality constraints in this optimization problem 380 depends on the dynamical model, the system constraints 340, the current state of the system 121, objectives of control and the control command 101. Examples of the OCP-CP matrices 348 include Hessian matrices, e.g., $Q_k$, $R_k$ and $S_k$ and constraint Jacobian matrices, e.g., $A_k$, $B_k$, $D_k^x$, $D_k^u$, $E_{k,j}^x$ and $E_{k,j}^u$. Examples of the OCP-CP vectors 349 include gradients, e.g., $q_k$ and $r_k$ and constraint evaluation vectors, e.g., $\hat{x}_0$, $a_k$, $d_k$, $e_{k,j}$, $c_{k,j}$, $C_{k,j}^x$ and $C_{k,j}^u$.

In some embodiments, each of the convex conic constraints 385 impose that a linear combination of state and/or control input variables is restricted to be inside of a convex cone. Examples of a convex cone can include the positive orthant, the set of positive semidefinite matrices and/or the second-order cone. Some embodiments are based on the realization that the constrained optimal control structured conic program (OCP-CP) 380 can be a linear program (LP), a quadratic program (QP), a quadratically constrained quadratic program (QCQP), a second-order cone program (SOCP) or a semidefinite program (SDP), and each of these classes of problems can be solved by an interior point optimization algorithm.

In some embodiments, one or multiple of the conic constraints 385 and/or the linear inequality constraints 384 represent a robust or probabilistic formulation of one or multiple of the constraints in a robust or stochastic implementation of the predictive controller 110 to control the system under uncertainty. Examples of uncertainty can include uncertainty of the dynamical model and/or external disturbances, uncertainty in the environment of the system, uncertainty in map information, uncertainty of the control objectives, uncertainty in the sensor information and/or in the state estimate.

Figure 3D:
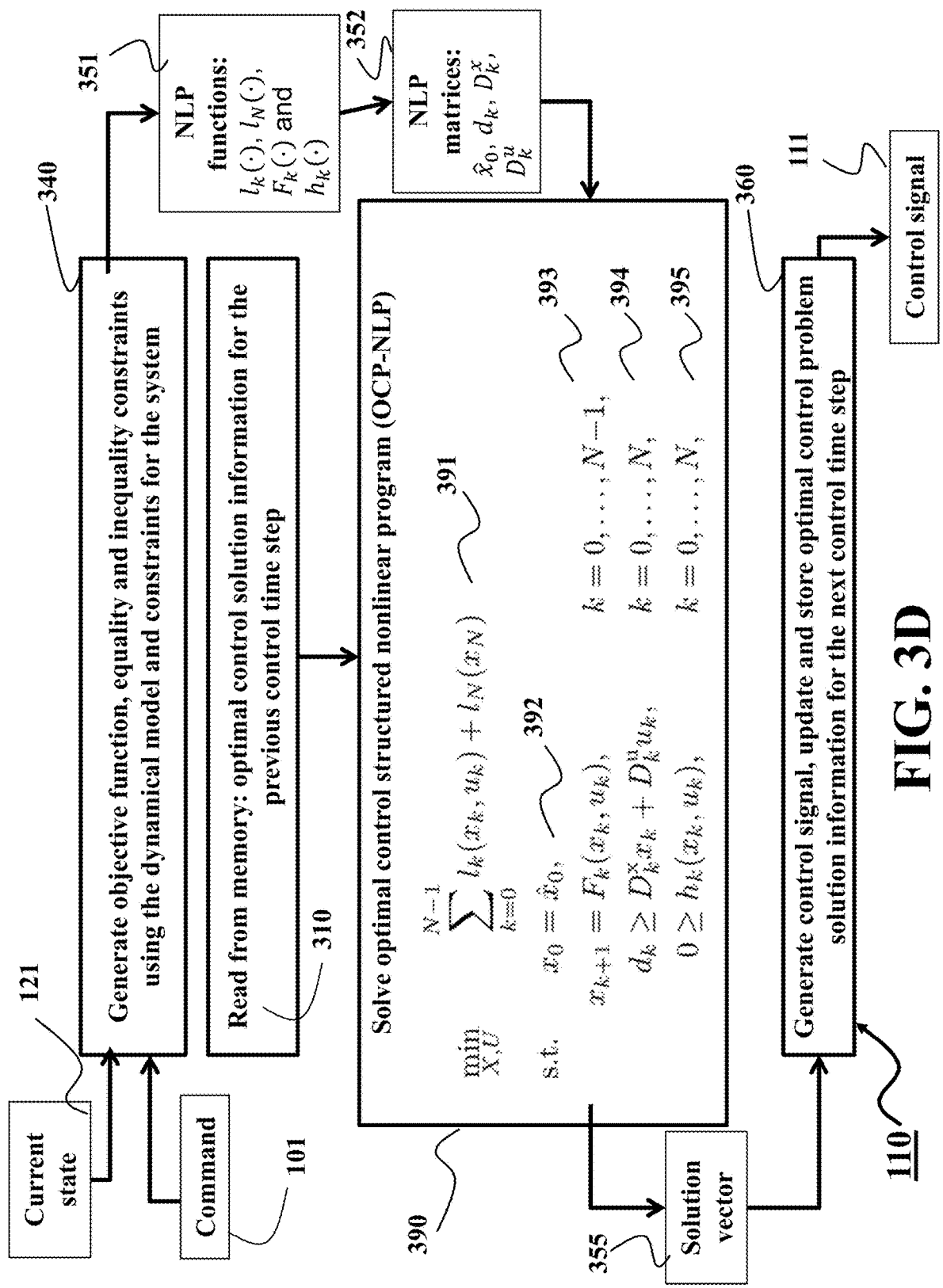
FIG. 3D is a block diagram of a model predictive control (MPC) method that solves a constrained optimal control structured nonlinear program (OCP-NLP) to implement the predictive control system according to some embodiments.

FIG. 3D shows a block diagram of an MPC controller that solves a constrained optimal control structured nonlinear programming problem (OCP-NLP) 390 in order to compute the control signal 111 at each control time step, given the current state of the system 121 and the command 101. Some embodiments are based on an initial state value condition 392, a dynamical model of the system that results in linear and/or nonlinear equality constraints 393, linear inequality constraints 394 and/or nonlinear inequality constraints 395 and a linear-quadratic or nonlinear objective function 391, such that a constrained optimal control structured nonlinear programming problem (OCP-NLP) 390 needs to be solved at each control time step. The OCP-NLP data 345 of the objective function, equality and inequality constraints in this optimization problem 390 depends on the dynamical model, the system constraints 340, the current state of the system 121, objectives of control and the control command 101. Examples of the OCP-NLP functions 351 include objective functions, e.g., $l_k(\cdot)$ and $l_N(\cdot)$ and constraint functions, e.g., $F_k(\cdot)$ and $h_k(\cdot)$. Examples of the OCP-NLP matrices 352 include constraint evaluation vectors, e.g., $\hat{x}_0$ and $d_k$ and constraint Jacobian matrices, e.g., $D_k^x$ and $D_k^u$.

In some embodiments, the nonlinear equality constraints 393 impose a discrete-time, approximate representation of the system dynamics that can be defined by a set of continuous time differential or a set of continuous time differential-algebraic equations. Examples of such a discrete-time, approximate representation of the system dynamics includes numerical simulation techniques, e.g., linear multistep methods, Runge-Kutta methods, backward differentiation formulas or finite element methods. In some embodiments, the nonlinear inequality constraints 395 can be defined by any nonlinear smooth function, including either convex and/or non-convex constraints. In some embodiments, a stage and/or terminal cost in the objective function 391 can be defined by any linear, linear-quadratic and/or nonlinear smooth function, including either convex and/or non-convex functions.

FIG. 4A illustrates the approach of an interior point optimization algorithm to solve the constrained optimal control structured quadratic programming problem (OCP-QP) 370, in some embodiments, by iteratively solving a smoothened system of necessary optimality conditions using a Newton-type solution strategy for a converging sequence of barrier relaxation parameter values 400. The necessary optimality conditions 400, sometimes referred to as the Karush-Kuhn-Tucker (KKT) conditions, can include one or multiple stationarity conditions 401, one or multiple conditions of primal feasibility with respect to the equality constraints 402, one or multiple conditions of primal feasibility with respect to the inequality constraints 403, one or multiple dual feasibility conditions 405 and one or multiple complementarity conditions 404.

Some embodiments are based on the realization that the relaxed, smoothened system of necessary optimality conditions 400 for the constrained optimal control structured quadratic programming problem (OCP-QP) 370 is defined by block-structured sparse OCP-QP data 345, consisting of OCP-QP vectors 347 and OCP-QP matrices 346 in the form of block-structured sparse Hessian and constrain Jacobian matrices 410. In some embodiments, the interior point optimization algorithm uses block-sparse structure exploiting linear algebra operations to reduce the computational complexity of implementing a Newton-type method for solving the sequence of smoothened systems of necessary optimality conditions 400.

In FIG. 4A, the optimization variables $z=[x_0, u_0, x_1, u_1, \ldots, x_{N-1}, u_{N-1}, x_N]$ include both the state and control input variables of the constrained optimal control structured quadratic programming problem (OCP-QP) 370. The dual variables $\lambda=[\lambda_0, \lambda_1, \ldots, \lambda_N]$ denote the Lagrange multipliers with respect to the equality constraints at each time step k over the control horizon, e.g., the initial state value condition 372 and the equality constraints that impose the system dynamics 373. The dual variables $\mu=[\mu_0, \mu_1, \ldots, \mu_N]$ denote the Lagrange multipliers with respect to the inequality constraints at each time step k over the control horizon, e.g., the linear inequality constraints 374, and $s=[s_0, s_1, \ldots, s_N]$ denote the slack variables corresponding to the inequality constraints. The matrices M and S are diagonal matrices defined, respectively, by the dual variables $\mu$ and the slack variables s on the diagonal, and the variable $\tau$ denotes the parameter value for the barrier-type relaxation of the system of necessary optimality conditions.

Some embodiments use a relaxation for the system of necessary optimality conditions that is different from using a logarithmic barrier function, resulting in one or multiple smoothened sets of nonlinear equations that can be solved by the Newton-type method in embodiments. Some embodiments are based on the realization that a solution to the constrained optimal control structured quadratic program (OCP-QP) 370 needs to be a solution to the smoothened system of necessary optimality conditions 400 as the barrier parameter value in the complementarity conditions 404 approaches zero, i.e., for increasingly small barrier parameter value $\tau>0$ and $\tau \to 0$.

Figure 4B:
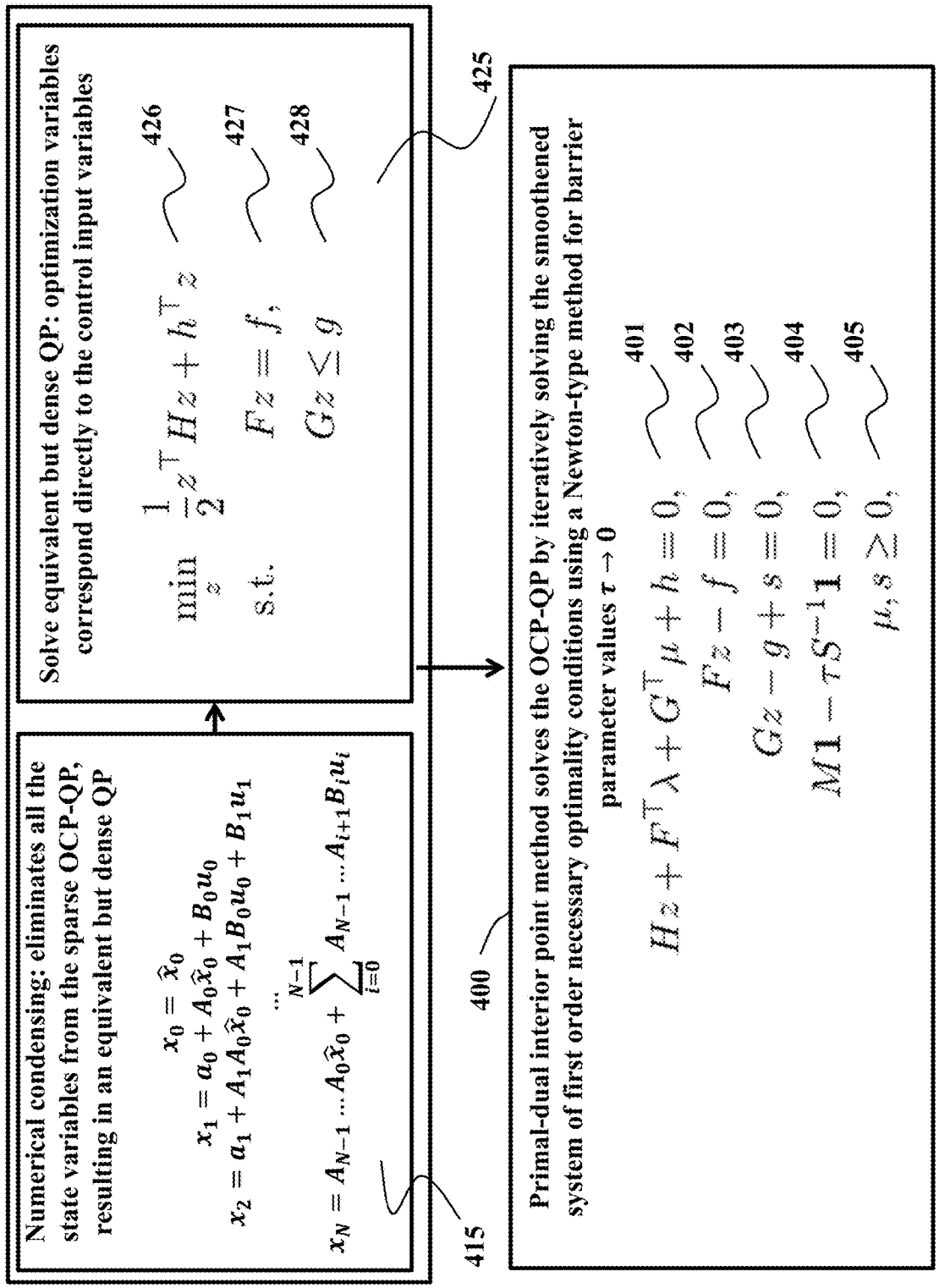
FIG. 4B illustrates a dense interior point optimization algorithm to solve the constrained optimal control structured quadratic program (OCP-QP) by solving an equivalent but dense QP after numerical condensing of the state variables.

FIG. 4B illustrates an embodiment that uses a dense interior point optimization algorithm to solve the constrained optimal control structured quadratic programming problem (OCP-QP) 370 by solving an equivalent but dense QP after the use of a condensing routine to numerically eliminate one or multiple of the state variables in the set of optimization variables from the sparse optimal control structured OCP-QP.

Some embodiments are based on the realization that the initial state value condition and the equality constraints that impose the system dynamics can be used to write one or multiple of the state variables as a function of only control input variables or as a function of the control input variables and one or multiple of the other state variables. When solving the optimal control structured quadratic program (OCP-QP) 370, the initial state value condition 372 and the linear equality constraints that impose the system dynamics 373 can be used to write the state variables at each time step as a linear function of one or multiple of the control input variables at the prior time steps over the control horizon 415.

Some embodiments are based on the realization that the recursive definition of the state variables as a function of control input variables can be used to reformulate the block-sparse OCP-QP 370 as an equivalent but dense quadratic programming problem 425, for which the optimization variables correspond directly to the control input variables. The equivalent but dense QP 425 consists of a linear-quadratic objective function 426 subject to linear equality constraints 427 and/or linear inequality constraints 428. In some embodiments, the equivalent but dense QP 425 is solved by a primal-dual interior point optimization algorithm by iteratively solving a relaxed, smoothened system of necessary optimality conditions using a Newton-type solution strategy for a converging sequence of barrier parameter values 400.

In FIG. 4B, the optimization variables $z=[u_0, u_1, \ldots, u_{N-1}]$ include only the control input variables of the constrained optimal control structured quadratic programming problem (OCP-QP) 370. The dual variables $\lambda$ denote the Lagrange multipliers with respect to the equality constraints 427. The dual variables $\mu$ denote the Lagrange multipliers with respect to the inequality constraints 428 and s denote the slack variables corresponding to the inequality constraints 428. The matrices M and S are diagonal matrices defined, respectively, by the dual variables $\mu$ and the slack variables s on the diagonal, and the variable $\tau$ denotes the parameter value for the barrier-type relaxation of the system of necessary optimality conditions.

Figure 5A:
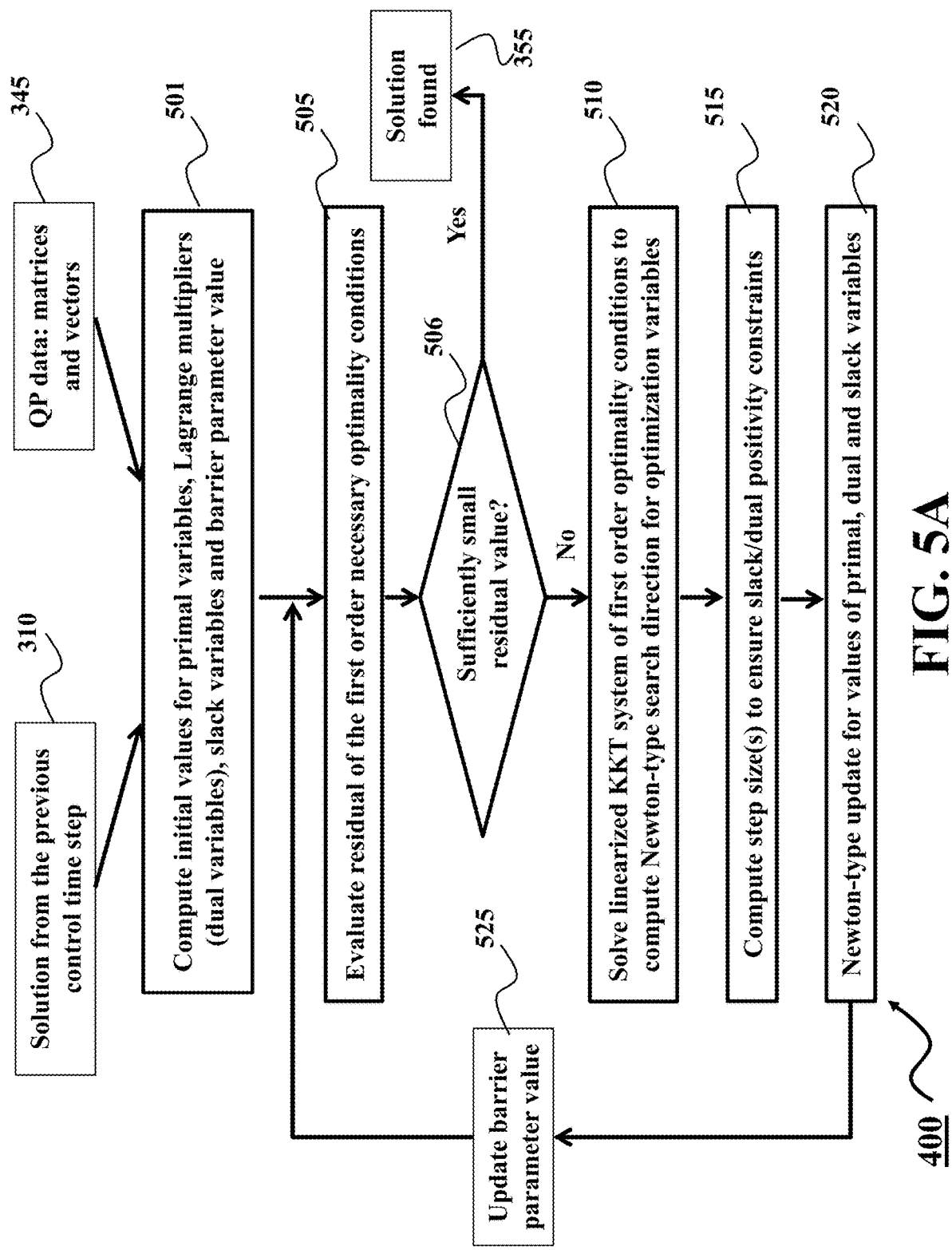
FIG. 5A is a block diagram of the iterative procedure of an interior point optimization algorithm to solve constrained optimal control problems in an implementation of the predictive control system according to some embodiments.

FIG. 5A shows a block diagram of the initialization step and the iterative procedure of an interior point optimization algorithm to solve constrained optimal control problems in an implementation of the predictive control system 400. The initialization step can use the optimal or approximate solution from the previous control time step 310 and/or the OCP-QP data 345 to compute initial values for the primal optimization variables, the Lagrange multipliers (dual variables) with respect to equality and inequality constraints, the slack variables for the inequality constraints and an initial barrier parameter value 501.

Based on the initialization of the values for the optimization variables 501, an iterative procedure of the interior point optimization algorithm aims to make the residual value of the first order necessary optimality conditions sufficiently small 506, in which case the (approximately) optimal solution is found 355. The iterative procedure starts by evaluating the residual vector of the first order necessary optimality conditions 505, and it then checks whether a norm of the residual vector is sufficiently small with respect to a tolerance value 506. The (approximately) optimal solution is found 355 and the iterative procedure terminates if the residual value is sufficiently small but the iterative procedure continues if a norm of the residual vector is too large and the number of iterations of the interior point optimization algorithm has not yet reached a maximum value.

The iterative procedure of the interior point optimization algorithm 400 continues by solving a linearized system of Karush-Kuhn-Tucker (KKT) conditions, further referred to as a linearized KKT system, for the set of first order optimality conditions to compute a Newton-type search direction 510 for the optimal values of the optimization variables in the constrained optimal control problem for an implementation of the predictive control system. Next, the iterative procedure computes a step size in the Newton-type search direction that ensures the positivity of the slack variables and of the Lagrange multipliers (dual variables) with respect to the inequality constraints 515. In some embodiments, the step size is computed as the largest positive value that is smaller than one in the Newton-type search direction that ensures the positivity of the slack variables and of the Lagrange multipliers with respect to the inequality constraints 515.

Based on the Newton-type search direction 510 and the computed step size 515, the iterative procedure of the interior point optimization algorithm continues by updating the values for the primal optimization variables, for the Lagrange multipliers (dual variables) and for the slack variables 520. Given the new solution guess for the optimization variables, an update to the barrier parameter value 525 can be computed such that the new residual vector of the first order necessary optimality conditions 505 can be evaluated. The iterative procedure of the interior point optimization algorithm continues until the residual value is sufficiently small 506, and the (approximately) optimal solution is found 355, or until a maximum number of interior point iterations has been reached.

Figure 5B:
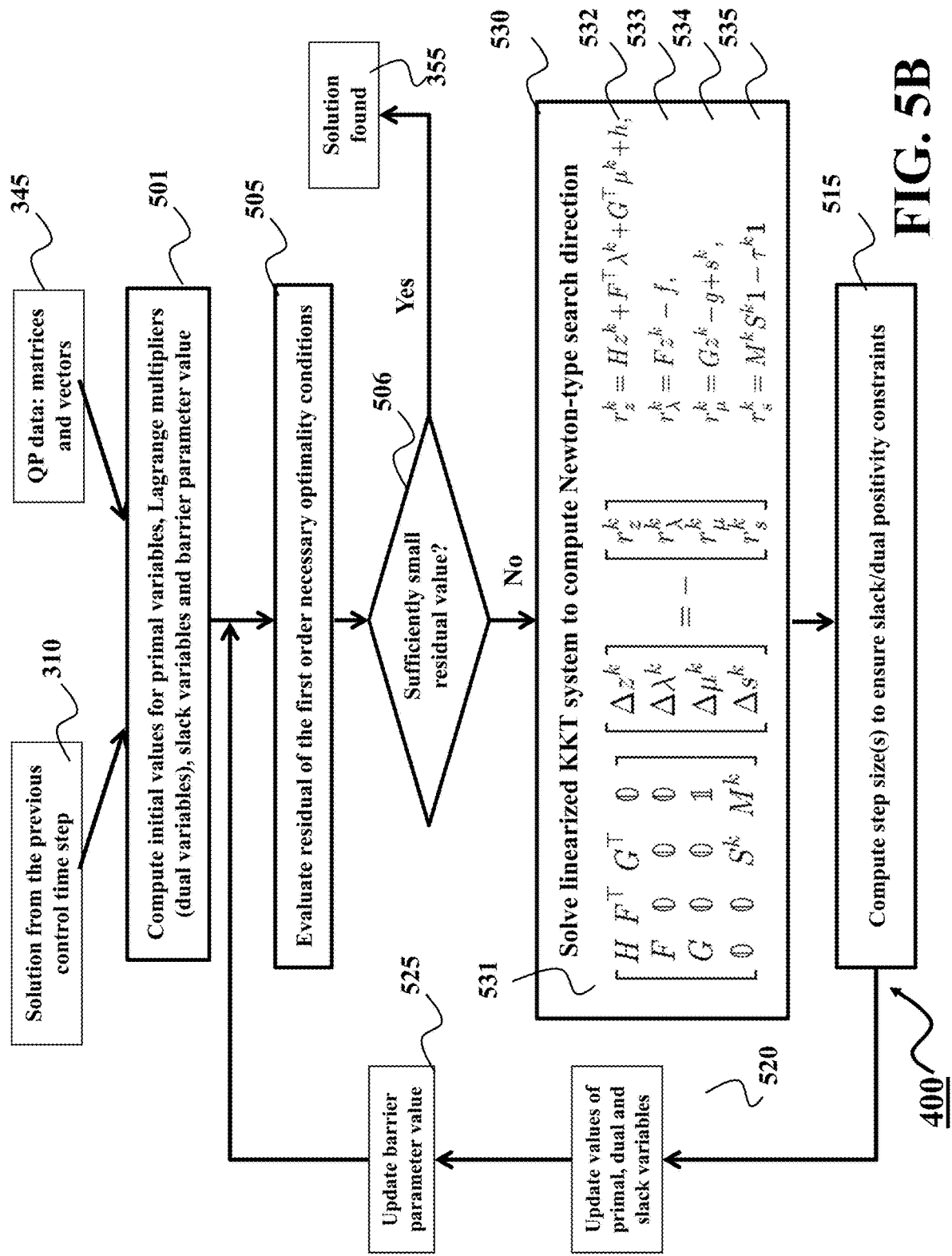
FIG. 5B is a block diagram of the linearized KKT system to compute a Newton-type search direction in the iterative procedure of an interior point optimization algorithm to solve constrained OCP-QPs according to some embodiments.

FIG. 5B shows a block diagram of the linearized KKT system to compute a Newton-type search direction 530 in the iterative procedure of an interior point optimization algorithm to solve constrained OCP-QPs according to some embodiments. The linearized system of KKT conditions can be represented as a block-structured linear system of equations 531 that defines the Newton-type search direction for the primal optimization variables $\Delta z^k$, the Lagrange multipliers (dual variables) with respect to the equality constraints $\Delta \lambda^k$, the Lagrange multipliers (dual variables) with respect to the inequality constraints $\Delta \mu^k$ and the Newton-type search direction for the slack variables $\Delta s^k$ in the $k^{th}$ iteration of the interior point optimization algorithm. The right-hand side vector of the linear KKT system 531 consists of the evaluation of the stationarity conditions 532, the evaluation of the primal feasibility with respect to the equality constraints 533, the evaluation of the primal feasibility with respect to the inequality constraints 534 and the evaluation of the relaxed complementarity conditions 535 in the $k^{th}$ iteration of the interior point optimization algorithm.

Some embodiments are based on the realization that the relaxed complementarity conditions 535, for a nonzero barrier parameter value $\tau^k > 0$, correspond more closely to the exact complementarity conditions for increasingly small values of the barrier parameter $\tau^k \to 0$ for successive iterations of the interior point optimization algorithm.

Figure 5C:
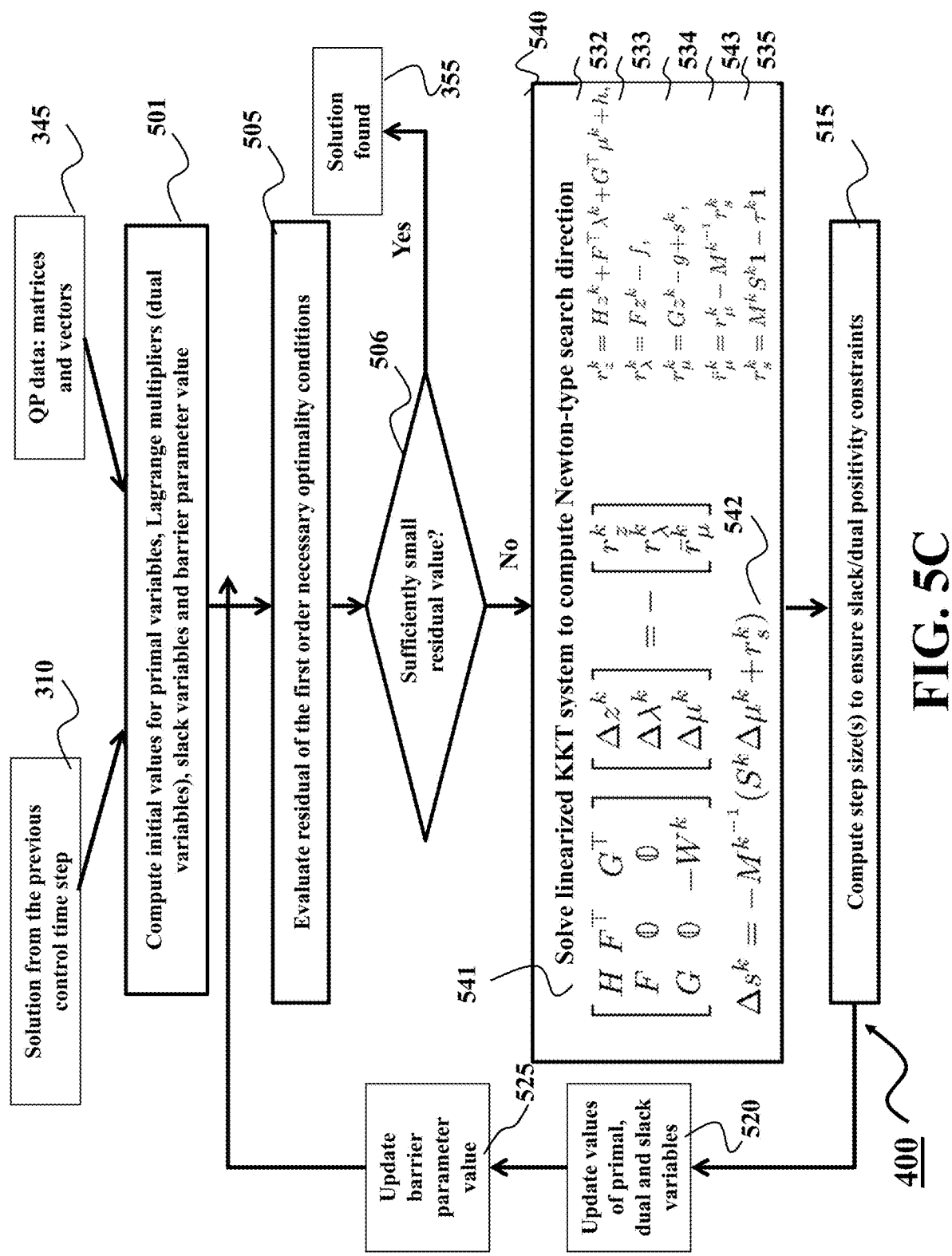
FIG. 5C is a block diagram of a decomposition of the linearized KKT system into a sequence of two subsystems in the interior point optimization algorithm to solve constrained OCP-QPs according to some embodiments.

FIG. 5C shows a block diagram of a decomposition of the linearized KKT system to compute a Newton-type search direction 540 into a sequence of two subsystems in the interior point optimization algorithm to solve constrained OCP-QPs. Some embodiments are based on the realization that the linearized KKT system can be decomposed into one symmetric linear subsystem 541 to compute the Newton-type search direction for the primal optimization variables $\Delta z^k$, the Lagrange multipliers (dual variables) with respect to the equality constraints $\Delta \lambda^k$ and the Newton-type search direction for the Lagrange multipliers (dual variables) with respect to the inequality constraints $\Delta \mu^k$. Solving the latter symmetric linear subsystem 541 can then be followed by solving a diagonal linear system 542 to compute the Newton-type search direction for the slack variables $\Delta s^k$ in the $k^{th}$ iteration of the interior point optimization algorithm.

The right-hand side vector of the first symmetric linear KKT system 541 consists of the evaluation of the stationarity conditions 532, the evaluation of the primal feasibility with respect to the equality constraints 533 and a modified variant 543 of the evaluation of the primal feasibility with respect to the inequality constraints 534 due to the Newton-type search direction for the slack variables $\Delta s^k$. Similarly, the right-hand side vector of the diagonal linear system 542 consists of the evaluation of the relaxed complementarity conditions 535 in addition to a contribution that is due to the Newton-type search direction for the Lagrange multipliers (dual variables) with respect to the inequality constraints $\Delta \mu^k$.

Some embodiments are based on the realization that the first symmetric linear KKT system 541 can be solved either based on iterative linear algebra routines or using a direct factorization or decomposition of the symmetric, sparse and block-structured KKT matrix on the left-hand side of the system. In addition, some embodiments are based on the realization that each of the equations in the diagonal linear system 542 can be solved independently based on a single scalar division, due to the diagonal sparsity structure of the matrix $M^k$ that is defined by the Lagrange multipliers (dual variables) with respect to the inequality constraints $\mu^k$ on the diagonal for the $k^{th}$ iteration of the interior point optimization algorithm.

Figure 6A:
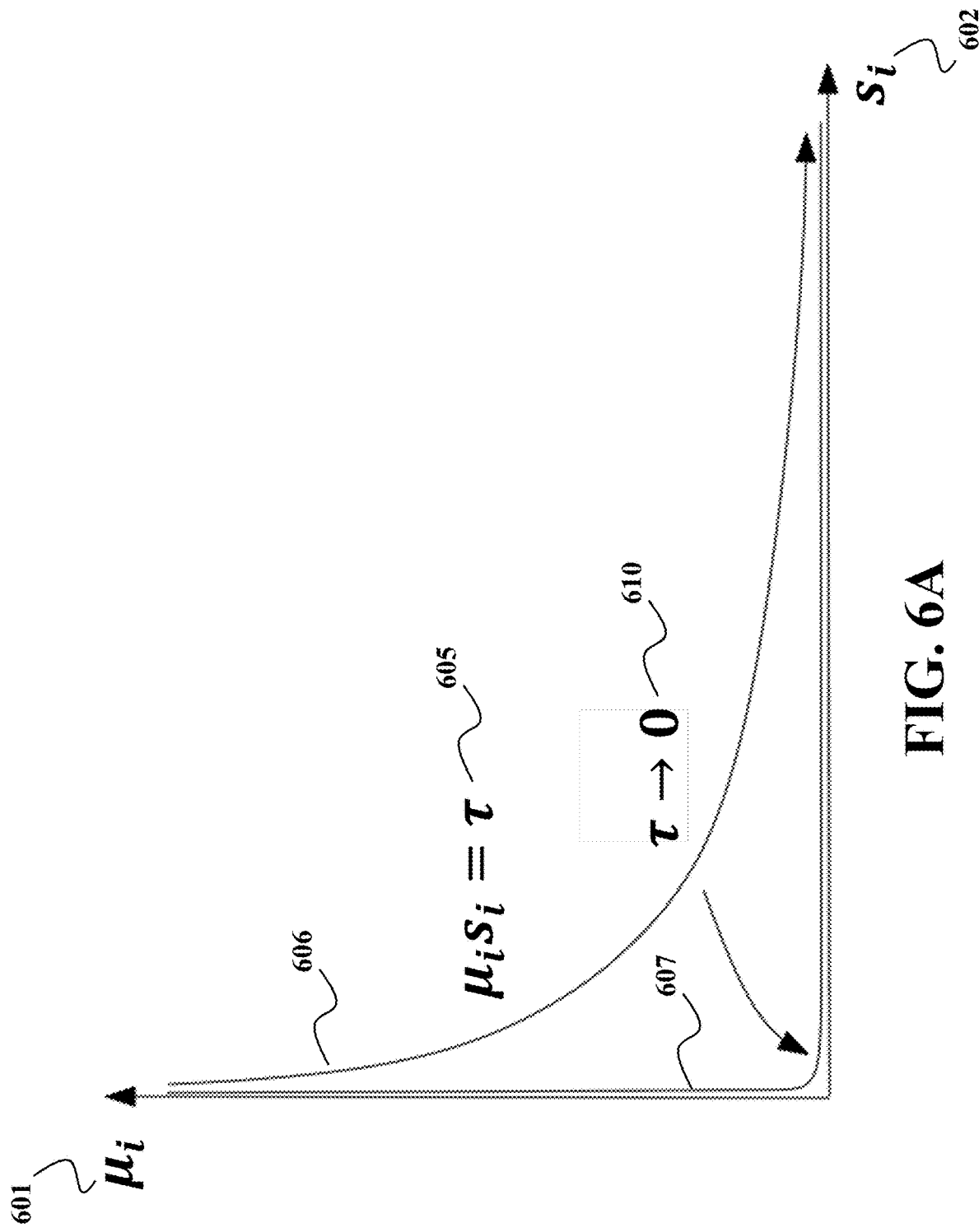
FIG. 6A shows a schematic of the relaxed, smoothened complementarity conditions in the interior point optimization algorithm to solve the constrained OCP.

FIG. 6A shows a schematic of the relaxed, smoothened complementarity condition $\mu_i s_i = \tau$ 605 for each $i^{th}$ inequality constraint in the constrained optimal control structured optimization problem. The original complementarity condition $\mu_i s_i = 0$, with respect to the $i^{th}$ inequality constraint in the constrained OCP, results in a non-smooth solution manifold by imposing either the Lagrange multiplier (dual variable) $\mu_i$ 601 or the slack variable $s_i$ 602 to be equal to zero, or both variables to be equal to zero such that the condition $\Xi_i s_i = 0$ holds. Instead, the relaxed complementarity condition $\Xi_i s_i = \tau$ 605 corresponds to a smooth manifold 606 of values for the Lagrange multiplier $\mu_i$ 601 or the slack variable $s_i$ 602, resulting in a sufficiently accurate but smooth manifold 607 for a sufficiently small value of the barrier parameter value $\tau > 0$.

Some embodiments are based on the realization that the relaxed, smoothened complementarity condition $\Xi_i s_i = \tau$ 605 provides an approximation to the original complementarity condition $\Xi_i s_i = 0$ that is increasingly accurate for an increasingly small value of the barrier parameter value $\tau \to 0$ 610 in a sequence of subsequent iterations of the interior point optimization algorithm. As a result, some embodiments are based on the realization that either $\mu_i \to 0$, $s_i \to 0$ or both $\mu_i \to 0$ and $s_i \to 0$ for each $i^{th}$ inequality constraint for an increasingly small value of the barrier parameter value $\tau \to 0$ 610 in a sequence of subsequent iterations of the interior point optimization algorithm to solve the constrained optimal control structured optimization problem.

Figure 6B:
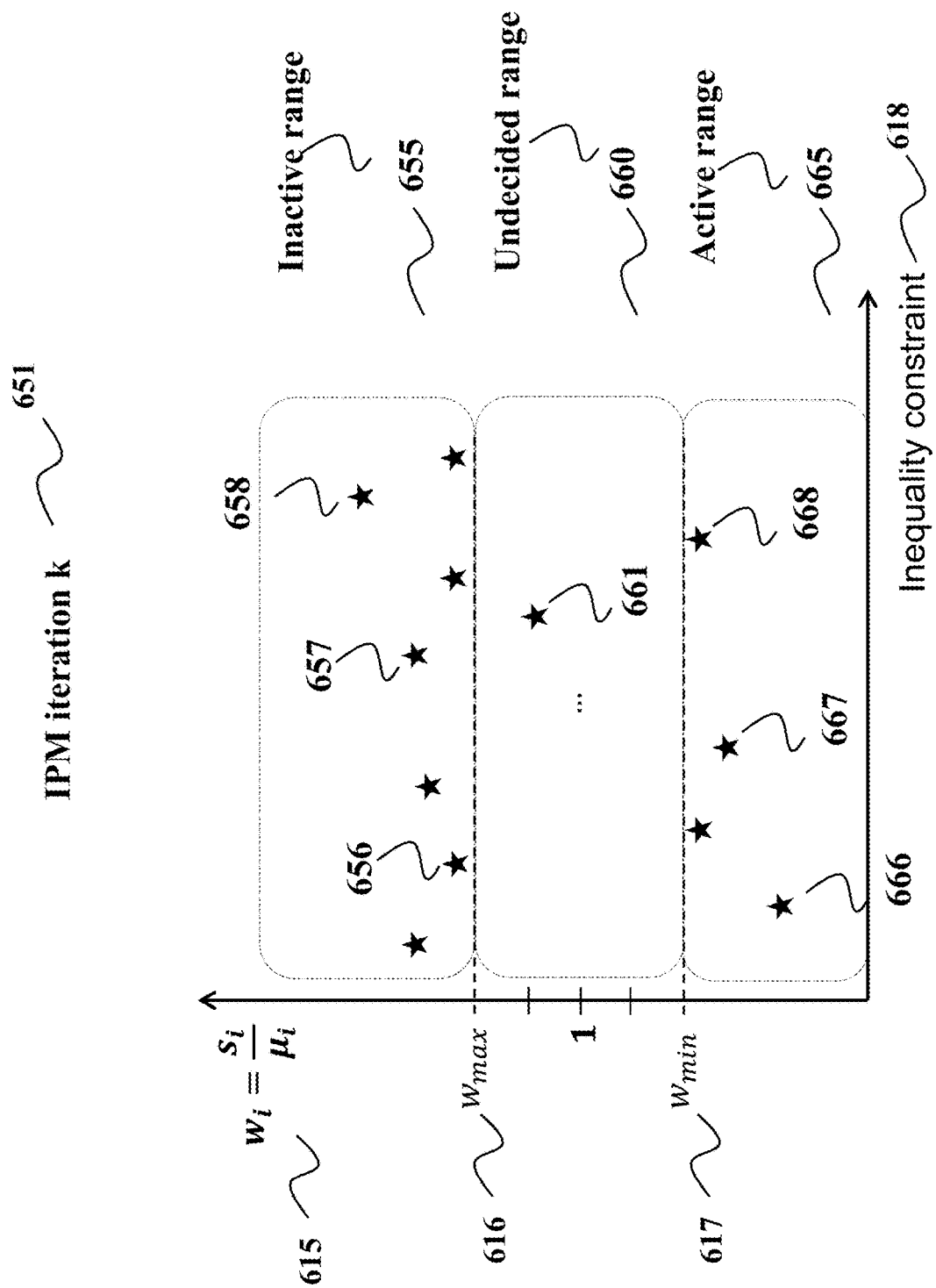
FIG. 6B shows a schematic of classification of the inequality constraints within an inactive, undecided or active classification range, based on the corresponding w-value at the $k^{th}$ iteration of the interior point optimization method (IPM)

FIG. 6B shows a schematic of classification for each of the inequality constraints, based on the corresponding ratio $$w_i = \frac{s_i}{\mu_i} > 0 \; 615$$

between the value for the slack variable $s_i > 0$ 602 and the value for the Lagrange multiplier $\mu_i > 0$ 601, at the $k^{th}$ iteration of the interior point optimization method (IPM) 651 to solve the constrained OCP. The figure shows the w-value 615 for each of the inequality constraints 618 in the optimal control problem at the $k^{th}$ iteration of the interior point optimization method (IPM) 651.

An inequality constraint is considered "active" at the optimal solution of the optimal control structured optimization problem if the inequality constraint holds with equality sign for the optimal values of the optimization variables. An inequality constraint is considered "inactive" at the optimal solution of the optimal control structured optimization problem if the inequality constraint holds with inequality sign for the optimal values of the optimization variables.

Some embodiments are based on the realization that the w-value grows larger and larger until infinity, i.e., $w_i \to \infty$, for an inequality constraint that is inactive at the optimal solution because the slack variable $s_i > 0$ is nonzero and the corresponding Lagrange multiplier value remains positive but becomes smaller and smaller towards zero, i.e., $\mu_i \to 0$, in a sequence of subsequent iterations of the interior point optimization algorithm. Some embodiments are based on the realization that the w-value remains positive but it becomes smaller and smaller towards zero, i.e., $w_i \to 0$, for an inequality constraint that is active at the optimal solution because the Lagrange multiplier value $\mu_i > 0$ is nonzero and the corresponding value for the slack variable remains positive but becomes smaller and smaller towards zero, i.e., $s_i \to 0$, in a sequence of subsequent iterations of the interior point optimization algorithm.

Some embodiments are based on the realization that each of the inequality constraints 618, at the $k^{th}$ iteration of the interior point optimization method (IPM) 651 to solve the OCP, can be classified in either one of three classification ranges, i.e., the inactive range 655, the undecided range 660 and the active range 665. In some embodiments, the inactive range 655 corresponds to all inequality constraints for which the w-value is larger than or equal to a maximum threshold value $w_i \geq w_{max}$ 616. In some embodiments, the active range 665 corresponds to all inequality constraints for which the w-value is smaller than or equal to a minimum threshold value $w_i \leq w_{min}$ 617. In some embodiments, the undecided range 660 includes all remaining inequality constraints and therefore corresponds to each constraint for which the w-value is larger than the minimum threshold $w_{min}$ 617 but smaller than the maximum threshold value $w_{max}$ 616, i.e., $w_{min} < w_i < w_{max}$.

In FIG. 6B, examples of inequality constraints in the inactive range are denoted by 656, 657 and 658 because their corresponding w-value is larger than or equal to a maximum threshold value $w_i \geq w_{max}$ 616. Similarly, examples of inequality constraints in the active range are denoted by 666, 667 and 668 because their corresponding w-value is smaller than or equal to a minimum threshold value $w_i \leq w_{min}$ 617. An example of an inequality constraint in the undecided range is denoted by 661 because its corresponding w-value is larger than the minimum threshold $w_{min}$ 617 but smaller than the maximum threshold value $w_{max}$ 616, i.e., $w_{min} < w_i < w_{max}$.

Some embodiments are based on the realization that an inequality constraint with a larger w-value is more likely to be inactive, given the solution guess at the $k^{th}$ iteration of the IPM, within the inactive classification range 655. In FIG. 6B, for example, constraint 657 is more likely to be inactive than constraint 656 and constraint 658 is more likely to be inactive than constraint 656 and 657, given the solution guess at the $k^{th}$ iteration of the IPM.

Some embodiments are based on the realization that an inequality constraint with a smaller w-value is more likely to be active, given the solution guess at the $k^{th}$ iteration of the IPM, within the active classification range 665. In FIG. 6B, for example, constraint 667 is more likely to be active than constraint 668 and constraint 666 is more likely to be active than constraint 667 and 668, given the solution guess at the $k^{th}$ iteration of the IPM.

Figure 6C:
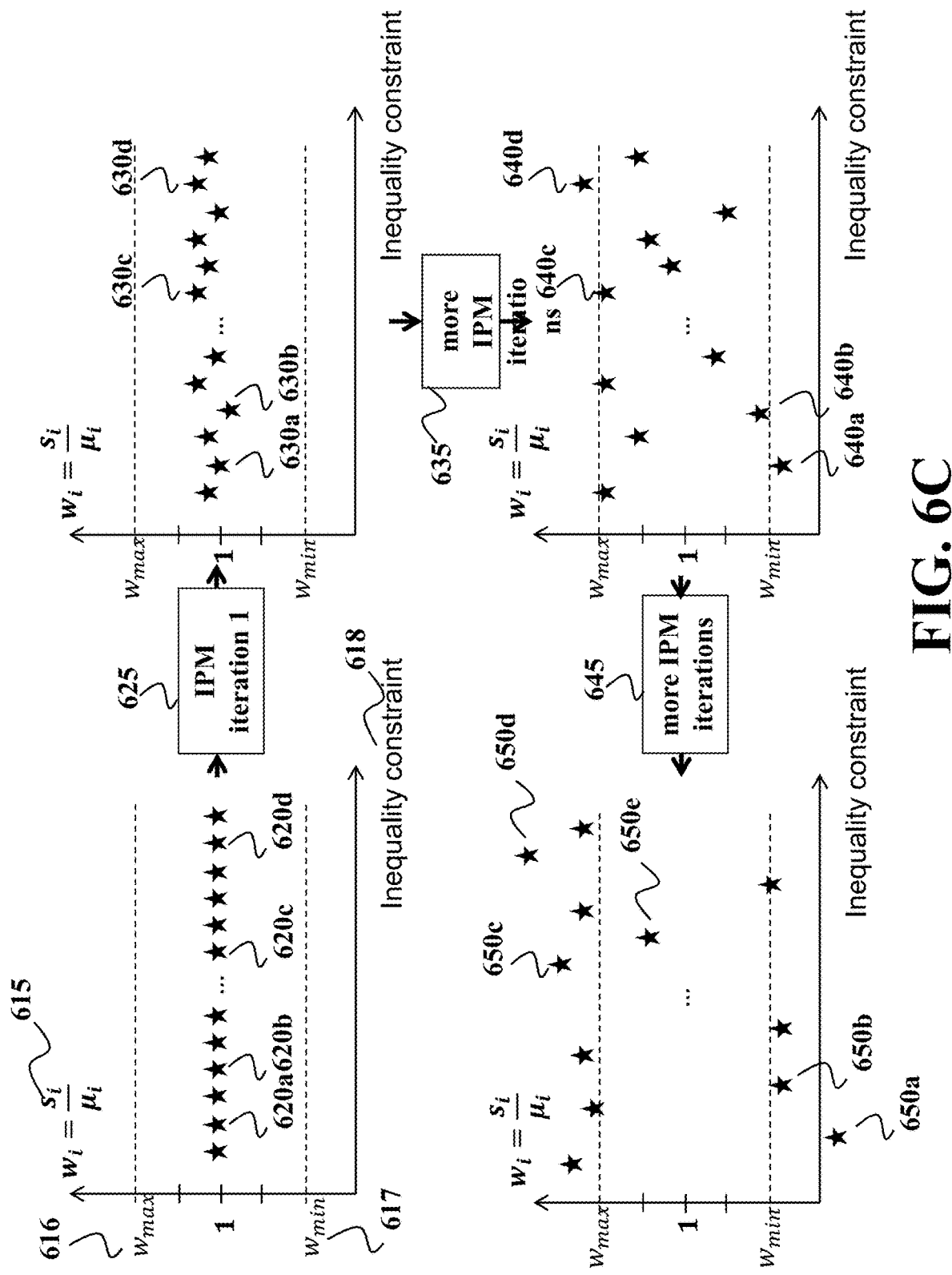
FIG. 6C shows a schematic of distributions of w-values for each of the inequality constraints at different iterations of the interior point optimization algorithm to solve the constrained optimal control problems in the predictive controller.

FIG. 6C shows a schematic of a distribution of w-values, one w-value for each of the inequality constraints, at different iterations of the interior point optimization algorithm to solve the constrained optimal control problems in the predictive control system according to embodiments. At different iterations of the interior point optimization algorithm, each inequality constraint belongs either to the inactive 655, the undecided 660 or the active classification range 665. If the iterations of the interior point optimization algorithm converge to the optimal solution of the constrained optimal control problem, then the constraint classification for each of the inequality constraints corresponds to the correct set of active and inactive inequality constraints at the optimal control solution. In some embodiments, even after the interior point optimization algorithm converges to a sufficiently accurate solution, one or multiple of the inequality constraints could still be classified to be in the undecided range. Constraints that are in the undecided classification range can be either active or inactive at the optimal solution and therefore need to be taken into account in the linearized KKT system solution to compute the Newton-type search direction 510.

Before the first IPM iteration 625, an initialization step of the IPM can use the optimal or approximate solution from the previous control time step 310 and/or the OCP-QP data 345 to compute initial values for the primal optimization variables, the Lagrange multipliers (dual variables) with respect to equality and inequality constraints, the slack variables for the inequality constraints and an initial barrier parameter value 501. The initialization step therefore results in an initial set of w-values for each of the inequality constraints. In FIG. 6C, for example, all w-values are initialized to be close to a value of 1 in the undecided classification range, e.g., the w-values for the constraints denoted by 620a, 620b, 620c and 620d are equal to each other and identified to be in the undecided range.

Each IPM iteration updates the values of the primal, dual and slack variables 520 resulting in updated w-values for each of the inequality constraints. After the first IPM iteration 625, FIG. 6C illustrates the w-values for the constraints denoted by 630a, 630b, 630c and 630d, which can be compared relatively with corresponding initial w-values denoted by 620a, 620b, 620c and 620d. Some embodiments are based on the realization that an inequality constraint with a relatively larger w-value is more likely to be inactive while an inequality constraint with a relatively smaller w-value is more likely to be active, given the solution guess at the $k^{th}$ iteration of the IPM. For example, FIG. 6C illustrates that constraints 630a and 630b are more likely to be active than constraints 630c and 630d, while constraints 630c and 630d are more likely to be inactive than constraints 630a and 630b, based on the first IPM iteration 625.

After doing one or multiple IPM iterations 635, some of the constraints could be identified to be in the active, undecided or inactive classification range. For example, FIG. 6C illustrates the w-values of the inequality constraints such as, e.g., the w-values denoted by 640a, 640b, 640c and 640d. More specifically, constraint 640a is identified to be in the active classification range, constraint 640d is identified to be in the inactive classification range while constraints 640b and 640c are identified to be in the undecided classification range. However, based on the w-values as illustrated in FIG. 6C, constraint 640c is more likely to be inactive and constraint 640b is more likely to be active, based on the current values of the primal, dual and slack variables in the IPM.

After doing one or multiple additional IPM iterations 645, the iterative procedure of the interior point optimization algorithm could have converged to a sufficiently accurate solution of the constrained optimal control problem. FIG. 6C illustrates the w-values of the inequality constraints corresponding to the (approximately) optimal control solution, in which most of the inequality constraints are correctly identified to be either inside the active or inactive classification range. For example, constraints 650a and 650b are identified to be in the active classification range, and constraints 650c and 650d are identified to be in the inactive classification range. However, in some embodiments, one or multiple of the inequality constraints could remain in the undecided classification range such as, e.g., constraint 650e, even after convergence of the iterative procedure of the interior point optimization algorithm.

Figure 6D:
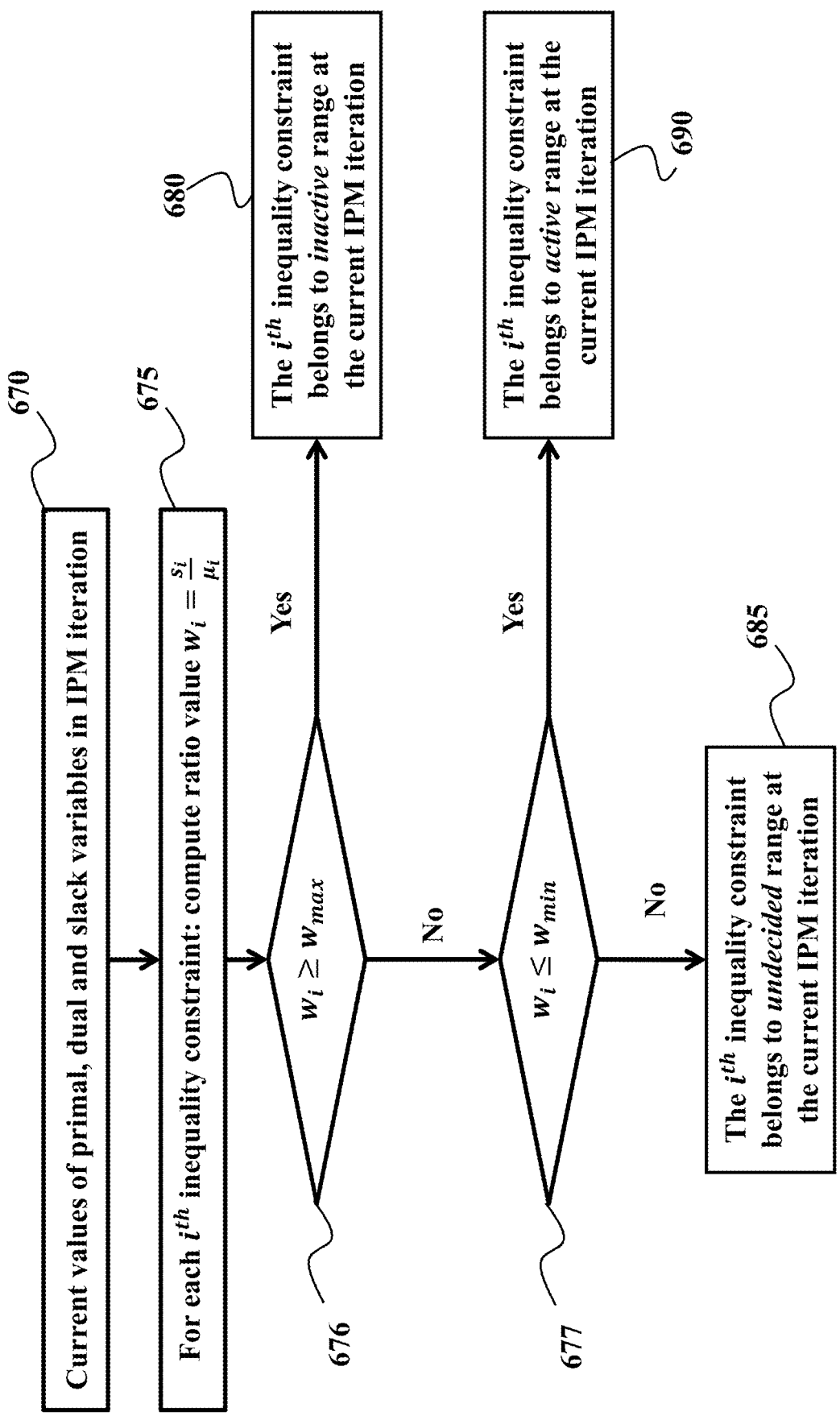
FIG. 6D shows a block diagram of the inequality constraint classification procedure in the interior point optimization algorithm according to some embodiments.

FIG. 6D shows a block diagram of the inequality constraint classification procedure in the interior point optimization algorithm according to some embodiments. Based on the current values of the primal, dual and slack variables in the IPM iteration 670, the w-ratio value $$w_i = \frac{s_i}{\mu_i}$$

is computed for each of the inequality constraints 675. Based on the w-value $w_i$, the $i^{th}$ inequality constraint is identified to be in the inactive classification range at the current IPM iteration 680 if the w-value of the $i^{th}$ inequality constraint is larger than or equal to a maximum threshold value $w_i \geq w_{max}$ 676. The $i^{th}$ inequality constraint is identified to be in the active classification range at the current IPM iteration 690 if the w-value of the $i^{th}$ inequality constraint is smaller than or equal to a minimum threshold value $w_i \leq w_{min}$ 677. If the w-value of the $i^{th}$ inequality constraint does not satisfy condition $w_i \geq w_{max}$ 676 nor does it satisfy condition $w_i \leq w_{min}$ 677, then the $i^{th}$ inequality constraint is identified to be in the undecided classification range 685 and the corresponding w-value lies in between the minimum 617 and maximum 616 threshold value, i.e., $w_{min} < w_i < w_{max}$.

Figure 7A:
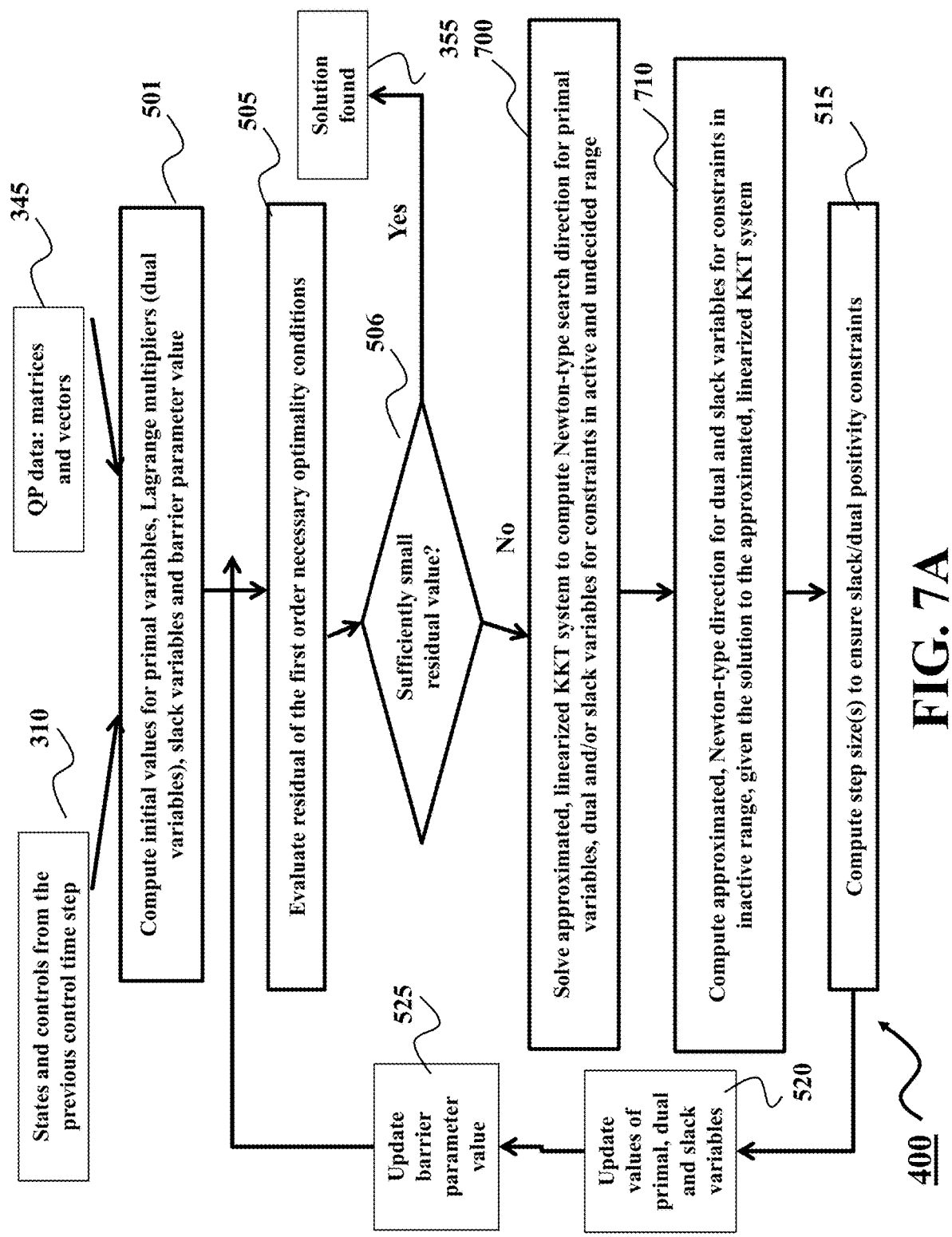
FIG. 7A shows a block diagram of the interior point optimization algorithm, based on the inequality constraint classification, to construct an approximated, linearized KKT system to compute the Newton-type search direction.

FIG. 7A shows a block diagram of the initialization step and the iterative procedure of an interior point optimization algorithm, in which the linearized KKT system solution 510 is obtained approximately by computing a first Newton-type search direction for the primal variables, dual variables with respect to the equality constraints and for dual and/or slack variables for inequality constraints in the active and undecided classification range 700, followed by a procedure to compute a second Newton-type search direction of dual and slack variables for constraints in the inactive classification range 710, according to embodiments.

Some embodiments are based on the realization that the total computational cost of both the solution of the first approximated, linearized KKT system taking into account constraints that are in the active and undecided classification range 700 and the cost of computing the second approximated, Newton-type search direction of dual and slack variables for constraints in the inactive classification range 710 is smaller than the computational cost of solving the original linearized KKT system taking into account all inequality constraints 510. Therefore, the inequality constraint classification procedure in the interior point optimization algorithm, according to some embodiments, enables a considerable reduction of the computational cost of solving the constrained optimal control optimization problems in the predictive control system.

Some embodiments are based on the realization that the choice of the minimum threshold $w_{min}$ 617 and maximum threshold value 616 determines a tradeoff between the computational cost and the accuracy of the Newton-type search direction for the primal, dual and slack variables. Specifically, more inequality constraints are identified to be in the undecided classification range when increasing the maximum threshold value $w_{max}$ 616 and/or decreasing the minimum threshold value $w_{min}$ 617, resulting in an increased accuracy of the Newton-type search direction and therefore resulting in accelerated convergence properties of the interior point optimization algorithm at the cost of an increased computational burden. Alternatively, more inequality constraints are identified to be in the active and/or inactive classification range when decreasing the maximum threshold value $w_{max}$ 616 and/or increasing the minimum threshold value $w_{min}$ 617, resulting in a decreased computational burden at the cost of a reduced accuracy of the Newton-type search direction and therefore resulting in slower convergence properties of the interior point optimization algorithm.

Figure 7B:
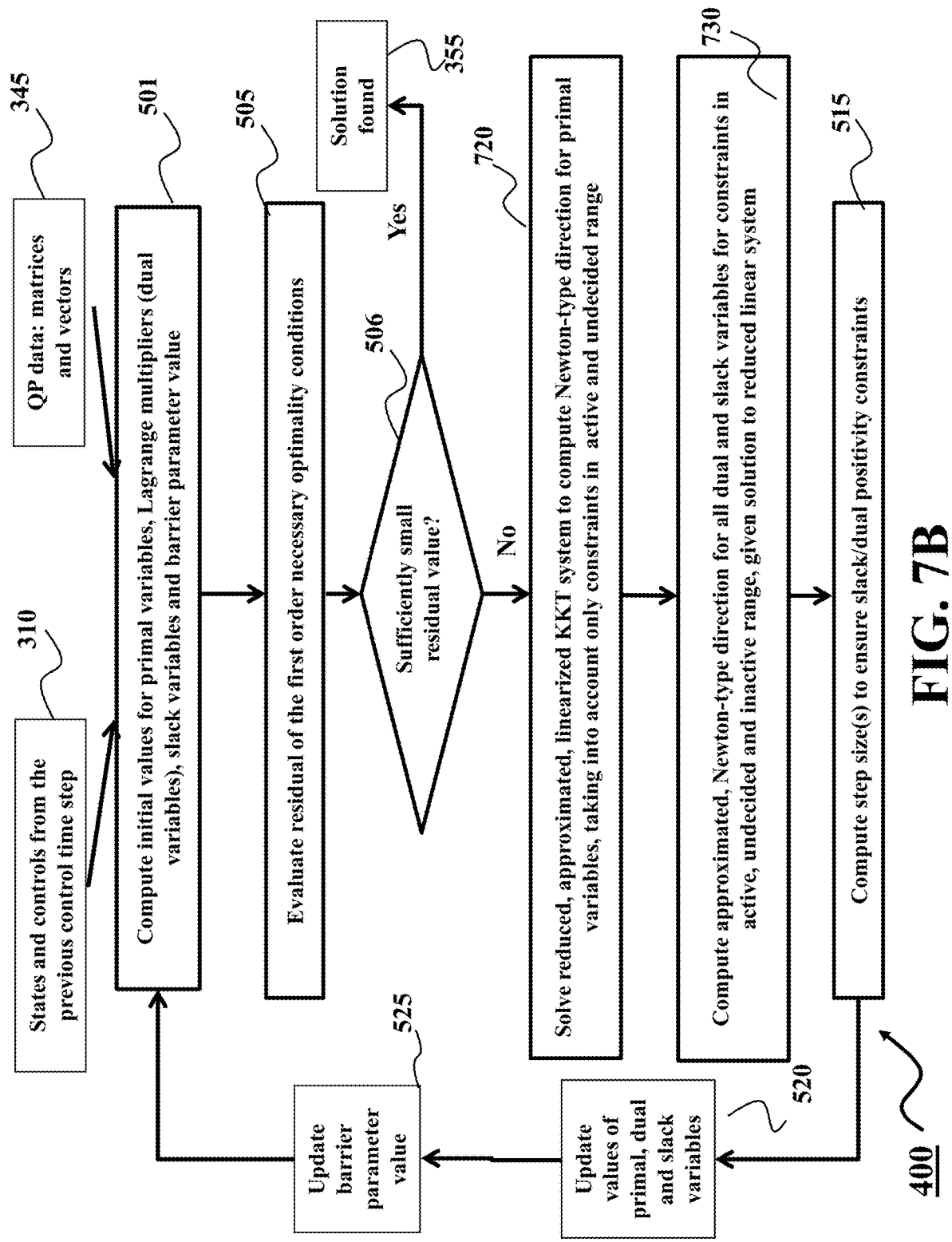
FIG. 7B shows a block diagram of the interior point optimization algorithm, based on the inequality constraint classification, to construct a reduced, approximated, linearized KKT system to compute the Newton-type search direction.

FIG. 7B shows a block diagram of an alternative approach to approximate the linearized KKT system solution 510 by solving a reduced, approximated, linearized KKT system to compute the first Newton-type search direction for only the primal variables, taking into account the equality constraints and only inequality constraints in the active and undecided classification range 720, followed by a procedure to compute the second approximated, Newton-type search direction of all the dual and slack variables for both equality and inequality constraints 730, including the inequality constraints in the active, undecided and in the inactive classification range, given the solution to the reduced linear system 720. In some embodiments, this subsequent solution of the reduced, linearized KKT system 720 followed by the computation of the corresponding Newton-type search direction of all dual and slack variables, enables an additional reduction of the computational cost when solving the constrained optimal control optimization problems in an implementation of the predictive control system.

Figure 8:
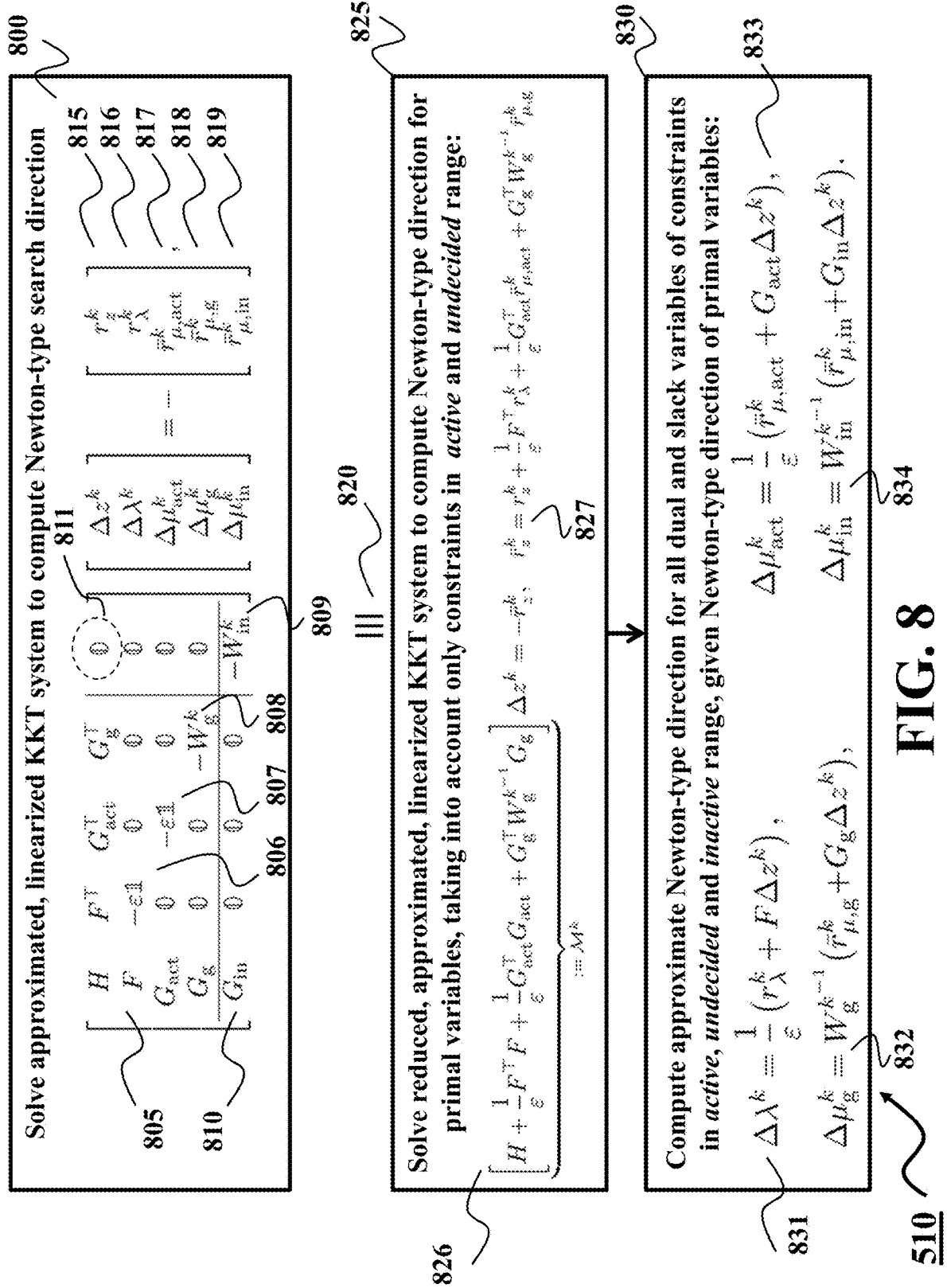
FIG. 8 shows the equations of an approximated, linearized KKT system to compute the Newton-type search direction in the IPM and its equivalence to the solution of a reduced linear system, followed by independent computations of the updates for the dual and slack variables, according to some embodiments.

FIG. 8 shows the equations of an approximated, linearized KKT system to compute the Newton-type search direction 800 in some embodiments, and its equivalence 820 to the solution of a reduced, approximated, linearized KKT system to compute the first Newton-type search direction for only the primal variables 825, taking into account the equality and only inequality constraints in the active and undecided classification range, followed by independent computations of the second approximated, Newton-type search direction of all the dual and slack variables for both equality and inequality constraints 830, including the step $\Delta \lambda^k$ 831 for the equality constraints, the step $\Delta \mu_{act}^k$ 833 for inequality constraints in the active, $\Delta \mu_g^k$ 832 for inequality constraints in the undecided and $\Delta \mu_{in}^k$ 834 for inequality constraints in the inactive range, given the solution $\Delta z^k$ for the primal variables in the reduced linear system 826.

Some embodiments are based on the realization that the inequality constraint classification procedure can be used to approximate the exactly linearized KKT system 541, resulting in an approximated, linearized KKT system to compute the Newton-type search direction 800 that enables an improved numerical conditioning as well as a considerable reduction of the cost of computing the Newton-type search direction in each iteration of the interior point optimization algorithm.

In FIG. 8, the equations of the approximated, linearized KKT system are represented by grouping the inequality constraints according to their constraint classification range, resulting in the step $\Delta \mu_{act}^k$ 833 for inequality constraints in the active, $\Delta \mu_g^k$ 832 for inequality constraints in the undecided and $\Delta \mu_{in}^k$ 834 for inequality constraints in the inactive range. Similarly, $G_{act}$ denotes the constraint Jacobian matrix for inequality constraints in the active, $G_g$ denotes the constraint Jacobian for inequality constraints in the undecided and $G_{in}$ denotes the constraint Jacobian for inequality constraints in the inactive range. The right-hand side is defined by the evaluation $r_z^k$ of the stationarity conditions 815, the evaluation $r_\lambda^k$ of the primal feasibility with respect to the equality constraints 816 and a modified variant of the evaluation of the primal feasibility with respect to the inequality constraints in the active $\bar{r}_{\mu,act}^k$ 817, in the undecided $\bar{r}_{\mu,g}^k$ 18 and in the inactive range $\bar{r}_{\mu,in}^k$ 819 due to the Newton-type step for the slack variables $\Delta s^k$.

Some embodiments are based on the realization that the approximated, linearized KKT system to compute the Newton-type search direction 800 can be decomposed in a sequence of two computationally cheaper subsystems, following the idea of neglecting the contribution of the inequality constraints in the inactive classification range to the stationarity conditions by replacing the constraint Jacobian matrix $G_{in}^T$ with a zero matrix 811. The resulting sequence of subsystems consists of an approximated, linearized KKT system 805 to compute the Newton-type search direction for the primal variables $\Delta z^k$, the Lagrange multipliers with respect to the equality constraints $\Delta \lambda^k$ and the Lagrange multipliers with respect to the inequality constraints in the active $\Delta \lambda_{act}^k$ and undecided range $\Delta \mu_g^k$, followed by a diagonal linear system 810

$$\Delta \mu_{in}^k = W_{in}^{k^{-1}}(\bar{r}_{\mu,in}^k + G_{in}\Delta z^k)$$

to compute the Newton-type search direction for the Lagrange multipliers with respect to the inequality constraints in the inactive range $\Delta \mu_{in}^k$.

In some embodiments, one or multiple additional approximations of the KKT matrix are performed to improve the numerical conditioning and reduce the computational cost of solving the approximated, linearized KKT system to compute the Newton-type search direction 800. For example, some embodiments are based on the realization that the diagonal elements on the KKT matrix that correspond to the Lagrange multipliers with respect to the equality constraints $\Delta \mu^k$ 806 and to the Lagrange multipliers with respect to the inequality constraints in the active $\Delta \mu_{act}^k$ range 807 can be arbitrarily close to zero and can result in numerical ill-conditioning of the linear system. Therefore, some embodiments approximate these diagonal elements on the KKT matrix by a small negative value $-\epsilon$, where the regularization parameter value $\epsilon > 0$ is chosen sufficiently large to improve the numerical conditioning and reduce the computational cost of solving the linear system, but the value is additionally chosen sufficiently small to result in a good approximation of the linearized KKT system that defines the original Newton-type search direction.

In some embodiments, the resulting approximated, linearized KKT system can read as follows:

$$\begin{bmatrix} H & F^T & G_{act}^T & G_g^T & 0 \\ F & -\epsilon 1 & 0 & 0 & 0 \\ G_{act} & 0 & -\epsilon 1 & 0 & 0 \\ G_g & 0 & 0 & -W_g^k & 0 \\ \hline G_{in} & 0 & 0 & 0 & -W_{in}^k \end{bmatrix} \begin{bmatrix} \Delta z^k \\ \Delta \lambda^k \\ \Delta \mu_{act}^k \\ \Delta \mu_g^k \\ \Delta \mu_{in}^k \end{bmatrix} = - \begin{bmatrix} r_z^k \\ r_\lambda^k \\ r_{\mu,act}^k \\ r_{\mu,g}^k \\ r_{\mu,in}^k \end{bmatrix},$$

in which the numerical approximations of the linearized KKT system to compute the Newton-type search direction in the IPM are encircled and they are additionally denoted by 806, 807 and 811 in FIG. 8. The matrices $w_g^k$ 808 and $w_{in}^k$ 809 are diagonal matrices with w-values on the diagonal, corresponding to the w-values of the inequality constraints, respectively, in the undecided and in the inactive classification range. In some embodiments, a lower and upper bounding of the w-values in one or multiple of the constraint classification ranges is performed to improve the numerical conditioning of the approximated, linearized KKT system to compute the Newton-type search direction.

In some embodiments, a regularization is added to one or multiple diagonal elements of the Hessian matrix H, where the regularization parameter value is chosen sufficiently large to improve the numerical conditioning and reduce the computational cost of solving the linear system, but the value is additionally chosen sufficiently small to result in a good approximation of the linearized KKT system that defines the original Newton-type search direction.

Some embodiments are based on the realization that the solution of the approximated, linearized KKT system to compute the Newton-type search direction 800 is equivalent 820 to solving a reduced, approximated, linearized KKT subsystem to compute the Newton-type direction for the primal variables 825

$$\underbrace{\left[H + \frac{1}{\epsilon}F^TF + \frac{1}{\epsilon}G_{act}^T G_{act} + G_g^T W_g^{k^{-1}} G_g\right]}_{:=M^k} \Delta z^k = -\bar{r}_z^k,$$

taking into account only equality constraints and inequality constraints in active and undecided range, followed by independent computations of the approximated, Newton-type search direction of all the dual and slack variables for both equality and inequality constraints 830, including the step $\Delta \lambda^k$ 831 for the equality constraints, the step $\Delta \mu_{act}^k$ 833 for inequality constraints in the active range, $\Delta \mu_g^k$ 832 for inequality constraints in the undecided range and $\Delta \mu_{in}^k$ 834 for inequality constraints in the inactive range, given the solution $\Delta z^k$ for the primal variables in the reduced linear subsystem 826. The right-hand side vector $\bar{r}_z^k$ 827 is defined by the evaluation of the stationarity conditions $r_z^k$ as well as contributions that are due to the primal feasibility with respect to the equality constraints and to the inequality constraints in the active and undecided classification range.

Figure 9A:
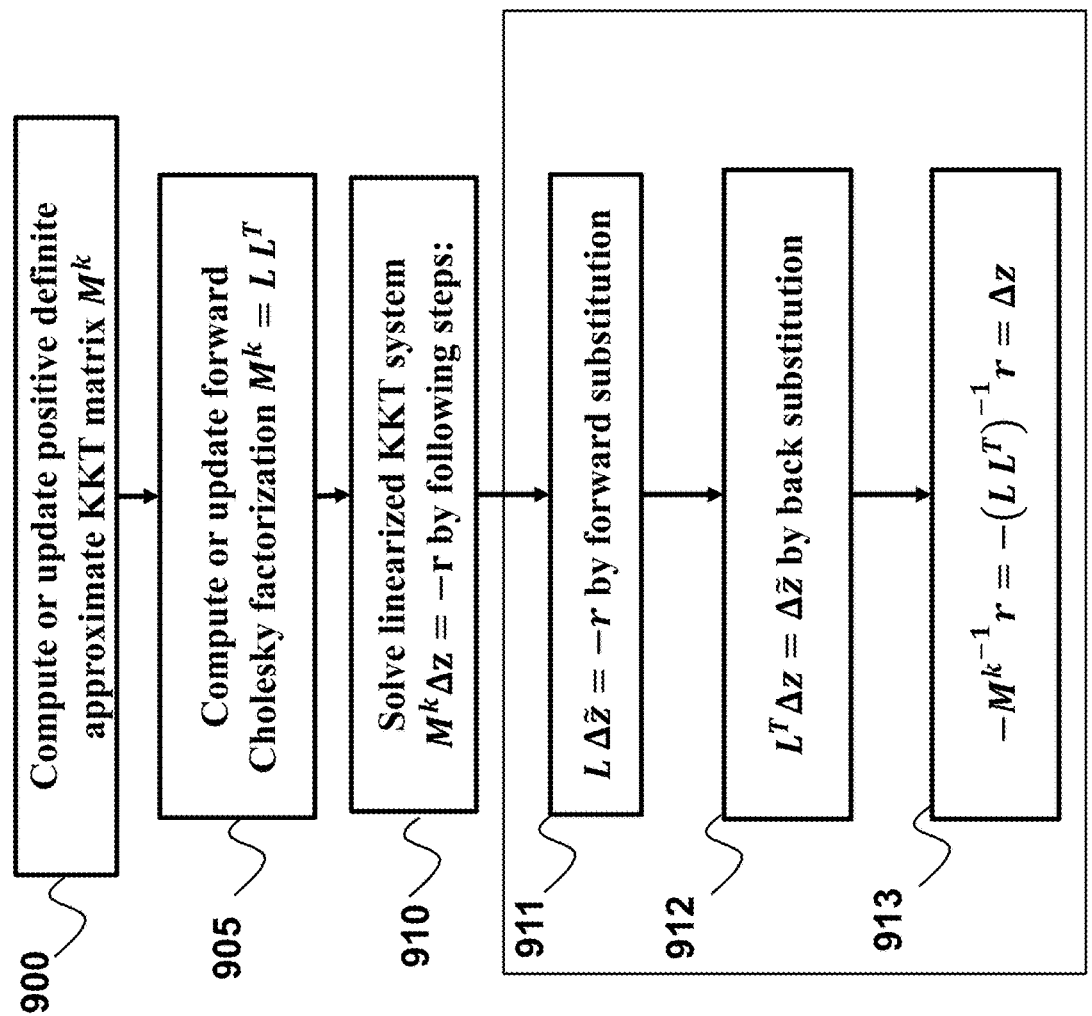
FIG. 9A shows a block diagram of a procedure to solve the reduced, linearized KKT system to compute the Newton-type search direction based on a forward Cholesky factorization according to some embodiments.

FIG. 9A shows a block diagram of a procedure to solve the reduced, approximated, linearized KKT subsystem 826 to compute the Newton-type search direction $\Delta z^k$ for the primal variables, based on a forward Cholesky factorization of the positive definite, approximate KKT matrix $M^k$ according to some embodiments. The initial step is to either compute or update the positive definite, approximate KKT matrix $M^k$ 900 in the reduced linear subsystem 825 at the current iteration of the interior point optimization method (IPM) given the positive definite, approximate KKT matrix $M^k$ in the reduced linear subsystem 825 at the previous iteration of the IPM. A forward Cholesky factorization or decomposition $M^k = LL^T$, in which the matrix L is a lower triangular matrix, can be either computed or updated 905, given the Cholesky factorization information from the previous IPM iteration, which is then used to solve the reduced, approximated, linearized KKT system 910.

In some embodiments, the solution of the reduced, approximated, linearized KKT system, $M^k \Delta z^k = -\bar{r}_z^k$ 910 is performed, based on a forward Cholesky factorization or decomposition $M^k = LL^T$ 905, by first computing a solution to the lower triangular system $L\Delta \tilde{z}^k = -\bar{r}_z^k$ by forward substitution 911, followed by computing a solution to the upper triangular system $L^T \Delta z^k = \Delta \tilde{z}^k$ by back substitution 912, resulting in the solution vector of the reduced, linearized KKT system $\Delta z^k = -M^{k^{-1}} \bar{r}_z^k = -(LL^T)^{-1} \bar{r}_z^k$ 913.

Some embodiments are based on the realization that the matrix defining the reduced, approximated, linearized KKT subsystem 826 to compute the Newton-type search direction $\Delta z^k$ is positive definite and it can exhibit a block-tridiagonal sparsity structure due to the block-structured sparsity of the constrained optimal control problem, such that a block-tridiagonal Cholesky factorization can be used to solve the reduced, approximated, linearized KKT system. In other embodiments, a dense, banded or sparse Cholesky factorization procedure can be used to reduce the computational cost of solving the structured linear system in each iteration of the interior point optimization algorithm.

Some embodiments are based on the realization that a low-rank update to the KKT matrix and to its Cholesky factorization can be computed at a considerably smaller computational cost compared to a completely new evaluation of the KKT matrix and of its Cholesky factorization, in case of a low-rank update to the w-values corresponding to the inequality constraints in the active and/or undecided classification range from one IPM iteration to the next. Some embodiments are based on the realization that the update to the KKT matrix, and therefore also the update to its Cholesky factorization, is of low rank if the number of inequality constraints that are identified to be in the undecided classification range at two subsequent iterations of the interior point optimization algorithm is relatively small.

Figure 9B:
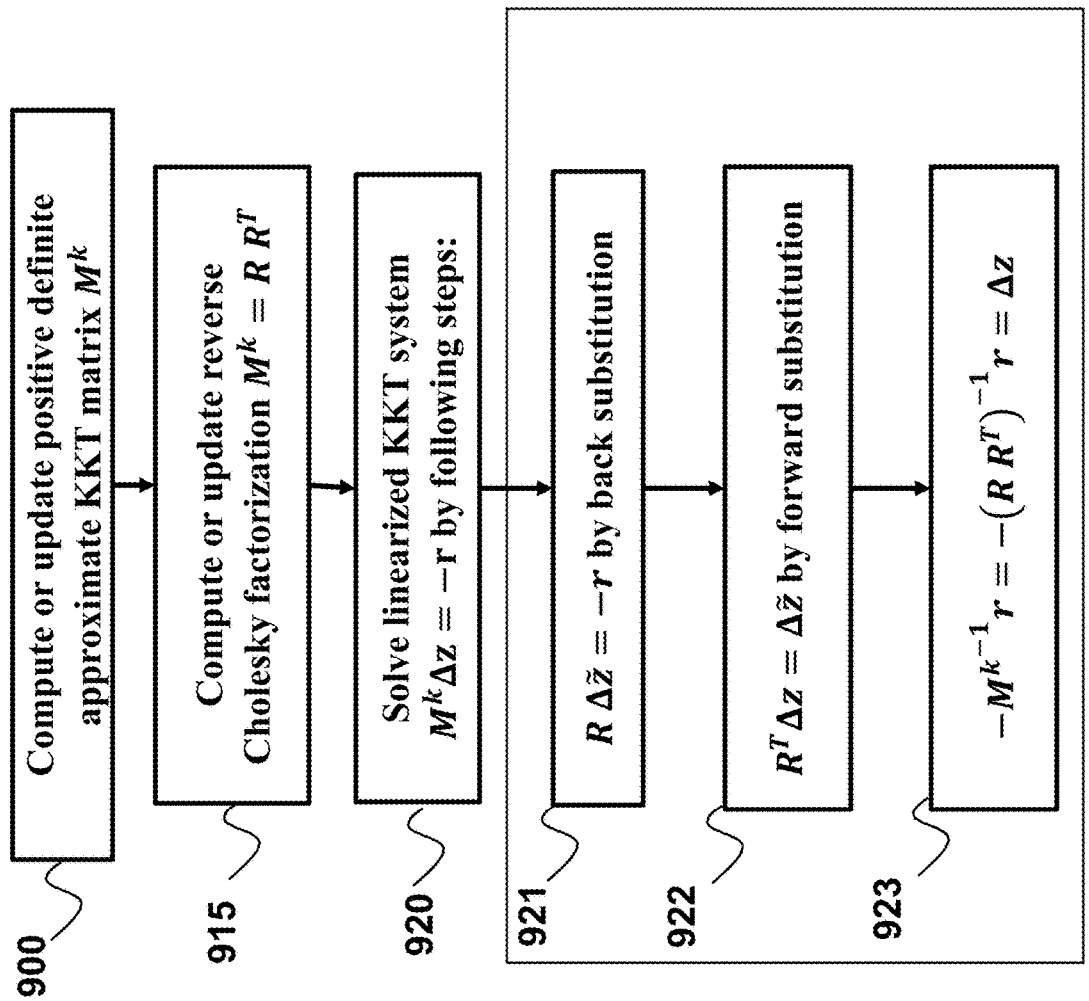
FIG. 9B shows a block diagram of a procedure to solve the reduced, linearized KKT system to compute the Newton-type search direction based on a reverse Cholesky factorization according to some embodiments.

FIG. 9B shows a block diagram of a procedure to solve the reduced, approximated, linearized KKT subsystem 826 to compute the Newton-type search direction $\Delta z^k$ for the primal variables, based on a reverse Cholesky factorization of the positive definite, approximate KKT matrix $M^k$ according to some embodiments. A reverse Cholesky factorization or decomposition $M^k = RR^T$, in which the matrix R is an upper triangular matrix, can be either computed or updated 915, given the reverse Cholesky factorization information from the previous IPM iteration, which is then used to solve the reduced, approximated, linearized KKT system 920.

In some embodiments, the solution of the reduced, approximated, linearized KKT system, $M^k \Delta z^k = -\bar{r}_z^k$ 920 is performed, based on a reverse Cholesky factorization or decomposition $M^k = RR^T$ 915, by first computing a solution to the upper triangular system $R \Delta \tilde{z}^k = -\bar{r}_z^k$ by backward substitution 921, followed by computing a solution to the lower triangular system $R^T \Delta z^k = \Delta \tilde{z}^k$ by forward substitution 922, resulting in the solution vector of the reduced, linearized KKT system $\Delta z^k = -M^{k-1} \bar{r}_z^k = -(RR^T)^{-1} \bar{r}_z^k$ 923.

Some embodiments are based on the realization that inequality constraints in the active and/or undecided classification range are likely to correspond to time intervals near the beginning of the control horizon in the constrained optimal control optimization problems of the predictive control system, resulting in a considerably smaller computational cost of computing or updating a reverse Cholesky factorization 915 instead of computing or updating a forward Cholesky factorization 905.

Figure 9C:
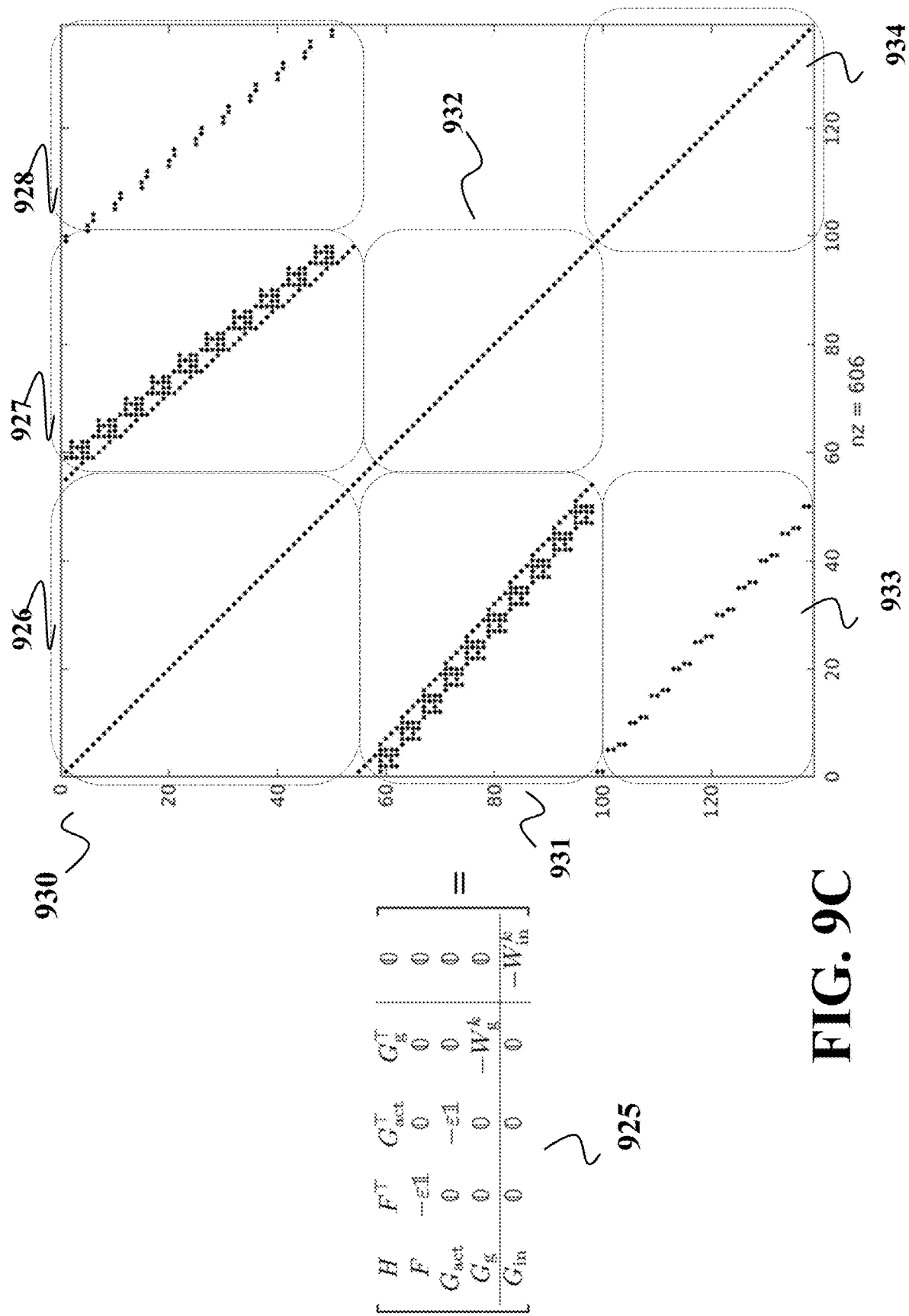
FIG. 9C shows a schematic of the block-structured sparsity of the indefinite KKT matrix in the approximated KKT system to compute the Newton-type search direction of the primal and dual variables according to some embodiments.

FIG. 9C shows a schematic of the block-structured sparsity pattern 930 for the approximated KKT matrix 925 in the linearized system to compute the Newton-type search direction for primal and dual optimization variables in the IPM. The Hessian matrix H of the objective can be either diagonal or block-diagonal 926, due to the separable, stage-wise structure of the objective in the constrained optimal control structured optimization problem. The equality constraint Jacobian matrix F 931 and its transpose $F^T$ 927 typically exhibit a block-bidiagonal sparsity structure, due to the stage-wise coupling of the state variables at subsequent time intervals in the constrained OCP. The inequality constraint Jacobian matrix G 933 and its transpose $G^T$ 928 can be either diagonal or block-diagonal, due to the separable, stage-wise structure of the inequality constraints on state and/or control input variables in the constrained OCP.

The block matrices on the diagonal of the block-structured KKT matrix 925, such as the block matrix corresponding to the equality constraints 932 and the block matrix corresponding to the inequality constraints 934 are diagonal matrices. More specifically, the diagonal elements corresponding to the equality constraints 932 are equal to $-\in$, where the value for $\in$ is either zero or relatively small. The diagonal elements corresponding to the inequality constraints 934 depend on the constraint classification range and they can be equal to their corresponding w-value or they can be bounded to be between a lower and upper bound value.

Figure 9D:
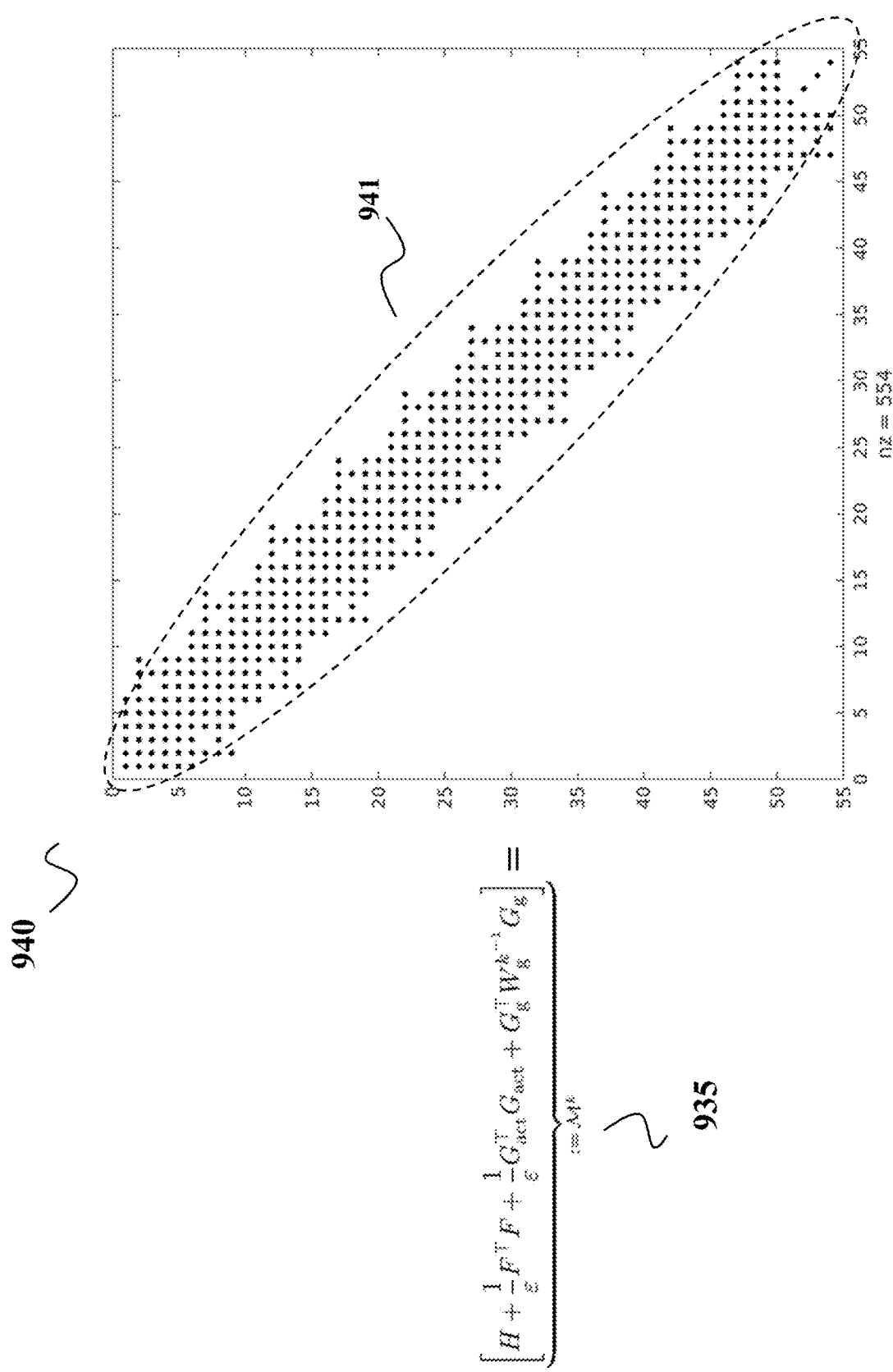
FIG. 9D shows a schematic of the block-structured sparsity of the positive definite KKT matrix in the reduced linear system to compute the Newton-type search direction of the primal variables according to some embodiments.

FIG. 9D shows a schematic of the block-structured sparsity pattern 940 of the positive (semi-)definite KKT matrix 935 in the reduced, approximated, linearized KKT system 826 to compute the Newton-type search direction $\Delta z^k$ for the primal optimization variables. Some embodiments are based on the realization that the block-tridiagonal sparsity structure 941 of the KKT matrix can be used to solve the reduced linear system based on a block-tridiagonal matrix factorization, e.g., a block-tridiagonal forward or reverse Cholesky factorization, in order to reduce the computational cost of the IPM. Other embodiments are based on the realization that the banded sparsity structure 941 of the KKT matrix can be used to solve the reduced linear system based on a banded and/or generally sparse matrix factorization in order to reduce the computational cost of the IPM in the predictive control system.

Figure 9E:
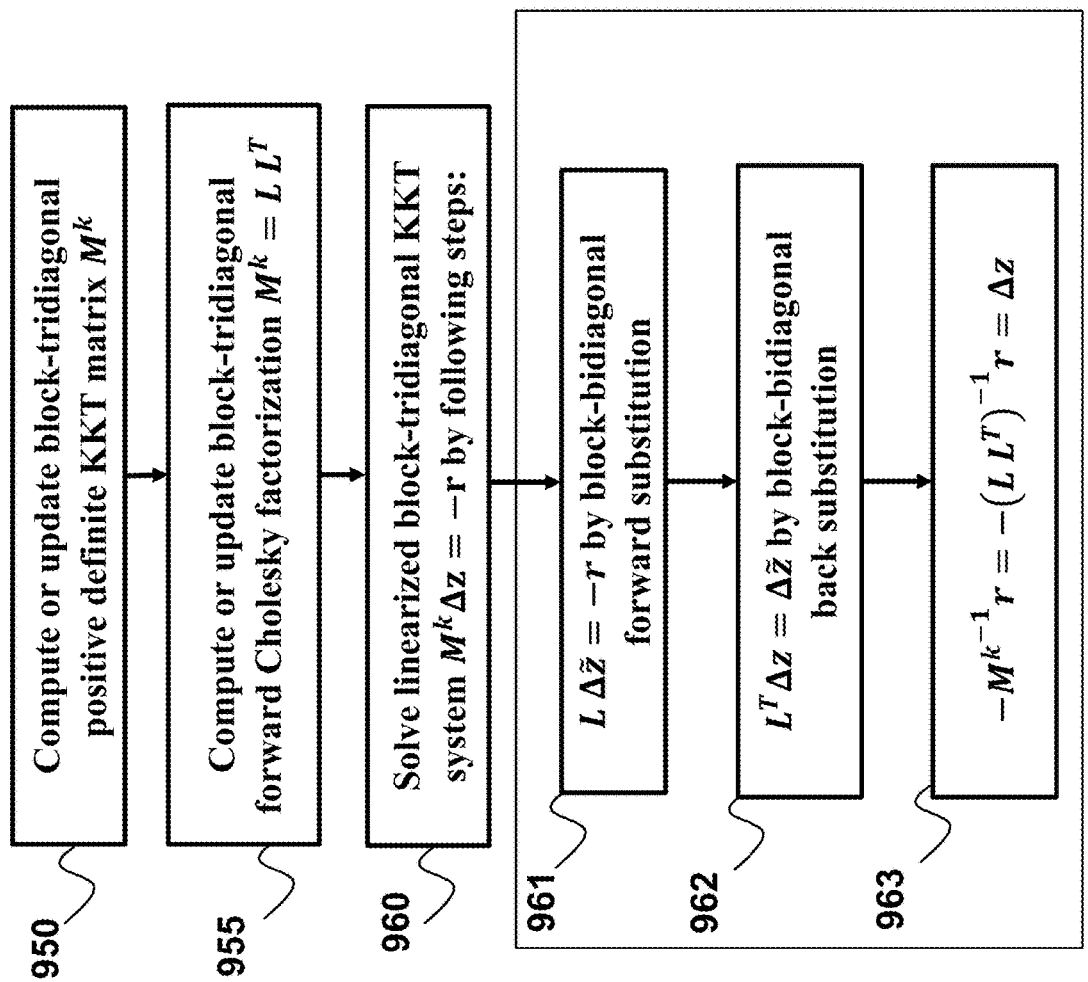
FIG. 9E shows a block diagram of a procedure to solve the reduced, linearized KKT system to compute the Newton-type search direction based on a block-tridiagonal forward Cholesky factorization according to some embodiments.

FIG. 9E shows a block diagram of a procedure to solve the reduced, approximated, linearized KKT subsystem 826 to compute the Newton-type search direction $\Delta z^k$ for the primal variables, based on a block-tridiagonal forward Cholesky factorization 955 of the block-tridiagonal, positive definite, approximate KKT matrix $M^k$ 950 according to some embodiments. A block-tridiagonal forward Cholesky factorization or decomposition $M^k = LL^T$, in which the matrix L is a lower block-bidiagonal matrix, can be either computed or updated 955, given the block-tridiagonal forward Cholesky factorization information from the previous IPM iteration, which is then used to solve the reduced, block-tridiagonal, linearized KKT system 960.

In some embodiments, the solution of the reduced, block-tridiagonal, linearized KKT system, $M^k \Delta z^k = -\bar{r}_z^k$ 960 is performed, based on a block-tridiagonal forward Cholesky factorization or decomposition $M^k = LL^T$ 955, by first computing a solution to the lower block-bidiagonal system $L \Delta \tilde{z}^k = -\bar{r}_z^k$ by block forward substitution 961, followed by computing a solution to the upper block-bidiagonal system $L^T \Delta z^k = \Delta \tilde{z}^k$ by block backward substitution 962, resulting in the solution vector of the reduced, block-tridiagonal, linearized KKT system $\Delta z^k = -M^{k-1} \bar{r}_z^k = -(LL^T)^{-1} \bar{r}_z^k$ 963.

Figure 9F:
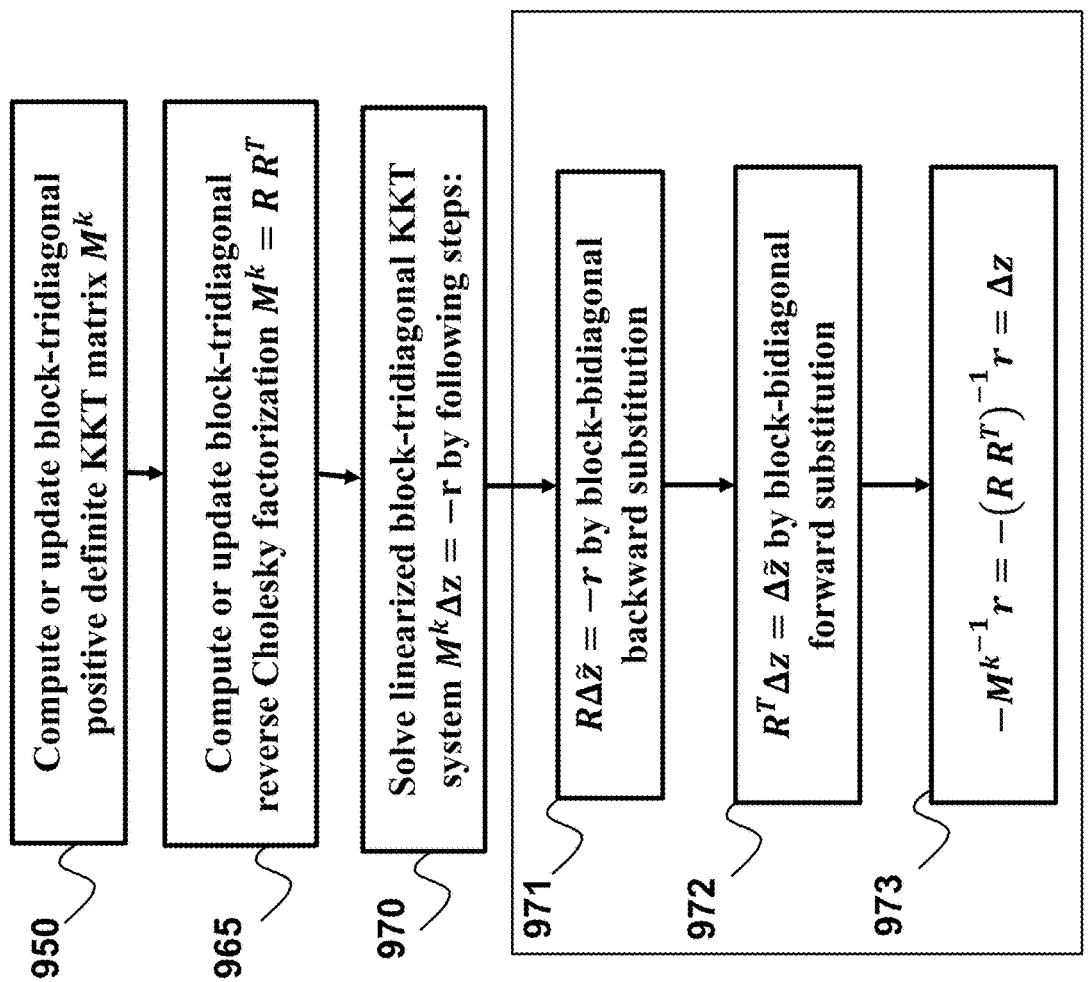
FIG. 9F shows a block diagram of a procedure to solve the reduced, linearized KKT system to compute the Newton-type search direction based on a block-tridiagonal reverse Cholesky factorization according to some embodiments.

FIG. 9F shows a block diagram of a procedure to solve the reduced, approximated, linearized KKT system 826 to compute the Newton-type search direction $\Delta z^k$ for the primal variables, based on a block-tridiagonal reverse Cholesky factorization 965 of the block-tridiagonal, positive definite, approximate KKT matrix $M^k$ 950 according to some embodiments. A block-tridiagonal reverse Cholesky factorization or decomposition $M^k = RR^T$, in which the matrix R is an upper block-bidiagonal matrix, can be either computed or updated 965, given the block-tridiagonal reverse Cholesky factorization information from the previous IPM iteration, which is then used to solve the reduced, block-tridiagonal, linearized KKT system 970.

In some embodiments, the solution of the reduced, block-tridiagonal, linearized KKT system, $M^k \Delta z^k = -\bar{r}_z^k$ 970 is performed, based on a block-tridiagonal reverse Cholesky factorization or decomposition $M^k = RR^T$ 965, by first computing a solution to the upper block-bidiagonal system $R \Delta \tilde{z}^k = -\bar{r}_z^k$ by block backward substitution 971, followed by computing a solution to the lower block-bidiagonal system $R^T \Delta Z^k = \Delta \tilde{z}^k$ by block forward substitution 972, resulting in the solution vector of the reduced, block-tridiagonal, linearized KKT system $\Delta z^k = -M^{k^{-1}} \bar{r}_z^k = -(RR^T)^{-1} \bar{r}_z^k$ 973.

Some embodiments are based on the realization that only one or multiple blocks of a reverse block-tridiagonal Cholesky factorization 965 need to be computed or updated, corresponding to the blocks that contain inequality constraints with updated w-values, in the undecided classification range, near the beginning of the control horizon in the constrained optimal control optimization problems of the predictive control system, resulting in a considerably reduced computational cost. Other embodiments are based on the realization that only one or multiple blocks of a forward block-tridiagonal Cholesky factorization 955 need to be computed or updated, corresponding to the blocks that contain inequality constraints with updated w-values, in the undecided classification range, near the end of the control horizon in the constrained optimal control optimization problems of the predictive control system, resulting in a considerably reduced computational cost.

Some embodiments are based on the realization that auxiliary variables, with a corresponding penalization in the cost function, are often used to soften state-dependent inequality constraints in the optimization problem formulation for real-time predictive control or estimation. Such auxiliary variables result in a particular sparsity structure in the KKT matrix of the reduced linear system. Some embodiments are based on the realization that a simple bound constraint on a particular optimization variable results in a contribution on the diagonal of the KKT matrix, while the off-diagonal elements are zero for that row and column, if that particular optimization variable does not appear in any cross-terms in the cost function, nor in any other inequality constraints that are not inactive or in any of the equality constraints. The computational cost of making the corresponding update to the matrix factorization does not scale with any of the dimensions in the optimization problem, such that these updates should be performed independently of any other updates to the factorization of the KKT matrix due to changes in the ratio values for the inequality constraints that are currently in the undecided range.

Figure 10A:
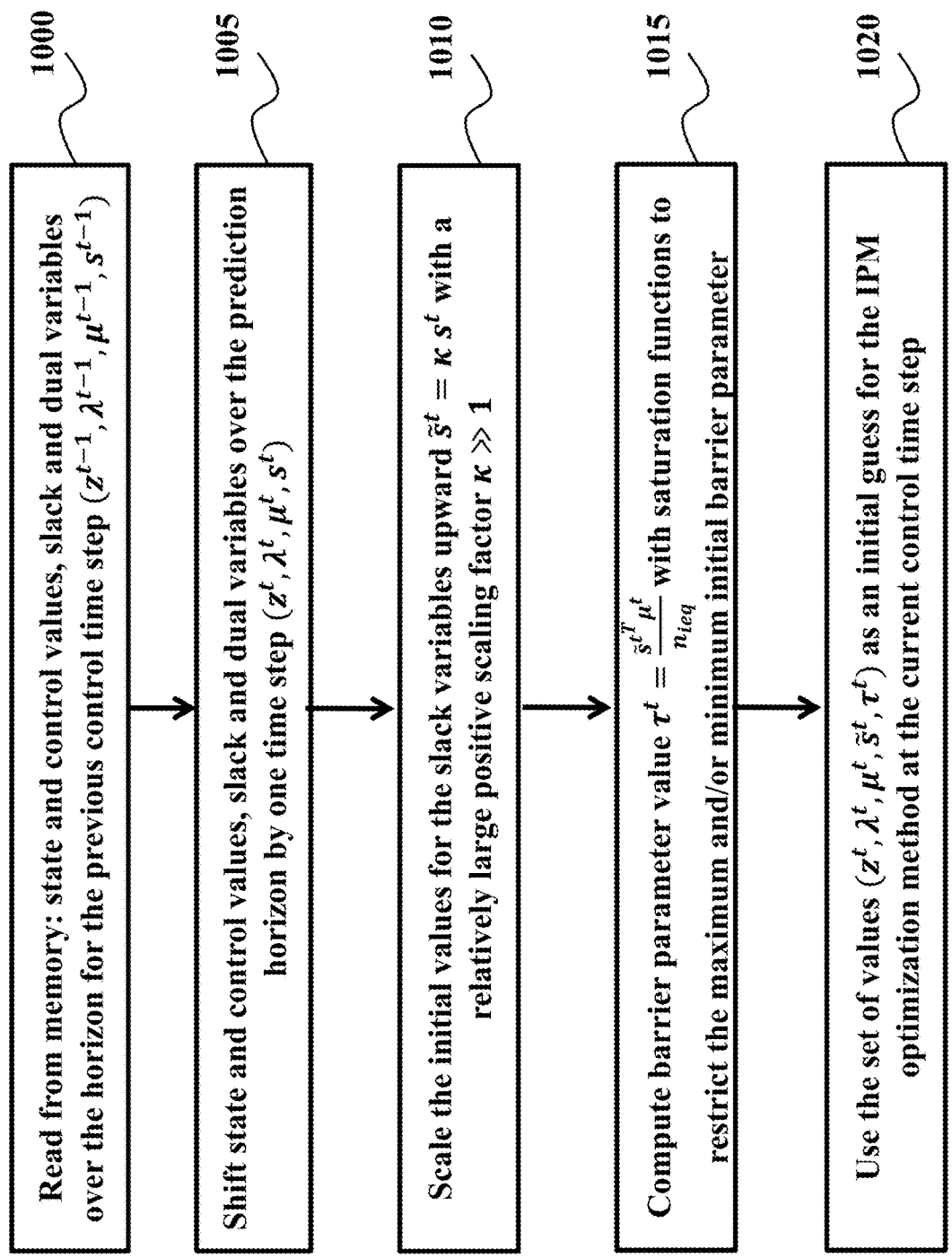
FIG. 10A is a block diagram of a dual warm start initialization procedure for the interior point optimization algorithm, based on a time shifting and constraint inactivation strategy, according to some embodiments.

FIG. 10A shows a block diagram of a dual warm start initialization procedure for the interior point optimization algorithm, based on a time shifting and constraint inactivation strategy, according to some embodiments. The procedure first reads the solution information for the previous control time step from memory 1000, including values for state and control variables, slack and/or dual optimization variables, followed by an optional time shifting of the sequence of values by one time step over the prediction control horizon 1005, i.e., the previous solution information $(z^{t-1}, \lambda^{t-1}, \mu^{t-1}, s^{t-1})$ is used to compute a solution guess $(z^t, \lambda^t, \mu^t, s^t)$ for the constrained OCP at the current control time step. Next, the initial values for the slack variables are scaled upward 1010, $\tilde{s}^t = \kappa \, s^t$, using a positive scaling factor $\kappa \gg 1$, and the resulting new value for the barrier parameter $$\tau^t = \frac{\tilde{s}^{t^T} \mu^t}{n_{ieq}}$$

is computed 1015. Some embodiments use additional saturation functions to ensure lower and upper bounds for the initial barrier parameter value, i.e., $\tau_{min} \leq \tau^t \leq \tau_{max}$ where $\tau_{min}$ and $\tau_{max}$, respectively, denote the desired minimum and maximum values for the barrier parameter. The resulting set of values $(z^t, \lambda^t, \mu^t, \tilde{s}^t, \tau^t)$ can be used as an initial guess for the IPM optimization algorithm at the current control time step 1020.

Some embodiments are based on the realization that the upward scaling of the values for the slack variables 1010 results in a constraint inactivation process that aims to avoid any situation of slow convergence for the IPM due to a mistake in believing an inactive constraint to be active. More specifically, when choosing the scaling parameter value $\kappa \gg 1$ sufficiently large, but not too large, some or all of the active inequality constraints can be moved back into the undecided classification range at the initial step of the IPM. In addition, the resulting increase in the initial guess for the barrier parameter 1015 results in a relaxed and therefore smoothened set of complementarity conditions.

Some embodiments use an additional scaling of the values for the dual optimization variables, depending on the classification range of each inequality constraint and this with or without the time shifting step 1005. Other embodiments are based on the realization that the use of the original values for the dual optimization variables, from one control time step to the next, results in better average and/or worst case convergence properties of the IPM.

Figure 10B:
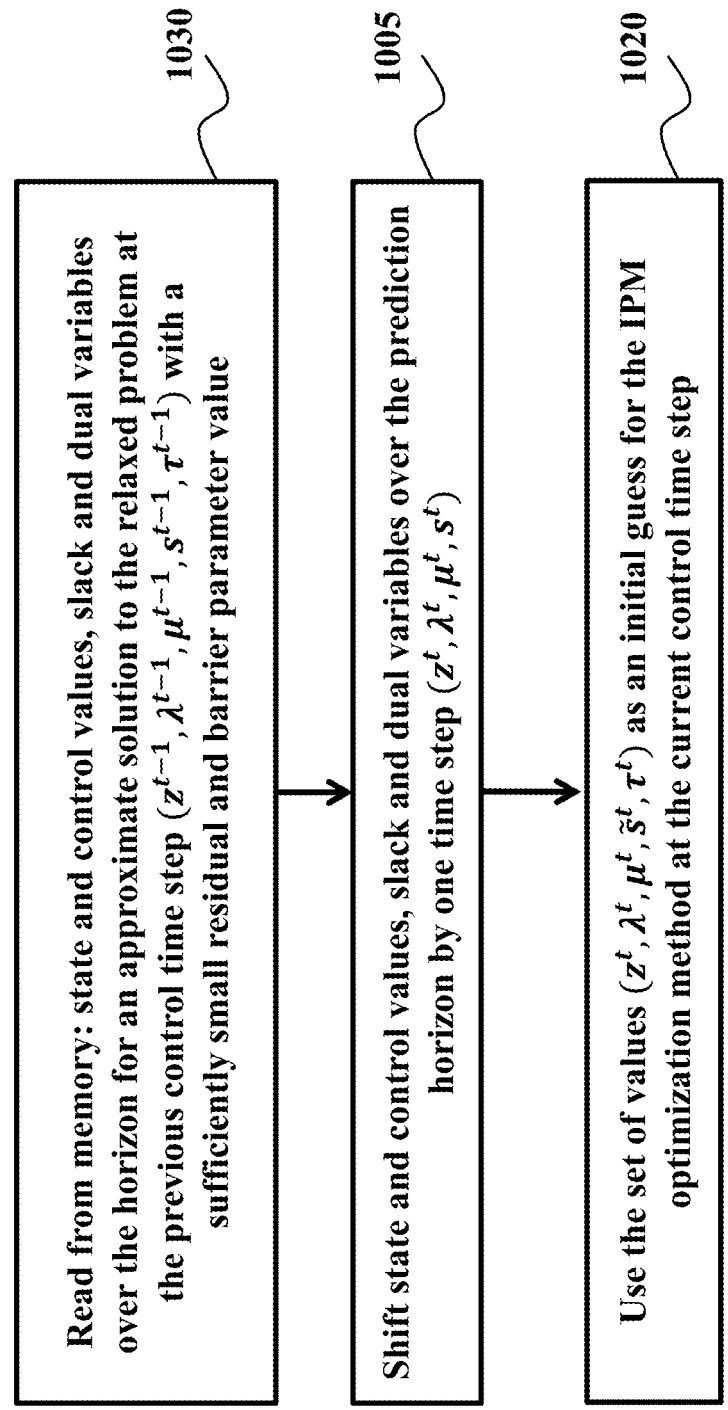
FIG. 10B is a block diagram of a smooth relaxation-based warm start initialization procedure for the interior point optimization algorithm in the predictive control system, according to some embodiments.

FIG. 10B shows a block diagram of a smooth relaxation-based warm start initialization procedure for the interior point optimization algorithm in the predictive control system, according to some embodiments. Some embodiments are based on the realization that an approximate solution to the barrier-type relaxation of the optimality conditions for the constrained OCP can be stored at the previous control time step, when a norm of the residual vector is sufficiently small and/or when the barrier parameter value is sufficiently small. The first step of a smooth relaxation-based warm start initialization procedure for the IPM is then to read the approximate, relaxed solution information $(z^{t-1}, \lambda^{t-1}, \mu^{t-1}, s^{t-1}, \tau^{t-1})$ from the previous control time step from memory 1030. Next, an optional time shifting of the sequence of values for state and control variables, slack and/or dual optimization variables by one time step over the prediction control horizon can be performed 1005, i.e., the previous solution information $(z^{t-1}, \lambda^{t-1}, \mu^{t-1}, s^{t-1})$ is used to compute a solution guess $(z^t, \lambda^t, \mu^t, s^t)$ for the constrained OCP at the current control time step. The resulting set of values $(z^t, \lambda^t, \mu^t, s^t, \tau^t)$ can be used as an initial guess for the IPM optimization algorithm at the current control time step 1020.

Some embodiments are based on the realization that the performance of the smooth relaxation-based warm start initialization procedure highly depends on the decision rule to store an approximate solution to the barrier-type relaxation of the optimality conditions for the constrained OCP at the previous control time step. For example, the approximate and relaxed solution information can be stored if and only if the norm of the residual vector and the barrier parameter value are both below a particular threshold value.

Figure 11A:
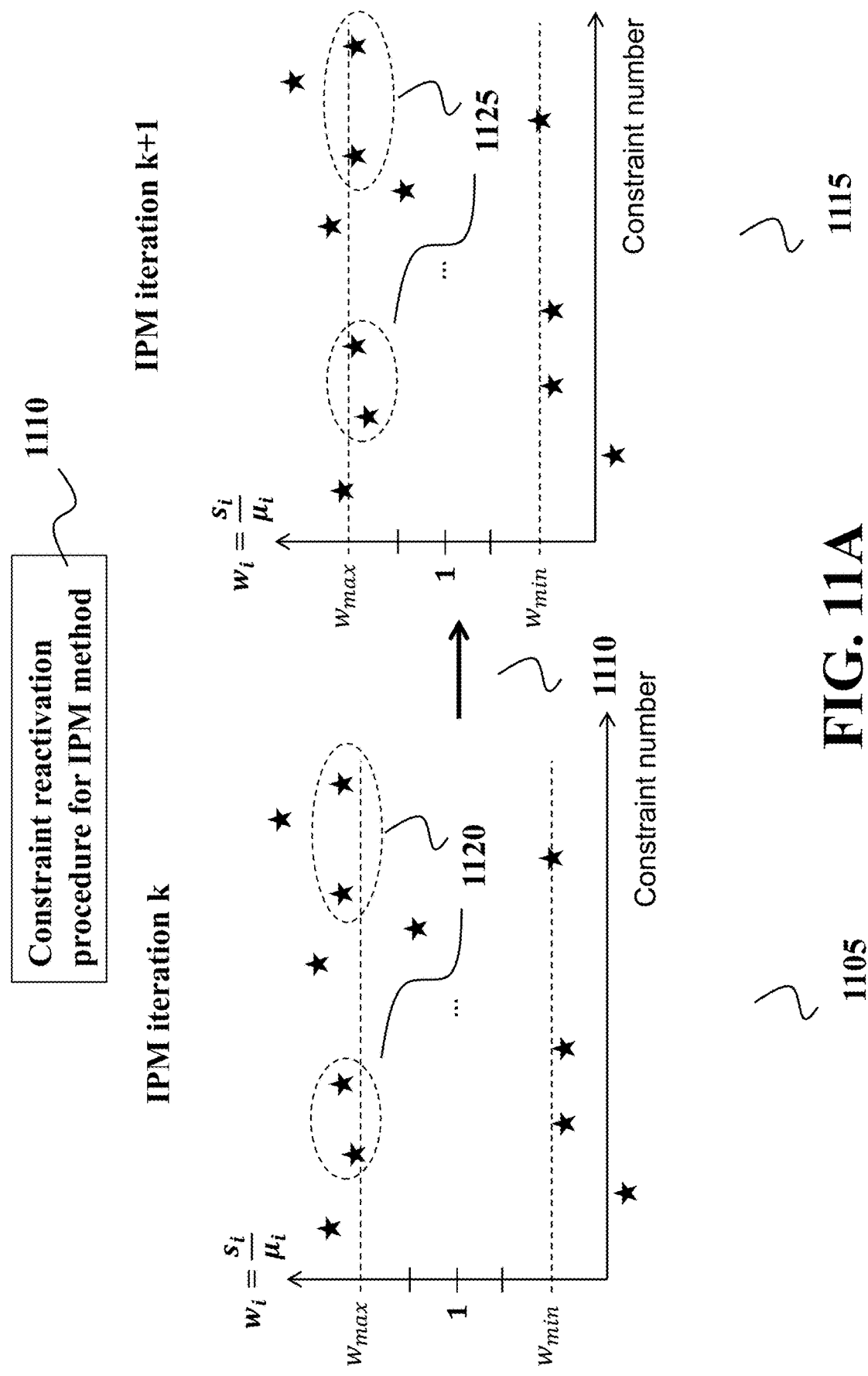
FIG. 11A is a schematic of a constraint reactivation procedure to improve the convergence properties of the active-set based IPM by selecting particular inequality constraints to be moved into the undecided classification range.

FIG. 11A shows a schematic of a constraint reactivation procedure to improve the convergence properties of the active-set classification based IPM 1110 according to some embodiments. Some embodiments are based on the realization that convergence of the interior point optimization algorithm may be slow due to inequality constraints that are wrongly identified to be inactive in a warm start initialization procedure from one control time step to the next. Therefore, some embodiments include a constraint reactivation procedure in the implementation of the IPM that can be used in case of slow convergence due to a bad initialization of the optimization variables in the IPM, e.g., due to unmodeled dynamics and/or external disturbances in the predictive control system.

As illustrated in FIG. 11A, according to some embodiments, the constraint reactivation procedure selects one or multiple inequality constraints in the inactive classification range 1120 at the current IPM iteration k 1105 and the procedure moves these inequality constraints 1120 into the undecided classification range 1125 at the next IPM iteration k+1 1115. More specifically, the constraint reactivation procedure 1110 scales down the w-value $$w_i = \frac{s_i}{\mu_i}$$

for one, multiple or all of the inequality constraints in the inactive classification range 1120 such that one, multiple or all of the new w-values are below the maximum threshold value $w_{max}$ 1125 and the corresponding inequality constraints are identified to be in the undecided classification range at the next IPM iteration 1115. In some embodiments, the constraint reactivation procedure 1110 can be repeated until good convergence of the IPM is recovered.

FIG. 11B shows an algorithmic description for a detection and constraint reactivation procedure in the active-set based IPM optimization algorithm 1130 according to some embodiments. One important task is the detection procedure to detect a slow rate of convergence of the active-set based IPM optimization algorithm. In some embodiments, as illustrated in FIG. 11B, the constraint reactivation procedure keeps track of a number $n_d$ of successively decreasing step sizes 1131 in order to detect a slow rate of convergence of the active-set based IPM. More specifically, if the step size in the current IPM iteration is smaller than the step size in the previous IPM iteration, i.e., $\alpha^k < \alpha^{k-1}$ 1132, then the counter is increased by one, i.e., $n_d \leftarrow n_d+1$ 1133, otherwise the counter is reset to zero, i.e., $n_d \leftarrow 0$ 1134.

After increasing the counter 1133, the constraint reactivation procedure 1130 is initiated if and only if the counter is larger than or equal to a threshold value $\bar{n}_d$ and the step size is smaller than a minimum threshold value $\alpha_{min}$, i.e., $n_d \geq \bar{n}_d$ and $\alpha < \alpha_{min}$ 1135. In some embodiments, the constraint reactivation procedure computes the number of inequality constraints to reactivate $n_a$ as a percentage $\gamma$ of the number of inequality constraints that is currently identified to be in the inactive classification range $|I_{in}|$ 1136. Based on this number $n_a$ of inequality constraints to be reactivated, according to some embodiments, the constraint reactivation procedure then updates the Lagrange multipliers $\mu_i \leftarrow \beta \mu_i$ for all inequality constraints that are currently identified to be in the inactive classification range, where the value of $\beta$ is computed such that approximately $n_a$ inequality constraints are moved from the inactive into the undecided classification range from one IPM iteration to the next 1137.

Some embodiments are based on the realization that the values of the parameters $\bar{n}_d$, $\alpha_{min}$ and $\gamma$ 1131 need to be selected carefully such that the constraint reactivation procedure is invoked whenever the convergence of the active-set based IPM slows down considerably but, on the other hand, the constraint reactivation procedure should not be invoked more often than necessary in order to avoid an unnecessary increase of the computational cost of the active-set based IPM optimization algorithm in the predictive control system.

FIG. 11C shows an algorithmic description of the active-set based inexact IPM for implementing the predictive control system 1150, according to embodiments, based on a warm start initialization, a constraint reactivation procedure and a block-structured factorization to solve the reduced, linearized KKT system in each iteration of the IPM. The optimization algorithm starts with an initialization of the values for the optimization variables, for which warm starting strategies can be used as illustrated in FIGS. 10A and 10B 1155. The iterative procedure of the IPM continues as long as a norm of the residual vector and/or the barrier parameter value is larger than a particular tolerance value 1160. In each IPM iteration, the detection and constraint reactivation procedure from Algorithm 1 is called 1130 to avoid slow convergence of the algorithm. One or multiple of the blocks in the block-structured factorization of the KKT matrix can then be computed or updated 1165, based on the matrix factorization from the previous IPM iteration. Based on this block-structured factorization, the reduced linearized KKT system can be formulated and solved effectively 1170 and the Newton-type search direction for both the primal and for the dual optimization variables can be computed 1175. Given the Newton-type search direction, the step size $\alpha^k$ is computed to ensure the positivity constraints for dual and slack variables 1180, such that all optimization variables can be updated 1185. Given an optimal, approximately optimal or suboptimal solution to the constrained optimal control optimization problem, the next control input values can be obtained from the IPM algorithm for the predictive control system 1190.

Some embodiments are based on the realization that a predictor-corrector type implementation of the active-set based IPM algorithm can provide a computational speedup if the linearized KKT system solution is relatively cheap, compared to the factorization of the coefficient matrix. Therefore, some embodiments can switch between a standard implementation and a predictor-corrector type implementation of the proposed IPM in each iteration, depending on the relative computational cost of the linear system solution versus the structured factorization of the coefficient matrix.

Figure 12A:
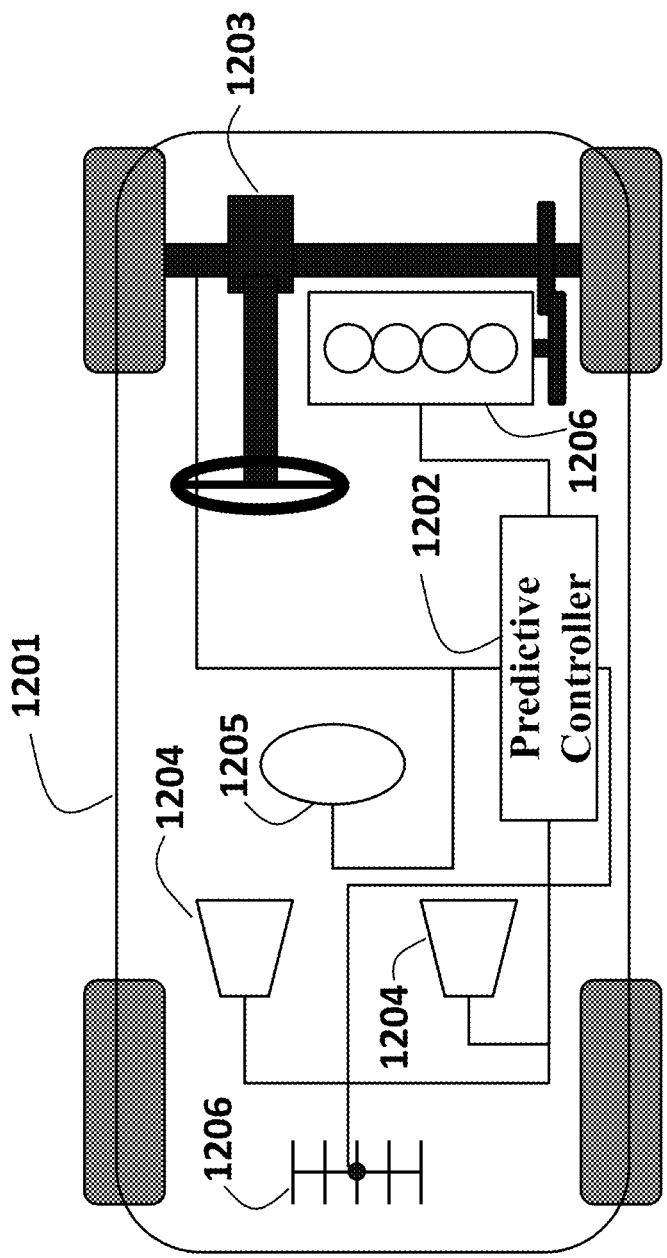
FIG. 12A is a schematic of a vehicle including a controller employing principles of some embodiments.

FIG. 12A shows a schematic of a vehicle 1201 including a predictive controller 1202 employing principles of some embodiments. As used herein, the vehicle 1201 can be any type of wheeled vehicle, such as a passenger car, bus, or rover. Also, the vehicle 1201 can be an autonomous or semi-autonomous vehicle. For example, some embodiments control the motion of the vehicle 1201. Examples of the motion include lateral motion of the vehicle controlled by a steering system 1203 of the vehicle 1201. In one embodiment, the steering system 1203 is controlled by the controller 1202. Additionally, or alternatively, the steering system 1203 can be controlled by a driver of the vehicle 1201.

The vehicle can also include an engine 1206, which can be controlled by the controller 1202 or by other components of the vehicle 1201. The vehicle can also include one or more sensors 1204 to sense the surrounding environment. Examples of the sensors 1204 include distance range finders, radars, lidars, and cameras. The vehicle 1201 can also include one or more sensors 1205 to sense its current motion quantities and internal status. Examples of the sensors 1205 include global positioning system (GPS), accelerometers, inertial measurement units, gyroscopes, shaft rotational sensors, torque sensors, deflection sensors, pressure sensor, and flow sensors. The sensors provide information to the controller 1202. The vehicle can be equipped with a transceiver 1206 enabling communication capabilities of the controller 1202 through wired or wireless communication channels.

Figure 12B:
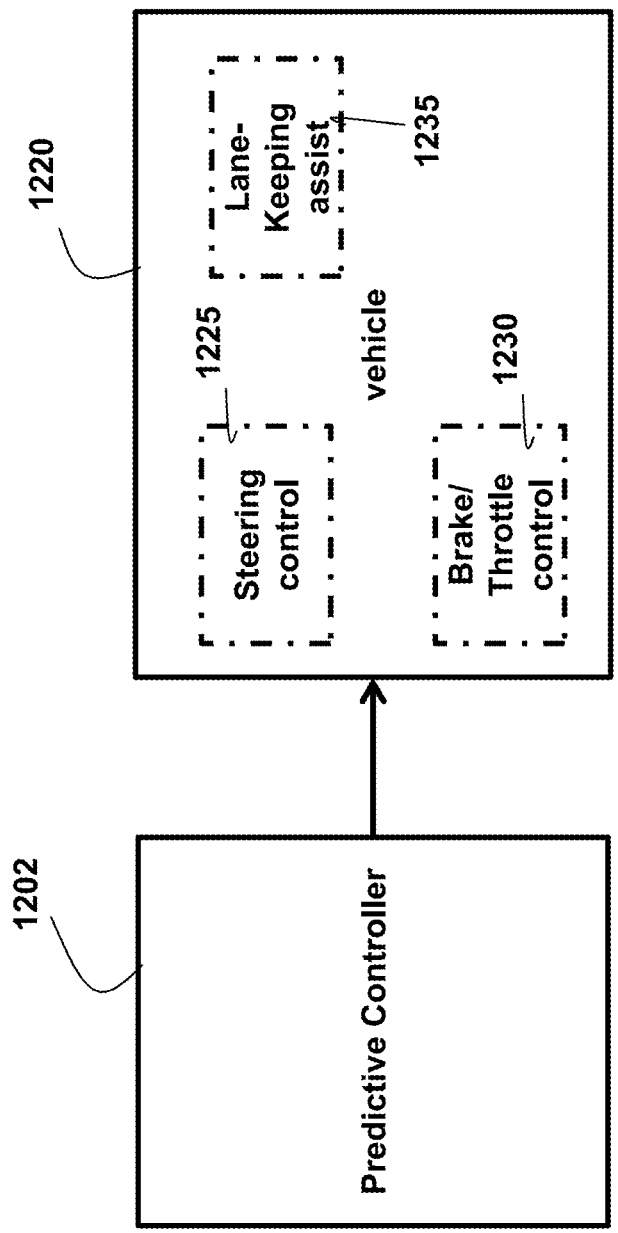
FIG. 12B is a schematic of interaction between the controller employing principles of some embodiments and controllers of the vehicle 1201 according to some embodiments.

FIG. 12B shows a schematic of interaction between the predictive controller 1202 and the controllers 1220 of the vehicle 1201 according to some embodiments. For example, in some embodiments, the controllers 1220 of the vehicle 1201 are steering 1225 and brake/throttle controllers 1230 that control rotation and acceleration of the vehicle 1220. In such a case, the predictive controller 1202 outputs control inputs to the controllers 1225 and 1230 to control the state of the vehicle. The controllers 1220 can also include high-level controllers, e.g., a lane-keeping assist controller 1235 that further process the control inputs of the predictive controller 1202. In both cases, the controllers 1220 maps use the outputs of the predictive controller 1202 to control at least one actuator of the vehicle, such as the steering wheel and/or the brakes of the vehicle, in order to control the motion of the vehicle.

Figure 12C:
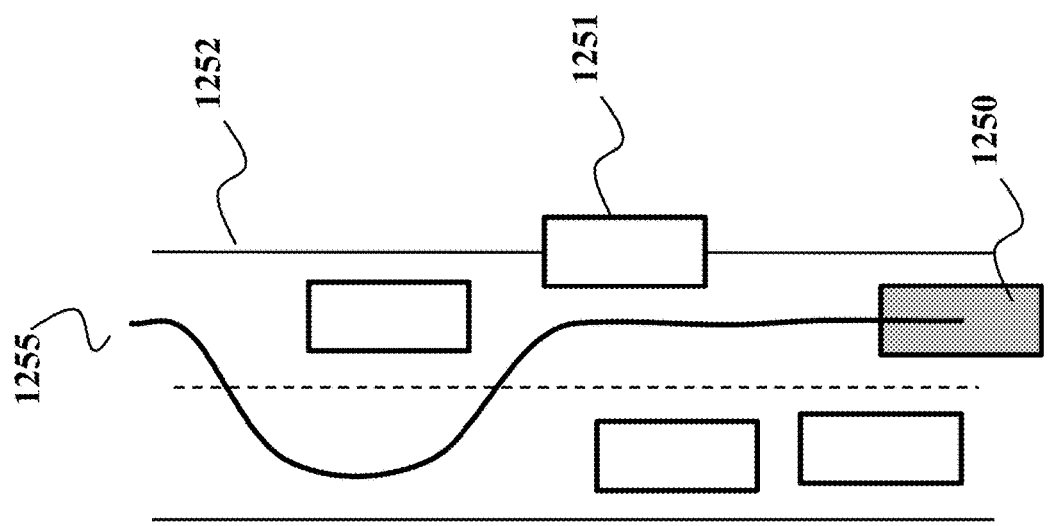
FIG. 12C is a schematic of a path and/or motion planning method for a controlled vehicle employing principles of some embodiments.

FIG. 12C shows a schematic of an autonomous or semi-autonomous controlled vehicle 1250 for which a dynamically feasible, and often optimal trajectory 1255 can be computed by using principles of some embodiments. The generated trajectory aims to keep the vehicle within particular road bounds 1252, and aims to avoid other uncontrolled vehicles, i.e., obstacles 1251 for the controlled vehicle 1250. In some embodiments, each of the obstacles 1251 can be represented by one or multiple inequality constraints in a time or space formulation of the constrained optimal control problem. For example, based on embodiments configured to implement a model predictive controller, the autonomous or semi-autonomous controlled vehicle 1250 can make decisions in real time such as, e.g., pass another vehicle on the left or on the right side or instead to stay behind another vehicle within the current lane of the road 1252.

Figure 13A:
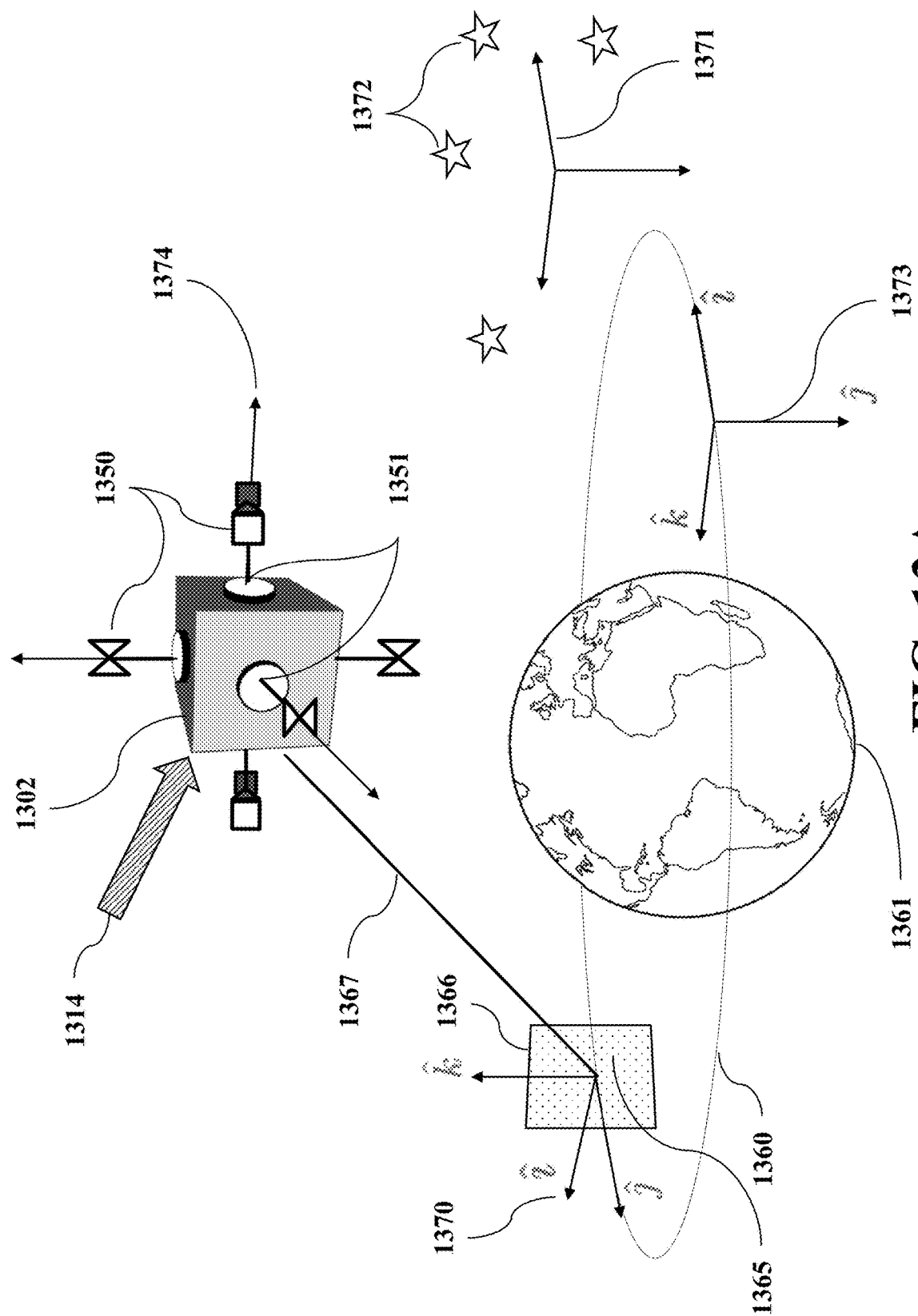
FIGS. 13A and 13B are schematics of the spacecraft predictive control problem formulation employing principles of some embodiments.
Figure 13B:
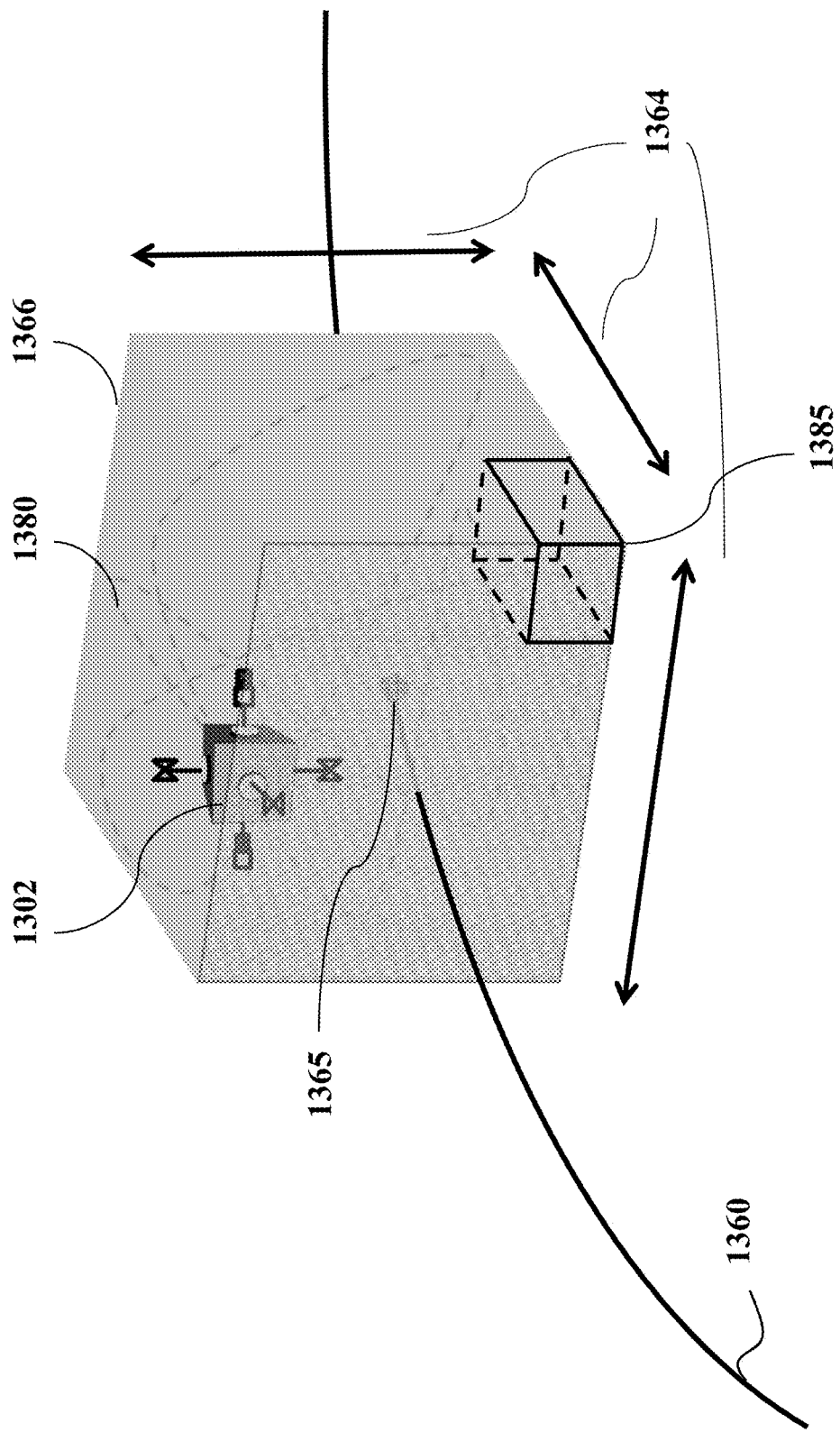

FIGS. 13A and 13B show a spacecraft 1302 equipped with a plurality of actuators such as thrusters 1350 and momentum exchange devices 1351. Examples of the type of momentum exchange devices include reaction wheels (RWs) and gyroscopes. The spacecraft is a vehicle, vessel, or machine designed to fly in outer space whose operation changes quantities such as the position of the spacecraft, its velocities, and its attitude or orientation, in response to commands that are sent to the actuators. When commanded, the actuators impart forces on the spacecraft that increase or decrease the velocity of the spacecraft and thus cause the spacecraft to translate its position, and, when commanded, the actuators also impart torques on the spacecraft, which cause the spacecraft to rotate and thereby change its attitude or orientation. As used herein, the operation of the spacecraft is determined by the operation of the actuators that determine a motion of the spacecraft that changes such quantities.

The spacecraft flies in outer space along an open or closed orbital path 1360 around, between, or near one or more gravitational bodies such as the Earth 1361, moon, and/or other celestial planets, stars, asteroids, comets. Usually, a desired or target position 1365 along the orbital path is given. A reference frame 1370 is attached to the desired position, where the origin of the frame, i.e., the all zeros coordinates in that reference frame are the coordinates of the desired position at all times.

The spacecraft is subject to various disturbance forces 1314. These disturbance forces can include forces that were not accounted for when determining the orbital path for the spacecraft. These disturbance forces act on the spacecraft to move the spacecraft away from the desired position on the orbital path. These forces can include, but are not limited to, gravitational attraction, radiation pressure, atmospheric drag, non-spherical central bodies, and leaking propellant. Thus, the spacecraft can be at a distance 1367 away from the target position.

Because of the disturbance forces, it is not always possible to keep the spacecraft at the desired position along its orbit. As such, it is desired that the spacecraft instead remains within a window 1366 with specified dimensions 1364 around the desired position. To that end, the spacecraft is controlled to move along any path 1380 that is contained within the desired target window. In this example, the window 1366 has a rectangular shape, but the shape of the window can vary for different embodiments.

The spacecraft is also often required to maintain a desired orientation. For example, a spacecraft-fixed reference frame 1374 is required to be aligned with a desired reference frame such as an inertial reference frame 1371 that is fixed relative to distant stars 1372, or a reference frame 1373 that is always oriented in a manner that points towards the Earth. However, depending on the shape of the spacecraft, different disturbance forces 1314 can act non-uniformly on the spacecraft, thereby generating disturbance torques, which cause the spacecraft to rotate away from its desired orientation. In order to compensate for the disturbance torques, momentum exchange devices 1351 such as reaction wheels are used to absorb the disturbance torques, thus allowing the spacecraft to maintain its desired orientation.

So that the momentum exchange devices do not saturate, and thereby lose the ability to compensate for disturbance torques, their stored momentum must be unloaded, e.g., by reducing spin rates of the reaction wheels. Unloading the momentum exchange devices imparts an undesired torque on the spacecraft. Such an undesired torque is also compensated for by the thrusters.

In some embodiments, the predictive controller is designed such that the spacecraft remains outside of a particular zone 1385 with specified dimensions, close to the desired position along the orbit. The latter zone can be either fixed in time or it can be time varying, and is often referred to as an exclusion zone 1385, for which the corresponding inequality constraints can be modeled within a constrained optimal control problem formulation of the predictive control system. In this example, the exclusion zone 1385 has a rectangular shape, and it is positioned in a corner of the desired window 1366, but the shape and position of the exclusion zone within the desired target window can vary for different embodiments.

Figure 14A:
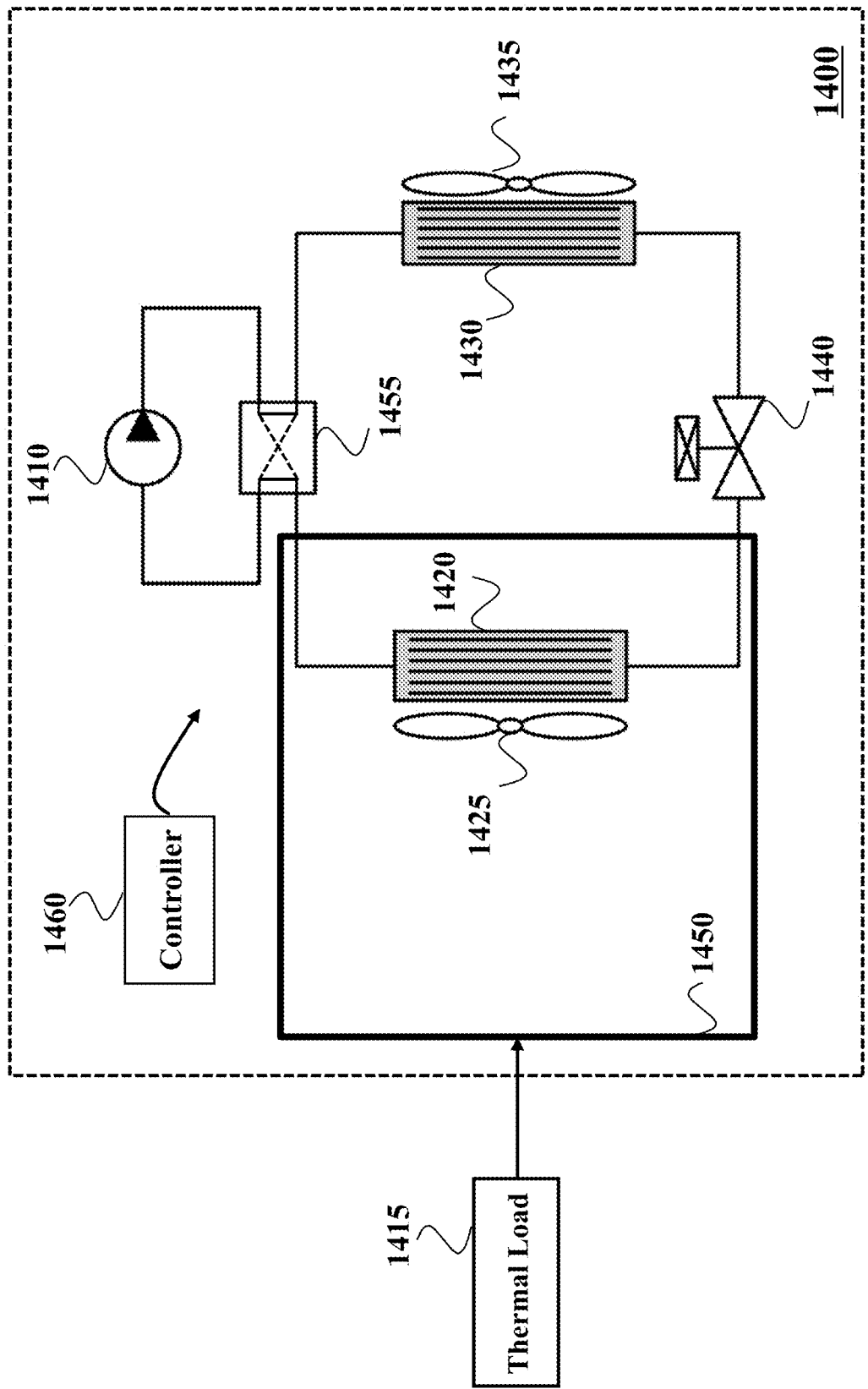
FIGS. 14A and 14B are schematics of a predictive control problem formulation for a vapor compression system (VCS), and an exemplary set of its components, employing principles of some embodiments.

FIG. 14A shows a schematic of a vapor compression system 1400 controlled by a controller 1460 according to some embodiments. The controller 1460 includes a predictive controller, such as a controller implementing a model predictive control (MPC). The components of the vapor compression system (VCS) 1400 can include an indoor heat exchanger 1420 located in an indoor space or zone 1450, an outdoor unit heat exchanger 1430 located in the ambient environment, a compressor 1410 and an expansion valve 1440. A thermal load 1415 acts on the indoor space or zone 1450.

Additionally, the VCS 1400 can include a flow reversing valve 1455 that is used to direct high pressure refrigerant exiting the compressor to either the outdoor unit heat exchanger or the indoor unit heat exchanger, and direct low pressure refrigerant returning from either the indoor unit heat exchanger or outdoor unit heat exchanger to the inlet of the compressor. In the case where high pressure refrigerant is directed to the outdoor unit heat exchanger, the outdoor unit heat exchanger acts as a condenser and the indoor unit acts as an evaporator, wherein the system rejects heat from the zone to the ambient environment, which is operationally referred to as "cooling mode." Conversely, in the case where the high pressure refrigerant is directed to the indoor unit heat exchanger, the indoor unit heat exchanger acts as a condenser and the outdoor unit heat exchanger acts as an evaporator, extracting heat from the ambient environment and pumping this heat into the zone, which is operationally referred to as "heating mode."

Figure 14B:
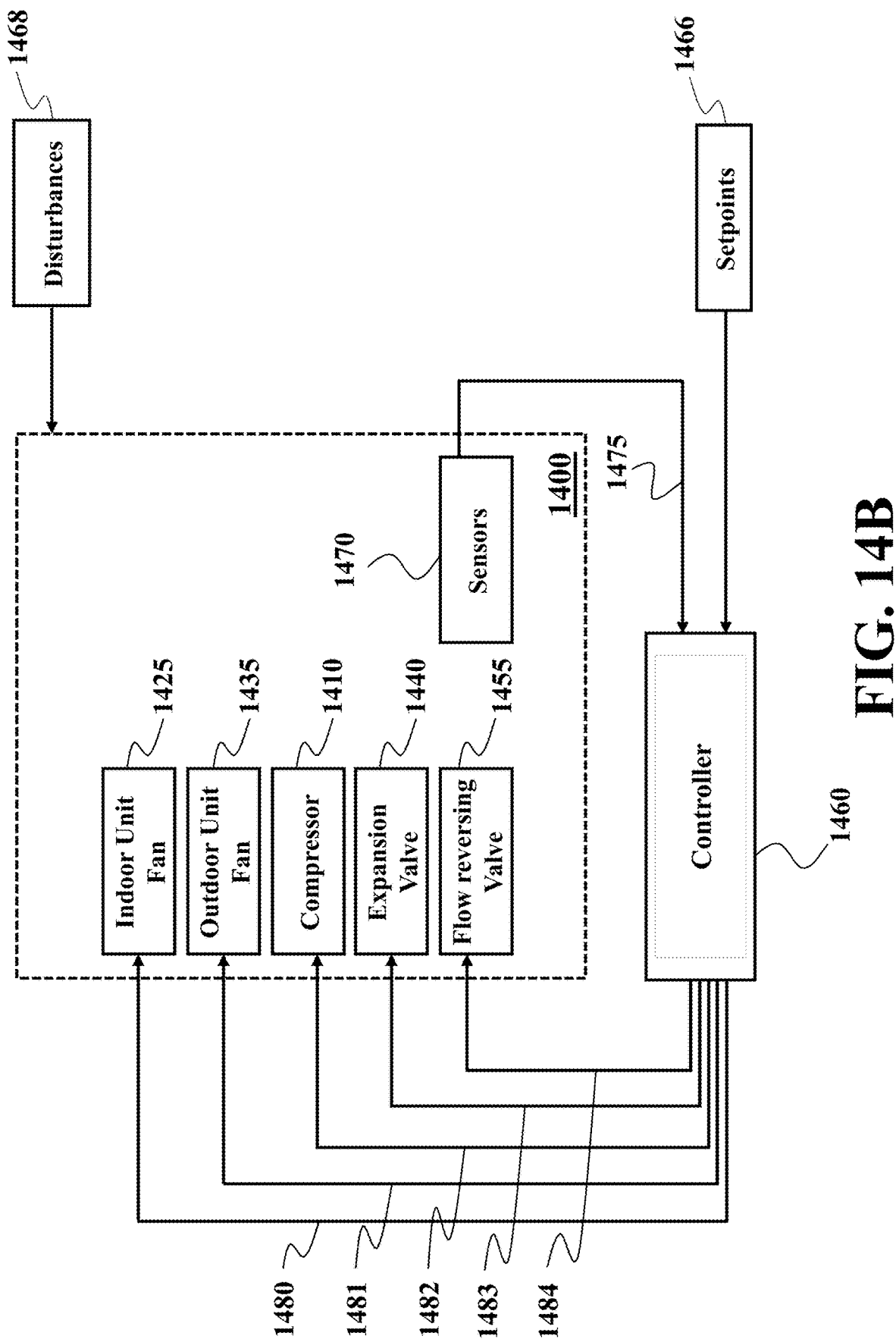

FIG. 14B shows an example of the configuration of signals, sensors, and controller used in the VCS 1400. A controller 1460 reads information from sensors 1470 configured to measure various temperatures, pressures, flow rates or other information about the operation of the system, including measurable disturbances such as the ambient air temperature. The controller can be provided with setpoints 1466 that represent desired values of measured signals of the process such as a desired zone temperature. Setpoint information can come from a thermostat, wireless remote control, or internal memory or storage media. The controller then computes control inputs such that some measured outputs are driven to their setpoints. These control inputs can include an indoor unit fan speed 1480, an outdoor unit fan speed 1481, a compressor rotational speed 1482, an expansion valve position 1483, and a flow reversing valve position 1484. In this manner, the controller controls operation of the vapor compression system such that the setpoint values are achieved in the presence of disturbances 1468, such as a thermal load, acting on the system.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

The invention claimed is:

1. A control system for controlling an operation of a machine subject to constraints including equality and inequality constraints on state and control variables of the system, comprising:

a processor configured to solve an optimal control structured optimization problem (OCP) to produce a control signal for each control step, wherein for each control step, the processor is configured to solve the OCP by iteratively solving a set of relaxed optimality conditions until a termination condition is met, wherein each iteration outputs primal variables and dual variables with respect to the equality constraints and dual variables and slack variables with respect to the inequality constraints, wherein for a current iteration, the processor is configured to:

classify each of the inequality constraints as an active, an inactive or an undecided constraint based on a ratio of a slack variable to a dual variable of the corresponding inequality constraint determined by a previous iteration;

find an approximate solution to the set of relaxed optimality conditions subject to the equality constraints and the active and undecided inequality constraints; and update the primal, dual, and slack variables for each of the equality and inequality constraint; and control the system based on the control signal.

2. The control system of claim 1, wherein to find the approximate solution the processor is configured to solve a linearized Karush-Kuhn-Tucker (KKT) system for the primal variables and the dual variables with respect to the equality constraints and the dual variables and slack variables for the active and the undecided inequality constraints subject to a relaxed complementarity constraint for each of the active and the undecided inequality constraints to produce a first Newton-type search direction;

update the primal variables and the dual variables with respect to the equality constraints and the dual variables and slack variables for the active and the undecided inequality constraints along the first Newton-type search direction with a first step size satisfying positivity constraints on the dual and the slack variables for each of the active and the undecided inequality constraints;

solve the KKT system for the inactive inequality constraints to produce a second Newton-type search direction of the dual and slack variables for the inactive inequality constraints; and update the dual variables and slack variables for the inactive inequality constraints along the second Newton-type search direction with a second step size satisfying positivity constraints on the dual and the slack variables for each of the inactive inequality constraints.

3. The control system of claim 2, wherein the first step size equals the second step size, such that the first and the second step size satisfy the positivity constraints on the dual and the slack variables for each of the inequality constraints.

4. The control system of claim 2, wherein the OCP is formulated as one or combination of optimal control structured quadratic program (OCP-QP), optimal control structured conic program (OCP-CP), and optimal control structured nonlinear program (OCP-NLP), such that a solution of the linearized KKT system matches the formulation of the OCP.

5. The control system of claim 2, wherein the first Newton-type search direction is determined by adding a regularization on one or multiple diagonal elements of the KKT matrix corresponding to the dual variables for the equality constraints and the active inequality constraints.

6. The control system of claim 2, wherein the first Newton-type search direction is determined by adding a regularization on one or multiple diagonal elements of the KKT matrix corresponding to the primal variables.

7. The control system of claim 2, wherein the first Newton-type search direction is determined by a Cholesky factorization of a positive definite KKT matrix for a reduced subsystem of the linearized KKT system for the primal variables.

8. The control system of claim 2, wherein the first Newton-type search direction is determined by a forward or reverse Cholesky factorization update from the previous iteration starting from, respectively, the first or last diagonal element of the KKT matrix updated due to the undecided inequality constraints from the previous iteration to the current iteration.

9. The control system of claim 2, wherein the OCP is a block-structured sparse optimization problem and the first Newton-type search direction is determined by a block-tridiagonal Cholesky factorization of a positive definite KKT matrix for a reduced subsystem of the linearized KKT system for the primal variables.

10. The control system of claim 2, wherein the first Newton-type search direction is determined by a forward or reverse, block-tridiagonal Cholesky factorization update from the previous iteration starting from, respectively, the first or last diagonal block of the sparse KKT matrix updated due to the undecided inequality constraints from the previous iteration to the current iteration.

11. The control system of claim 1, wherein, for a current control step, the classification of the inequality constraints is initialized based on values of primal, dual and slack variables determined for a previous control step.

12. The control system of claim 11, wherein initials values for the slack variables are increased to avoid classification of the inequality constraints as active in the first iteration.

13. The control system of claim 1, wherein the values of primal, dual and slack variables are selected at an intermediate iteration of the OCP solution during the previous control step.

14. The control system of claim 13, wherein the intermediate iteration is selected when one or combination of a norm of residual of the optimality conditions and a value of the barrier parameter at the intermediate iteration is below a predetermined threshold but above a threshold corresponding to the termination condition.

15. The control system of claim 1, wherein one or multiple of the inactive constraints are reclassified as undecided, by increasing values of the dual variables corresponding to one or multiple of the inactive constraints, when a rate of convergence of the iterative solution to the OCP is below a threshold.

16. The control system of claim 1, wherein the processor is further configured to update a barrier parameter towards zero, wherein the barrier parameter defines relaxation of complementarity constraints of the dual and the slack variables for the inequality constraints and corresponding relaxation of the optimality conditions.

17. The control system of claim 1, wherein the termination condition compares a norm of a residual of optimality conditions with a threshold.

18. The control system of claim 1, wherein the machine is a vehicle, a spacecraft, or an air-conditioning system, and wherein the processor is an embedded processor embedded in the machine.

19. A control method for controlling an operation of a machine subject to constraints including equality and inequality constraints on state and control variables of the system, wherein the processor is coupled with stored instructions implementing the method, wherein the instructions, when executed by the processor carry out at least some steps of the method, comprising:
  solving an optimal control structured optimization problem (OCP) to produce a control signal for each control step, wherein for each control step, the OCP is solved by iteratively solving a set of relaxed optimality conditions until a termination condition is met, wherein each iteration outputs primal variables and dual variables with respect to the equality constraints and dual variables and slack variables with respect to the inequality constraints, wherein for a current iteration, the method comprises:
    classifying each of the inequality constraints as an active, an inactive or an undecided constraint based on a ratio of a slack variable to a dual variable of the corresponding inequality constraint determined by a previous iteration;
    finding an approximate solution to the set of relaxed optimality conditions subject to the equality constraints and the active and undecided inequality constraints; and
    updating the primal, dual, and slack variables for each of the equality and inequality constraint; and
  controlling the system based on the control signal.

20. A non-transitory computer readable storage medium embodied thereon a program executable by a processor for performing a method, the method comprising:
  solving an optimal control structured optimization problem (OCP) to produce a control signal for each control step, wherein for each control step, the OCP is solved by iteratively solving a set of relaxed optimality conditions until a termination condition is met, wherein each iteration outputs primal variables and dual variables with respect to the equality constraints and dual variables and slack variables with respect to the inequality constraints, wherein for a current iteration, the method comprises:
    classifying each of the inequality constraints as an active, an inactive or an undecided constraint based on a ratio of a slack variable to a dual variable of the corresponding inequality constraint determined by a previous iteration;
    finding an approximate solution to the set of relaxed optimality conditions subject to the equality constraints and the active and undecided inequality constraints; and
    updating the primal, dual, and slack variables for each of the equality and inequality constraint; and
  controlling the system based on the control signal.

* * * * *